(12) United States Patent
Cote

(10) Patent No.: US 11,308,227 B2
(45) Date of Patent: Apr. 19, 2022

(54) SECURE DYNAMIC PAGE CONTENT AND LAYOUTS APPARATUSES, METHODS AND SYSTEMS

(71) Applicant: VISA INTERNATIONAL SERVICE ASSOCIATION, San Francisco, CA (US)

(72) Inventor: Stephen W. Cote, Bellevue, WA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 7 days.

(21) Appl. No.: 16/284,092

(22) Filed: Feb. 25, 2019

(65) Prior Publication Data
US 2019/0188395 A1 Jun. 20, 2019

Related U.S. Application Data

(63) Continuation of application No. 13/897,433, filed on May 19, 2013, now Pat. No. 10,262,148, which is a
(Continued)

(51) Int. Cl.
G06F 3/048 (2013.01)
G06F 21/62 (2013.01)
(Continued)

(52) U.S. Cl.
CPC .............. G06F 21/62 (2013.01); G06F 3/017 (2013.01); G06F 3/0346 (2013.01);
(Continued)

(58) Field of Classification Search
CPC ...... G06F 21/562; G06F 21/566; G06F 21/42; G06F 21/64; G06F 21/84; G06F 3/0488;
(Continued)

(56) References Cited

U.S. PATENT DOCUMENTS 789,106 A 5/1905 Seymour
5,237,164 A 8/1993 Takada
(Continued)

FOREIGN PATENT DOCUMENTS

EP 0855659 A1 7/1998
JP 2008545210 A 12/2008
(Continued)

OTHER PUBLICATIONS

How can I make the browser wait to display the page until it's fully loaded?, Sep. 16, 2009, stackoverflow, https://stackoverflow.com/questions/1435015/how-can-i-make-the-browser-wait-to-display-the-page-until-its-fully-loaded (Year: 2009).*
(Continued)

Primary Examiner — Mohamed Abou El Seoud
(74) Attorney, Agent, or Firm — Loeb & Loeb LLP

(57) ABSTRACT

The SECURE DYNAMIC PAGE CONTENT AND LAYOUTS APPARATUSES, METHODS AND SYSTEMS ("DPCL") transform dynamic layout template requests, device, user, and surroundings security profiles, and layout usage monitor packages using DPCL components into customized secure dynamic layouts. In some implementations, the disclosure provides a processor-implemented method of transforming the content of an electronically generated user facing page for displaying on a user display.

18 Claims, 38 Drawing Sheets

Example Logic Flow: Generating Dynamic Layout Using Layout Template (e.g., DLT Component 500)

Related U.S. Application Data continuation-in-part of application No. 13/737,917, filed on Jan. 9, 2013.

(60) Provisional application No. 61/584,394, filed on Jan. 9, 2012.

(51) Int. Cl.
| | |
|---|---|
| *G06F 8/38* | (2018.01) |
| *G06F 3/01* | (2006.01) |
| *G06F 3/04886* | (2022.01) |
| *G06F 3/0346* | (2013.01) |
| *G06F 21/54* | (2013.01) |
| *H04L 29/06* | (2006.01) |
| *H04W 12/128* | (2021.01) |
| *H04W 12/12* | (2021.01) |

(52) U.S. Cl.
CPC ............ *G06F 3/04886* (2013.01); *G06F 8/38* (2013.01); *G06F 21/54* (2013.01); *H04L 63/1433* (2013.01); *H04W 12/12* (2013.01); *H04W 12/128* (2021.01); *G06F 2203/04803* (2013.01); *G06F 2221/031* (2013.01); *G06F 2221/2111* (2013.01)

(58) Field of Classification Search
CPC ........ G06F 21/56; G06F 21/54; G06F 21/552; G06F 2221/031; G06F 8/38; G06F 3/0481; G06F 16/9577; G06F 19/328; G06F 21/62; G06F 3/017; G06F 3/04886; G06F 3/0346; G06F 2221/2111; G06F 2203/04803; G06Q 20/401; H04L 63/1466; H04L 63/1433; H04L 63/1416; H04L 63/145; H04L 63/166; H04W 12/12; H04W 12/1208; H04W 12/06; H04W 12/08; H04W 12/02; H04W 12/00505; H04W 48/04; H04W 12/128
See application file for complete search history.

(56) References Cited

U.S. PATENT DOCUMENTS

| | | | |
|---|---|---|---|
| 5,311,594 | A | 5/1994 | Penzias |
| 5,446,890 | A | 8/1995 | Renslo |
| 5,459,656 | A | 10/1995 | Fields |
| 5,510,777 | A | 4/1996 | Pilc |
| 5,521,362 | A | 5/1996 | Powers |
| 5,530,438 | A | 6/1996 | Bickham |
| 5,536,045 | A | 7/1996 | Adams |
| 5,615,110 | A | 3/1997 | Wong |
| 5,615,264 | A | 3/1997 | Kazmierczak |
| 5,649,118 | A | 7/1997 | Carlisle |
| 5,815,657 | A | 9/1998 | Williams |
| 5,850,446 | A | 12/1998 | Berger |
| 5,878,337 | A | 3/1999 | Joao |
| 5,903,830 | A | 5/1999 | Joao |
| 5,943,624 | A | 8/1999 | Fox |
| 5,963,924 | A | 10/1999 | Williams |
| 6,064,990 | A | 5/2000 | Goldsmith |
| 6,092,053 | A | 7/2000 | Boesch |
| 6,202,052 | B1 | 3/2001 | Miller |
| 6,202,933 | B1 | 3/2001 | Poore |
| 6,263,447 | B1 | 7/2001 | French |
| 6,267,292 | B1 | 7/2001 | Walker |
| 6,336,099 | B1 | 1/2002 | Barnett |
| 6,473,500 | B1 | 10/2002 | Risafi |
| 6,529,725 | B1 | 3/2003 | Joao |
| 6,535,855 | B1 | 3/2003 | Cahill |
| 6,601,761 | B1 | 8/2003 | Katis |
| 6,606,102 | B1 | 8/2003 | Odom |
| 6,735,572 | B2 | 5/2004 | Landesmann |
| 6,853,982 | B2 | 2/2005 | Smith |
| 6,857,073 | B2 | 2/2005 | French |
| 6,873,974 | B1 | 3/2005 | Schutzer |
| 6,898,598 | B2 | 5/2005 | Himmel |
| 6,934,528 | B2 | 8/2005 | Loureiro |
| 6,999,943 | B1 | 2/2006 | Johnson |
| 7,024,383 | B1 | 4/2006 | Mancini |
| 7,028,052 | B2 | 4/2006 | Chapman |
| 7,047,041 | B2 | 5/2006 | Vanska |
| 7,051,002 | B2 | 5/2006 | Keresman, III |
| 7,089,208 | B1 | 8/2006 | Levchin |
| 7,096,003 | B2 | 8/2006 | Joao |
| 7,111,789 | B2 | 9/2006 | Rajasekaran |
| 7,155,411 | B1 | 12/2006 | Blinn |
| 7,177,848 | B2 | 2/2007 | Hogan |
| 7,194,437 | B1 | 3/2007 | Britto |
| 7,206,847 | B1 | 4/2007 | Alberth |
| 7,212,979 | B1 | 5/2007 | Matz |
| RE39,736 | E | 7/2007 | Morrill |
| 7,268,667 | B2 | 9/2007 | Beenau |
| 7,268,668 | B2 | 9/2007 | Beenau |
| 7,290,704 | B2 | 11/2007 | Ball |
| 7,318,049 | B2 | 1/2008 | Iannacci |
| 7,337,119 | B1 | 2/2008 | Geschwender |
| 7,337,144 | B1 | 2/2008 | Blinn |
| 7,343,149 | B2 | 3/2008 | Benco |
| 7,343,351 | B1 | 3/2008 | Bishop |
| 7,349,885 | B2 | 3/2008 | Gangi |
| 7,356,505 | B2 | 4/2008 | March |
| 7,357,310 | B2 | 4/2008 | Calabrese |
| 7,359,880 | B2 | 4/2008 | Abel |
| 7,373,669 | B2 | 5/2008 | Eisen |
| 7,379,899 | B1 | 5/2008 | Junger |
| 7,392,222 | B1 | 6/2008 | Hamilton |
| 7,395,242 | B2 | 7/2008 | Blinn |
| 7,398,250 | B2 | 7/2008 | Blinn |
| 7,413,113 | B1 | 8/2008 | Zhu |
| 7,450,966 | B2 | 11/2008 | Vanska |
| 7,477,780 | B2 | 1/2009 | Boncyk |
| 7,499,889 | B2 | 3/2009 | Golan |
| 7,500,607 | B2 | 3/2009 | Williams |
| 7,533,064 | B1 | 5/2009 | Boesch |
| 7,536,360 | B2 | 5/2009 | Stolfo |
| 7,571,139 | B1 | 8/2009 | Giordano |
| 7,571,140 | B2 | 8/2009 | Weichert |
| 7,593,858 | B2 | 9/2009 | Matz |
| 7,603,311 | B1 | 10/2009 | Yadav-ranjan |
| 7,630,937 | B1 | 12/2009 | Mo |
| 7,634,295 | B2 | 12/2009 | Hayaashi |
| 7,644,037 | B1 | 1/2010 | Ostrovsky |
| 7,644,859 | B1 | 1/2010 | Zhu |
| 7,660,749 | B2 | 2/2010 | Koski |
| 7,676,434 | B2 | 3/2010 | Evans |
| 7,685,067 | B1 | 3/2010 | Britto |
| 7,698,221 | B2 | 4/2010 | Blinn |
| 7,707,113 | B1 | 4/2010 | Dimartino |
| 7,708,194 | B2 | 5/2010 | Vawter |
| 7,708,198 | B2 | 5/2010 | Gangi |
| 7,712,658 | B2 | 5/2010 | Gangi |
| 7,739,194 | B2 | 6/2010 | Blinn |
| 7,742,984 | B2 | 6/2010 | Mohsenzadeh |
| 7,774,076 | B2 | 8/2010 | Skowronek |
| 7,783,569 | B2 | 8/2010 | Abel |
| 7,784,684 | B2 | 8/2010 | Labrou |
| 7,801,829 | B2 | 9/2010 | Gray |
| 7,802,719 | B2 | 9/2010 | Johnson |
| 7,810,720 | B2 | 10/2010 | Lovett |
| 7,819,307 | B2 | 10/2010 | Lyons |
| 7,828,206 | B2 | 11/2010 | Hessburg |
| 7,828,992 | B2 | 11/2010 | Kilickiran |
| 7,837,125 | B2 | 11/2010 | Biskupski |
| 7,844,530 | B2 | 11/2010 | Ziade |
| 7,849,014 | B2 | 12/2010 | Erikson |
| 7,870,027 | B1 | 1/2011 | Tannenbaum |
| 7,877,299 | B2 | 1/2011 | Bui |
| 7,878,400 | B2 | 2/2011 | Harris |
| 7,890,370 | B2 | 2/2011 | Whitsitt |
| 7,895,119 | B2 | 2/2011 | Praisner |
| 7,899,744 | B2 | 3/2011 | Bishop |
| 7,904,360 | B2 | 3/2011 | Evans |

(56) References Cited

U.S. PATENT DOCUMENTS

| | | |
|---|---|---|
| 7,908,227 B2 | 3/2011 | Zizzimopoulos |
| 7,926,714 B1 | 4/2011 | Zhu |
| 7,933,779 B2 | 4/2011 | Rooks |
| 7,942,337 B2 | 5/2011 | Jain |
| 7,962,418 B1 | 6/2011 | Wei |
| 7,967,196 B1 | 6/2011 | Bierbaum |
| 7,971,782 B1 | 7/2011 | Shams |
| 7,996,259 B1 | 8/2011 | Distefano, III |
| 8,010,996 B2 | 8/2011 | Cline |
| 8,016,192 B2 | 9/2011 | Messerges |
| 8,020,763 B1 | 9/2011 | Kowalchyk |
| 8,024,260 B1 | 9/2011 | Hogl |
| 8,028,041 B2 | 9/2011 | Olliphant |
| 8,032,438 B1 | 10/2011 | Barton |
| 8,041,338 B2 | 10/2011 | Chen |
| 8,050,997 B1 | 11/2011 | Nosek |
| 8,060,413 B2 | 11/2011 | Castell |
| 8,074,876 B2 | 12/2011 | Foss |
| 8,108,261 B2 | 1/2012 | Carlier |
| 8,127,982 B1 | 3/2012 | Casey |
| 8,140,418 B1 | 3/2012 | Casey |
| 8,145,188 B2 | 3/2012 | Park |
| 8,145,561 B1 | 3/2012 | Zhu |
| 8,145,566 B1 | 3/2012 | Ahuja |
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar |
| 8,151,328 B1 | 4/2012 | Lundy |
| 8,151,330 B2 | 4/2012 | Vishik |
| 8,151,336 B2 | 4/2012 | Savoor |
| 8,155,999 B2 | 4/2012 | De Boer |
| 8,156,000 B1 | 4/2012 | Thompson |
| 8,156,026 B2 | 4/2012 | Junger |
| 8,156,042 B2 | 4/2012 | Winkleman, III |
| 8,156,549 B2 | 4/2012 | Rice |
| 8,157,178 B2 | 4/2012 | Dewan |
| 8,157,181 B2 | 4/2012 | Bates |
| 8,160,935 B2 | 4/2012 | Bui |
| 8,160,959 B2 | 4/2012 | Rackley, III |
| 8,161,417 B1 | 4/2012 | Lee |
| 8,165,961 B1 | 4/2012 | Dimartino |
| 8,166,068 B2 | 4/2012 | Stevens |
| RE43,351 E | 5/2012 | Jordan |
| 8,170,921 B2 | 5/2012 | Stocker |
| 8,175,235 B2 | 5/2012 | Mumford |
| 8,175,965 B2 | 5/2012 | Moore |
| 8,175,967 B2 | 5/2012 | OLeary |
| 8,175,968 B2 | 5/2012 | OLeary |
| 8,175,975 B2 | 5/2012 | Cai |
| 8,175,979 B2 | 5/2012 | Baentsch |
| 8,176,416 B1 | 5/2012 | Williams |
| 8,179,563 B2 | 5/2012 | King |
| 8,180,289 B1 | 5/2012 | Glickman |
| 8,180,705 B2 | 5/2012 | Kowalchyk |
| 8,190,513 B2 | 5/2012 | Felger |
| 8,191,775 B2 | 6/2012 | Hildred |
| 8,195,233 B2 | 6/2012 | Morikuni |
| 8,195,544 B2 | 6/2012 | Horsfall |
| 8,195,547 B2 | 6/2012 | Aaltonen |
| 8,195,565 B2 | 6/2012 | Bishop |
| 8,195,576 B1 | 6/2012 | Grigg |
| 8,196,131 B1 | 6/2012 | Von Behren |
| 8,200,582 B1 | 6/2012 | Zhu |
| 8,204,774 B2 | 6/2012 | Chwast |
| 8,204,829 B2 | 6/2012 | Alvarez |
| 8,209,245 B2 | 6/2012 | Dennes |
| 8,209,744 B2 | 6/2012 | Zhu |
| 8,214,288 B2 | 7/2012 | Olliphant |
| 8,214,289 B2 | 7/2012 | Scipioni |
| 8,214,291 B2 | 7/2012 | Pelegero |
| 8,214,292 B2 | 7/2012 | Duggal |
| 8,214,293 B2 | 7/2012 | Powell |
| 8,214,886 B2 | 7/2012 | Foley |
| 8,215,546 B2 | 7/2012 | Lin |
| 8,219,411 B2 | 7/2012 | Matz |
| 8,219,474 B2 | 7/2012 | Sutton |
| 8,219,490 B2 | 7/2012 | Hammad |
| 8,220,047 B1 | 7/2012 | Soghoian |
| 8,224,702 B2 | 7/2012 | Mangerink |
| 8,224,754 B2 | 7/2012 | Pastusiak |
| 8,224,773 B2 | 7/2012 | Spiegel |
| 8,225,997 B1 | 7/2012 | Bierbaum |
| 8,227,936 B1 | 7/2012 | Folk |
| 8,229,354 B2 | 7/2012 | Sklovsky |
| 8,229,808 B1 | 7/2012 | Heit |
| 8,229,844 B2 | 7/2012 | Felger |
| 8,229,851 B2 | 7/2012 | Doran |
| 8,229,854 B2 | 7/2012 | Stephen |
| 8,233,841 B2 | 7/2012 | Griffin |
| 8,234,183 B2 | 7/2012 | Smith |
| 8,239,276 B2 | 8/2012 | Lin |
| 8,244,580 B2 | 8/2012 | Mankoff |
| 8,249,965 B2 | 8/2012 | Tumminaro |
| 8,255,278 B1 | 8/2012 | Young |
| 8,255,323 B1 | 8/2012 | Casey |
| 8,255,324 B2 | 8/2012 | Bercy |
| 8,275,704 B2 | 9/2012 | Bishop |
| 8,280,777 B2 | 10/2012 | Mengerink |
| 8,281,998 B2 | 10/2012 | Tang |
| 8,282,002 B2 | 10/2012 | Shams |
| 8,285,640 B2 | 10/2012 | Scipioni |
| 8,285,820 B2 | 10/2012 | Olliphant |
| 8,285,832 B2 | 10/2012 | Schwab |
| 8,286,875 B2 | 10/2012 | Tang |
| 8,290,433 B2 | 10/2012 | Fisher |
| 8,290,819 B2 | 10/2012 | Bawcutt |
| 8,290,829 B1 | 10/2012 | Katz |
| 8,295,898 B2 | 10/2012 | Ashfield |
| 8,296,187 B2 | 10/2012 | Light |
| 8,296,204 B2 | 10/2012 | Templeton |
| 8,296,228 B1 | 10/2012 | Kloor |
| 8,296,231 B2 | 10/2012 | Britto |
| 8,301,500 B2 | 10/2012 | Pharris |
| 8,301,510 B2 | 10/2012 | Boesch |
| 8,301,556 B2 | 10/2012 | Hogl |
| 8,311,520 B2 | 11/2012 | Choi |
| 8,312,096 B2 | 11/2012 | Cohen |
| 8,321,267 B2 | 11/2012 | Hoerenz |
| 8,321,294 B2 | 11/2012 | Carlier |
| 8,321,315 B2 | 11/2012 | Abel |
| 8,321,338 B2 | 11/2012 | Baumgart |
| 8,321,343 B2 | 11/2012 | Ramavarjula |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement |
| 8,332,272 B2 | 12/2012 | Fisher |
| 8,332,275 B2 | 12/2012 | Poon |
| 8,332,323 B2 | 12/2012 | Stals |
| 8,335,720 B2 | 12/2012 | Juang |
| 8,335,726 B1 | 12/2012 | Ling |
| 8,335,822 B2 | 12/2012 | Ahmed |
| 8,335,921 B2 | 12/2012 | Von Behren |
| 8,335,932 B2 | 12/2012 | Von Behren |
| 8,340,666 B2 | 12/2012 | Ramer |
| 8,341,029 B2 | 12/2012 | Ramalingam |
| 8,341,744 B1 * | 12/2012 | Obrecht .................. G06F 21/41 713/188 |
| 8,346,643 B2 | 1/2013 | Boyer |
| 8,346,659 B1 | 1/2013 | Mohsenzadeh |
| 8,346,663 B2 | 1/2013 | Kawan |
| 8,352,323 B2 | 1/2013 | Fisher |
| 8,352,362 B2 | 1/2013 | Mohsenzadeh |
| 8,352,499 B2 | 1/2013 | Bharat |
| 8,352,749 B2 | 1/2013 | Von Behren |
| 8,355,987 B2 | 1/2013 | Hirson |
| 8,359,070 B1 | 1/2013 | Zhu |
| 8,364,587 B2 | 1/2013 | Nuzum |
| 8,364,590 B1 | 1/2013 | Casey |
| 8,370,264 B1 | 2/2013 | Wei |
| 8,380,177 B2 | 2/2013 | Laracey |
| 8,401,904 B1 | 3/2013 | Simakov |
| 8,412,586 B1 | 4/2013 | Foulser |

(56) References Cited

U.S. PATENT DOCUMENTS

| | | |
|---|---|---|
| 8,412,630 B2 | 4/2013 | Ross |
| 8,417,633 B1 | 4/2013 | Chmara |
| 8,423,462 B1 | 4/2013 | Amacker |
| 8,548,981 B1 | 10/2013 | Bhattacharjee |
| 8,646,032 B2 | 2/2014 | Aad |
| 8,683,340 B2 | 3/2014 | Wilkins |
| 2001/0037297 A1 | 3/2001 | McNair |
| 2001/0056359 A1 | 12/2001 | Abreu |
| 2002/0039923 A1 | 4/2002 | Cannon |
| 2002/0040325 A1 | 4/2002 | Takae |
| 2002/0077976 A1 | 6/2002 | Meyer |
| 2002/0107755 A1 | 8/2002 | Steed |
| 2002/0112014 A1 | 8/2002 | Bennett |
| 2002/0116271 A1 | 8/2002 | Mankoff |
| 2002/0143614 A1 | 10/2002 | MacLean |
| 2003/0014307 A1 | 1/2003 | Heng |
| 2003/0026404 A1 | 2/2003 | Joyce |
| 2003/0028481 A1 | 2/2003 | Flitcroft |
| 2003/0080185 A1 | 5/2003 | Werther |
| 2003/0097318 A1 | 5/2003 | Yu |
| 2003/0101134 A1 | 5/2003 | Liu |
| 2003/0151621 A1 | 8/2003 | McEvilly |
| 2003/0174823 A1 | 9/2003 | Justice |
| 2003/0177361 A1 | 9/2003 | Wheeler |
| 2003/0191711 A1 | 10/2003 | Jamison |
| 2003/0200142 A1 | 10/2003 | Hicks |
| 2003/0200184 A1 | 10/2003 | Dominguez |
| 2003/0212642 A1 | 11/2003 | Weller |
| 2004/0021643 A1 | 2/2004 | Hoshino |
| 2004/0078332 A1 | 4/2004 | Ferguson |
| 2004/0103037 A1 | 5/2004 | Wetmore |
| 2004/0128197 A1 | 7/2004 | Bam |
| 2004/0138999 A1 | 7/2004 | Friedman |
| 2004/0148255 A1 | 7/2004 | Beck |
| 2004/0215963 A1 | 10/2004 | Kaplan |
| 2004/0230536 A1 | 11/2004 | Fung |
| 2004/0236646 A1 | 11/2004 | Wu |
| 2004/0254891 A1 | 12/2004 | Blinn |
| 2004/0263907 A1 | 12/2004 | Hiraki |
| 2004/0267608 A1 | 12/2004 | Mansfield |
| 2005/0010483 A1 | 1/2005 | Ling |
| 2005/0037735 A1 | 2/2005 | Courts |
| 2005/0065819 A1 | 3/2005 | Pamela |
| 2005/0080747 A1 | 4/2005 | Anderson |
| 2005/0080821 A1 | 4/2005 | Breil |
| 2005/0097320 A1 | 5/2005 | Golan |
| 2005/0137969 A1 | 6/2005 | Shah |
| 2005/0171894 A1 | 8/2005 | Traynor |
| 2005/0192893 A1 | 9/2005 | Keeling |
| 2005/0192895 A1 | 9/2005 | Rogers |
| 2005/0220326 A1 | 10/2005 | Sim |
| 2005/0234817 A1 | 10/2005 | VanFleet |
| 2005/0246278 A1 | 11/2005 | Gerber |
| 2005/0254714 A1 | 11/2005 | Anne |
| 2005/0261967 A1 | 11/2005 | Barry |
| 2006/0031762 A1 | 2/2006 | Takashima |
| 2006/0053056 A1 | 3/2006 | Alspach-goss |
| 2006/0085328 A1 | 4/2006 | Cohen |
| 2006/0085477 A1 | 4/2006 | Phillips |
| 2006/0124729 A1 | 6/2006 | Martin |
| 2006/0129427 A1 | 6/2006 | Wennberg |
| 2006/0163349 A1 | 7/2006 | Neugebauer |
| 2006/0178986 A1 | 8/2006 | Giordano |
| 2006/0190347 A1 | 8/2006 | Cuervo |
| 2006/0193008 A1 | 8/2006 | Osaka |
| 2006/0226216 A1 | 10/2006 | Keithley |
| 2006/0277143 A1 | 12/2006 | Almonte |
| 2006/0288280 A1 | 12/2006 | Makela |
| 2006/0293947 A1 | 12/2006 | Nicholson |
| 2007/0006098 A1 | 1/2007 | Krumm |
| 2007/0011025 A1 | 1/2007 | Cracchiolo |
| 2007/0038515 A1 | 2/2007 | Postrel |
| 2007/0038516 A1 | 2/2007 | Apple |
| 2007/0055571 A1 | 3/2007 | Fox |
| 2007/0087820 A1 | 4/2007 | Van |
| 2007/0094066 A1 | 4/2007 | Kumar |
| 2007/0100691 A1 | 5/2007 | Patterson |
| 2007/0100728 A1 | 5/2007 | Rotman |
| 2007/0106607 A1 | 5/2007 | Seib |
| 2007/0113289 A1 | 5/2007 | Blumenau |
| 2007/0143204 A1 | 6/2007 | Claus |
| 2007/0150413 A1 | 6/2007 | Morgenstern |
| 2007/0180119 A1 | 8/2007 | Khivesara |
| 2007/0208662 A1 | 9/2007 | Jeronimus |
| 2007/0214078 A1 | 9/2007 | Coppinger |
| 2007/0214250 A1 | 9/2007 | Ahmed |
| 2007/0226152 A1 | 9/2007 | Jones |
| 2007/0233590 A1 | 10/2007 | Hardison |
| 2007/0239502 A1 | 10/2007 | Babu |
| 2007/0276765 A1 | 11/2007 | Hazel |
| 2008/0004116 A1 | 1/2008 | Van |
| 2008/0004952 A1 | 1/2008 | Koli |
| 2008/0010096 A1 | 1/2008 | Patterson |
| 2008/0021829 A1 | 1/2008 | Kranzley |
| 2008/0077489 A1 | 3/2008 | Gilley |
| 2008/0082911 A1 | 4/2008 | Sorotokin |
| 2008/0086365 A1 | 4/2008 | Zollino |
| 2008/0091553 A1 | 4/2008 | Koski |
| 2008/0091616 A1 | 4/2008 | Helwin |
| 2008/0097856 A1 | 4/2008 | Blagg |
| 2008/0114737 A1 | 5/2008 | Neely |
| 2008/0126145 A1 | 5/2008 | Racklet, III |
| 2008/0133351 A1 | 6/2008 | White |
| 2008/0140568 A1 | 6/2008 | Henry |
| 2008/0147883 A1 | 6/2008 | Philyaw |
| 2008/0162361 A1 | 7/2008 | Sklovsky |
| 2008/0167965 A1 | 7/2008 | Von |
| 2008/0172274 A1 | 7/2008 | Hurowitz |
| 2008/0172331 A1 | 7/2008 | Graves |
| 2008/0177574 A1 | 7/2008 | Marcos |
| 2008/0177672 A1 | 7/2008 | Brunner |
| 2008/0223918 A1 | 9/2008 | Williams |
| 2008/0270300 A1 | 10/2008 | Jones |
| 2008/0272188 A1 | 11/2008 | Keithley |
| 2008/0319905 A1 | 12/2008 | Carlson |
| 2009/0006181 A1 | 1/2009 | Ghosh |
| 2009/0024527 A1 | 1/2009 | Sellen |
| 2009/0037255 A1 | 2/2009 | Chiu |
| 2009/0048934 A1 | 2/2009 | Haddad |
| 2009/0061884 A1 | 3/2009 | Rajan |
| 2009/0063261 A1 | 3/2009 | Scribner |
| 2009/0064056 A1 | 3/2009 | Anderson |
| 2009/0076953 A1 | 3/2009 | Saville |
| 2009/0076966 A1 | 3/2009 | Bishop |
| 2009/0089176 A1 | 4/2009 | Mccabe |
| 2009/0089193 A1 | 4/2009 | Paintin |
| 2009/0089869 A1 | 4/2009 | Varghese |
| 2009/0100384 A1 | 4/2009 | Louch |
| 2009/0104888 A1 | 4/2009 | Cox |
| 2009/0106151 A1 | 4/2009 | Nelsen |
| 2009/0119176 A1 | 5/2009 | Johnson |
| 2009/0119211 A1 | 5/2009 | Johnson |
| 2009/0132347 A1 | 5/2009 | Anderson |
| 2009/0132395 A1 | 5/2009 | Lam |
| 2009/0144104 A1 | 6/2009 | Johnson |
| 2009/0164344 A1 | 6/2009 | Shiftan |
| 2009/0171778 A1 | 7/2009 | Powell |
| 2009/0182664 A1 | 7/2009 | Trombley |
| 2009/0201246 A1 | 8/2009 | Lee |
| 2009/0210300 A1 | 8/2009 | Cansler |
| 2009/0222347 A1 | 9/2009 | Whitten |
| 2009/0233579 A1 | 9/2009 | Castell |
| 2009/0234751 A1 | 9/2009 | Chan |
| 2009/0241159 A1 | 9/2009 | Campagna |
| 2009/0254471 A1 | 10/2009 | Seidel |
| 2009/0254479 A1 | 10/2009 | Pharris |
| 2009/0254535 A1 | 10/2009 | Eickelmann |
| 2009/0265274 A1 | 10/2009 | Hahn-Carlson |
| 2009/0271265 A1 | 10/2009 | Lay |
| 2009/0288012 A1 | 11/2009 | Hertel |
| 2009/0307135 A1 | 12/2009 | Gupta |
| 2009/0313132 A1 | 12/2009 | McKenna |
| 2009/0319175 A1 | 12/2009 | Khosravy |
| 2009/0327045 A1 | 12/2009 | Olives |

(56) References Cited

U.S. PATENT DOCUMENTS

| | | |
|---|---|---|
| 2009/0327088 A1 | 12/2009 | Puthupparambil |
| 2010/0004989 A1 | 1/2010 | Bonalle |
| 2010/0005025 A1 | 1/2010 | Kumar |
| 2010/0009663 A1 | 1/2010 | Chang |
| 2010/0010964 A1 | 1/2010 | Skowronek |
| 2010/0023386 A1 | 1/2010 | Avisar |
| 2010/0023455 A1 | 1/2010 | Dispensa |
| 2010/0036741 A1 | 2/2010 | Cleven |
| 2010/0036775 A1 | 2/2010 | Edens |
| 2010/0042456 A1 | 2/2010 | Stinchcombe |
| 2010/0042537 A1 | 2/2010 | Smith |
| 2010/0042540 A1 | 2/2010 | Graves |
| 2010/0048167 A1 | 2/2010 | Chow |
| 2010/0049879 A1 | 2/2010 | Leavitt |
| 2010/0063903 A1 | 3/2010 | Whipple |
| 2010/0070928 A1 | 3/2010 | Goodger |
| 2010/0076873 A1 | 3/2010 | Taylor |
| 2010/0078471 A1 | 4/2010 | Lin |
| 2010/0078472 A1 | 4/2010 | Lin |
| 2010/0082444 A1 | 4/2010 | Lin |
| 2010/0082445 A1 | 4/2010 | Hodge |
| 2010/0082447 A1 | 4/2010 | Lin |
| 2010/0082455 A1 | 4/2010 | Rosenblatt |
| 2010/0082480 A1 | 4/2010 | Korosec |
| 2010/0082481 A1 | 4/2010 | Lin |
| 2010/0082485 A1 | 4/2010 | Lin |
| 2010/0082490 A1 | 4/2010 | Rosenblatt |
| 2010/0082491 A1 | 4/2010 | Rosenblatt |
| 2010/0088188 A1 | 4/2010 | Kumar |
| 2010/0088639 A1 | 4/2010 | Yach |
| 2010/0094730 A1 | 4/2010 | Koski |
| 2010/0100480 A1 | 4/2010 | Altman |
| 2010/0121707 A1 | 5/2010 | Goeldi |
| 2010/0125492 A1 | 5/2010 | Lin |
| 2010/0125495 A1 | 5/2010 | Smith |
| 2010/0125803 A1 | 5/2010 | Johnson |
| 2010/0131347 A1 | 5/2010 | Sarptipi |
| 2010/0131359 A1 | 5/2010 | Ting |
| 2010/0131415 A1 | 5/2010 | Sartipi |
| 2010/0155470 A1 | 6/2010 | Woronec |
| 2010/0161433 A1 | 6/2010 | White |
| 2010/0174599 A1 | 7/2010 | Rosenblatt |
| 2010/0185505 A1 | 7/2010 | Sprogoe |
| 2010/0185531 A1 | 7/2010 | Van |
| 2010/0191578 A1 | 7/2010 | Tran |
| 2010/0191622 A1 | 7/2010 | Reiss |
| 2010/0191770 A1 | 7/2010 | Cho |
| 2010/0198626 A1 | 8/2010 | Cho |
| 2010/0211445 A1 | 8/2010 | Bodington |
| 2010/0211452 A1 | 8/2010 | D |
| 2010/0211499 A1 | 8/2010 | Zanzot |
| 2010/0217682 A1 | 8/2010 | Chan |
| 2010/0250351 A1 | 9/2010 | Gillenson |
| 2010/0259560 A1 | 10/2010 | Jakobson |
| 2010/0259684 A1 | 10/2010 | Kambe |
| 2010/0276484 A1 | 11/2010 | Banerjee |
| 2010/0305848 A1 | 12/2010 | Stallman |
| 2010/0306075 A1 | 12/2010 | Drance |
| 2010/0306113 A1 | 12/2010 | Grey |
| 2010/0312645 A1 | 12/2010 | Niekadlik |
| 2010/0312676 A1 | 12/2010 | Muthukumaran |
| 2010/0332262 A1 | 12/2010 | Horvitz |
| 2010/0332283 A1 | 12/2010 | Ng |
| 2011/0030060 A1 | 2/2011 | Keiwal |
| 2011/0047075 A1 | 2/2011 | Fourez |
| 2011/0078082 A1 | 3/2011 | Gupta |
| 2011/0082789 A1 | 4/2011 | Boyd |
| 2011/0099057 A1 | 4/2011 | Tenyer |
| 2011/0105183 A1 | 5/2011 | Hsiao |
| 2011/0106698 A1 | 5/2011 | Issacson |
| 2011/0137742 A1 | 6/2011 | Parikh |
| 2011/0163956 A1 | 7/2011 | Zdralek |
| 2011/0178896 A1 | 7/2011 | Nakajima |
| 2011/0179385 A1 | 7/2011 | Li |
| 2011/0184827 A1 | 7/2011 | Hubert |
| 2011/0215146 A1 | 9/2011 | Shams |
| 2011/0218870 A1 | 9/2011 | Shams |
| 2011/0246290 A1 | 10/2011 | Howard |
| 2011/0258123 A1 | 10/2011 | Dawkins |
| 2011/0296508 A1 | 12/2011 | Os |
| 2011/0320344 A1 | 12/2011 | Faith |
| 2012/0011063 A1 | 1/2012 | Killian |
| 2012/0022943 A1 | 1/2012 | Howard |
| 2012/0023026 A1 | 1/2012 | Chen |
| 2012/0023453 A1 | 1/2012 | Wagner |
| 2012/0030101 A1 | 2/2012 | Boyd |
| 2012/0036071 A1 | 2/2012 | Fulton |
| 2012/0036468 A1 | 2/2012 | Colley |
| 2012/0072968 A1 | 3/2012 | Wysopal |
| 2012/0084204 A1 | 4/2012 | Castell |
| 2012/0095895 A1 | 4/2012 | Aston |
| 2012/0101881 A1 | 4/2012 | Taylor |
| 2012/0116966 A1 | 5/2012 | Tan |
| 2012/0118950 A1 | 5/2012 | Belk |
| 2012/0123838 A1 | 5/2012 | Sparks |
| 2012/0136780 A1 | 5/2012 | El-Awady |
| 2012/0166333 A1 | 6/2012 | von Behren |
| 2012/0173431 A1 | 7/2012 | Ritchie |
| 2012/0190386 A1 | 7/2012 | Anderson |
| 2012/0215640 A1 | 8/2012 | Ramer |
| 2012/0215650 A1 | 8/2012 | Oba |
| 2012/0221421 A1 | 8/2012 | Hammad |
| 2012/0221502 A1 | 8/2012 | Jerram |
| 2012/0231844 A1 | 9/2012 | Coppinger |
| 2012/0259763 A1 | 10/2012 | Pessin |
| 2012/0296856 A1* | 11/2012 | Barkan .................. G06N 5/04 706/12 |
| 2012/0297469 A1 | 11/2012 | Reeder |
| 2012/0304273 A1 | 11/2012 | Bailey |
| 2012/0310826 A1 | 12/2012 | Chatterjee |
| 2012/0317645 A1 | 12/2012 | Fortier |
| 2012/0323664 A1 | 12/2012 | Klems |
| 2013/0031470 A1 | 1/2013 | Daly, Jr. |
| 2013/0090750 A1 | 4/2013 | Herrman |
| 2013/0219013 A1 | 8/2013 | Decker |
| 2013/0340091 A1* | 12/2013 | Phegade ................ G06F 21/36 726/27 |

FOREIGN PATENT DOCUMENTS

| | | |
|---|---|---|
| KR | 100432430 B1 | 5/2004 |
| KR | 20060117177 A | 11/2006 |
| KR | 20070104087 A | 10/2007 |
| WO | 0165502 A2 | 9/2001 |
| WO | 03023674 A1 | 3/2003 |
| WO | 2010148737 A1 | 12/2010 |
| WO | 2013093011 | 6/2013 |

OTHER PUBLICATIONS

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.

David Breitkopf, "ACS to Take Over Mich. WC Distribution Program", American Banker, New York, NY: Jul. 20, 2006, vol. 171. Issue 138, p. 6.

Gopalan, NP & Selvan, B Siva. TCP/IP Illustrated. Prentice-Hall. 2008. pp. 101-102, 175-176 and 235. 7 pages.

International Search Report and Writen Opinion for PCT/US09/54921 dated Oct. 21, 2009. (8 pages).

International Search Report and Written Opinion for PCT/US2010/033229 dated Dec. 29, 2010. (8 pages).

International Search Report and Written Opinion for PCT/US11/57173 dated Mar. 15, 2012. (11 pages).

International Search Report and Written Opinion for PCT/US11/57179 dated Jan. 5, 2012. (7 pages).

International Search Report and Written Opinion for PCT/US11/57180 dated Mar. 15, 2012 (11 pages).

(56) References Cited

OTHER PUBLICATIONS

International Search Report and Written Opinion for PCT/US12/37597 dated Sep. 21, 2012 (11 pages).
International Search Report and Written Opinion for PCT/US12/41437 dated Aug. 24, 2012. (20 pages).
International Search Report and Written Opinion for PCT/US12/47092 dated Nov. 26, 2012. 11 pages.
International Search Report and Written Opinion for PCT/US12/55636 dated Nov. 30, 2012. 9 pages.
International Search Report and Written Opinion for PCT/US12/56759 dated Feb. 25, 2013. 12 pages.
International Search Report and Written Opinion for PCT/US12/57528 dated Dec. 17, 2012. 8 pages.
International Search Report and Written Opinion for PCT/US12/65738 dated Apr. 19, 2013. 9 pages.
International Search Report and Written Opinion for PCT/US12/66898 dated Feb. 11, 2013. 14 pages.
International Search Report and Written Opinion for PCT/US2010/033861 dated Dec. 9, 2010 (7 pages).
International Search Report and Written Opinion for PCT/US2010/041860 dated Feb. 1, 2011. (8 pages).
International Search Report and Written Opinion for PCT/US2010/046833 dated Apr. 26, 2011, 8 pages.
International Search Report and Written Opinion for PCT/US2010/048344 dated Nov. 15, 2010. (7 pages).
International Search Report and Written Opinion for PCT/US2011/024941 dated Apr. 19, 2011 (6 pages).
International Search Report and Written Opinion for PCT/US2011/032093 dated Aug. 24, 2011 (11 pages).
International Search Report and Written Opinion for PCT/US2011/26734 dated Apr. 29, 2011 (7 pages).
International Search Report and Written Opinion for PCT/US2011/29790 dated May 19, 2011 (6 pages).
International Search Report and Written Opinion for PCT/US2012/026205, dated May 29, 2012. 12 pages.
International Search Report and Written Opinion for PCT/US2012/027043 dated Jul. 13, 2012. 15 pages.
International Search Report and Written Opinion for PCT/US2012/045601 dated Feb. 1, 2013. 11 pages.
International Search Report and Written Opinion for PCT/US2012/069557 dated Feb. 22, 2013. 8 pages.
International Search Report and Written Opinion for PCT/US2013/020411 dated May 21, 2013. 18 pages.
International Search Report and Written Opinion for PCT/US2013/024538, dated May 31, 2013. 15 pages.
International Search Report and Written Opinion for PCT/US2013/031084, dated Jun. 4, 2013. 9 pages.
International Search Report and Written Opinion issued in connection with PCT/US11/42062 dated Sep. 29, 2011 (8 pages).
International Search Report and Writtten Opinion for PCT/US2011/039178 dated Sep. 16, 2011 (7 pages).
International Search Report for PCT/US11/49393 dated Dec. 5, 2011. (2 pages).
International Search Report for PCT/US11/65305 dated Apr. 16, 2012. 2 pages.
International Search Report for PCT/US12/21000 dated May 15, 2012. 2 pages.
International Search Report for PCT/US12/23856 dated Jun. 6, 2012. 3 pages.
International Search Report for PCT/US12/24772 dated Jul. 24, 2012. 3 pages.
International Search Report for PCT/US12/25530 dated Aug. 7, 2012. 4 pages.
International Search Report for PCT/US12/39638 dated Sep. 24, 2012. 4 pages.
International Search Report for PCT/US12/45875 dated Nov. 16, 2012. 4 pages.
International Search Report for PCT/US12/57577 dated Nov. 29, 2012. 2 pages.
International Search Report for PCT/US2010/033229 dated Dec. 29, 2010, 3 pages.
International Search Report for PCT/US2010/033547 dated Dec. 14, 2010 (3 pages).
International Search Report for PCT/US2010/045445 dated Feb. 24, 2011 (3 pages).
International Search Report for PCT/US2010/045500 dated Mar. 29, 2011 (3 pages).
International Search Report for PCT/US2011/035268 dated Aug. 5, 2011 (3 pages).
International Search Report PCT/US12/27620 dated Aug. 10, 2012. 3 pages.
Notice of Allowance dated Nov. 26, 2018 for U.S. Appl. No. 13/897,433 (pp. 1-8).
Office Action dated May 1, 2019 for U.S. Appl. No. 13/737,917 (pp. 1-28).
Office Action dated Nov. 28, 2018 for U.S. Appl. No. 13/737,917 (pp. 1-23).
PCT International Preliminary Report on Patentability for PCT/US11/57173 dated Mar. 15, 2012, 7 pages.
PCT International Preliminary Report on Patentability dated Mar. 6, 2012 corresponding to application PCT/US2010/046833. 6 pages.
Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?amumber=5369384, pp. 449-452.
Written Opinion for PCT/US12/27620 dated Aug. 10, 2012. 5 pages.

* cited by examiner

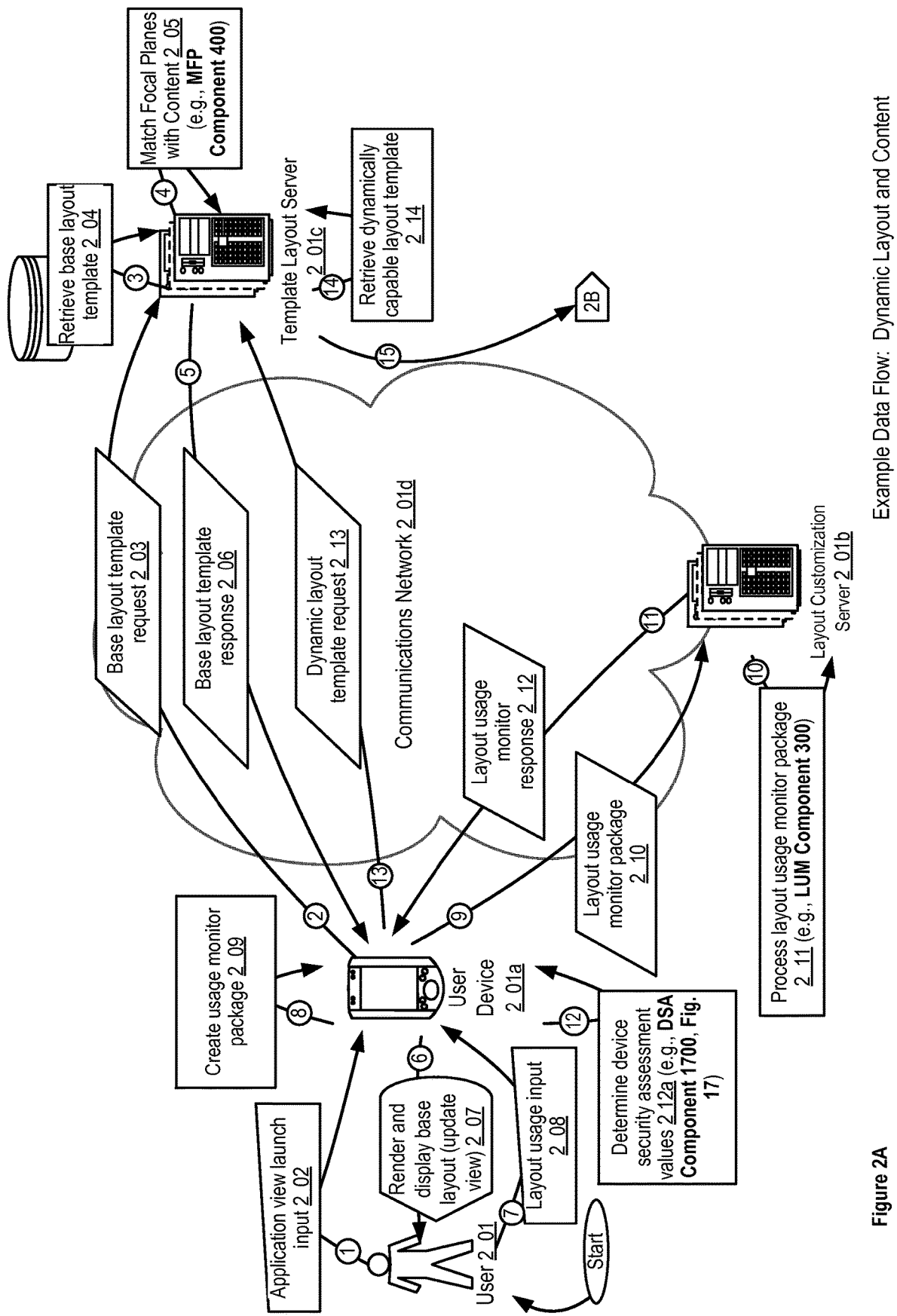
Figure 2A  Example Data Flow: Dynamic Layout and Content

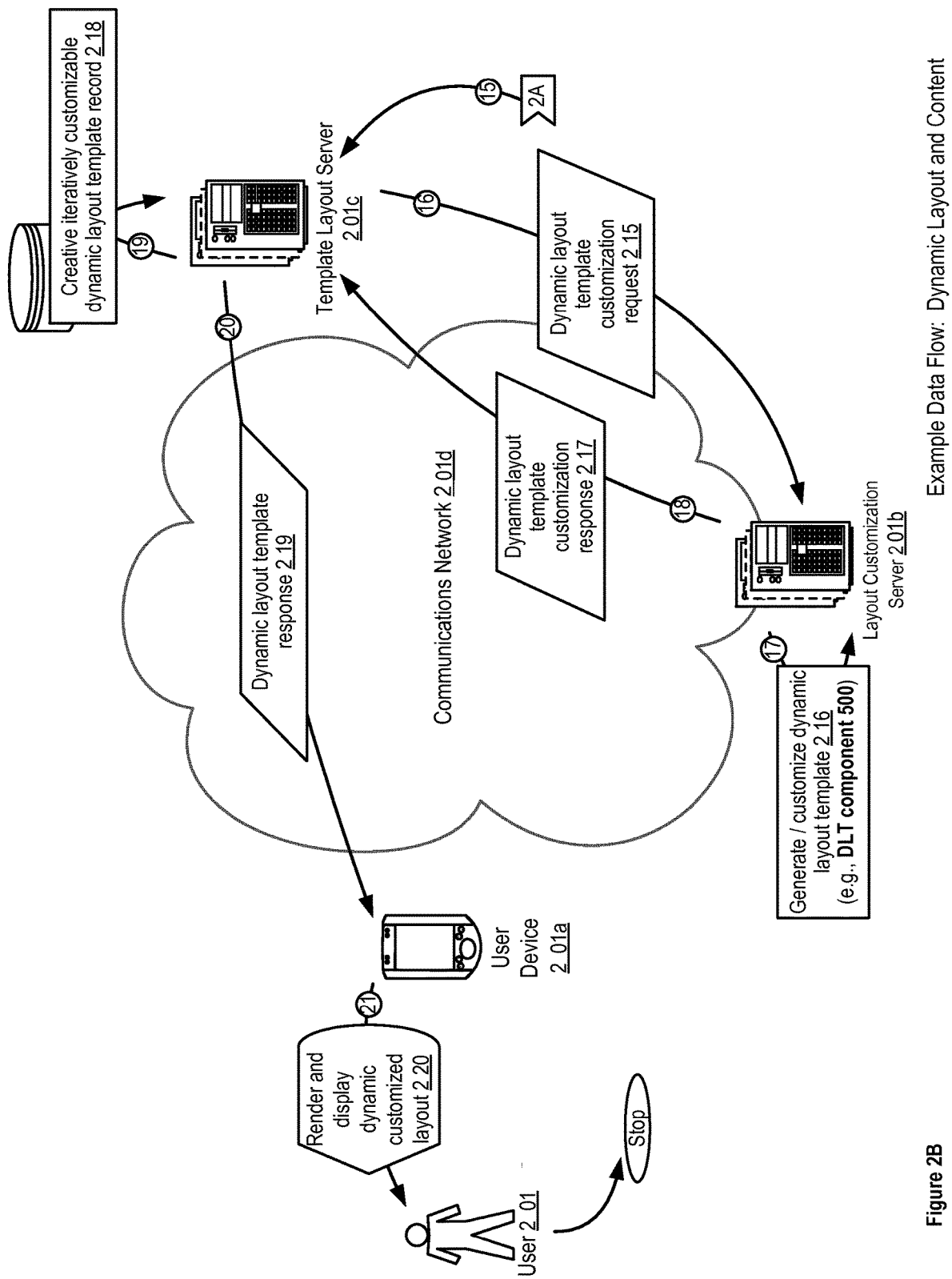
Figure 2B  Example Data Flow: Dynamic Layout and Content

Example Logic Flow: Layout Usage Monitor Package Processing (e.g., LUM Component 300)

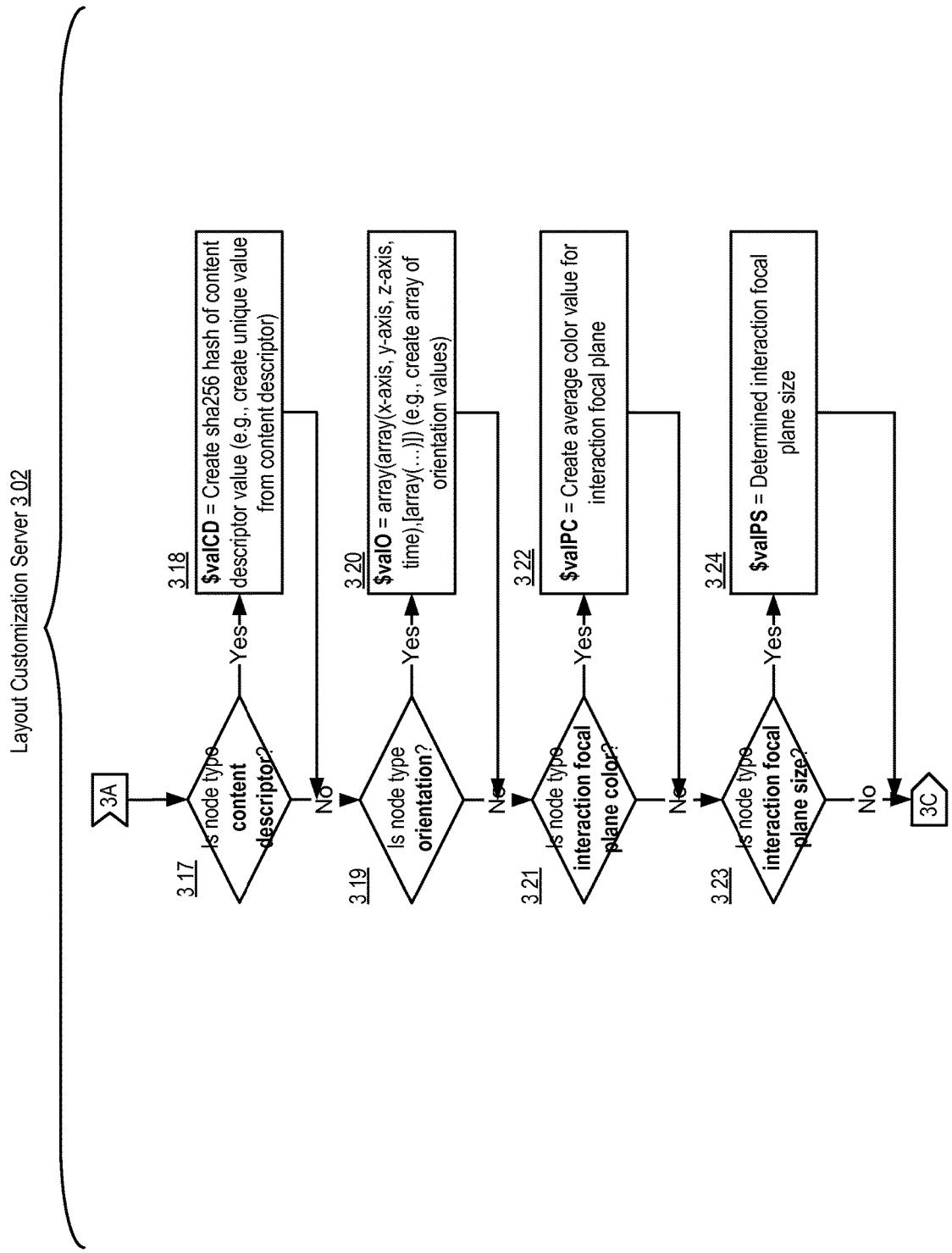
Figure 3B — Example Logic Flow: Layout Usage Monitor Package Processing (e.g., LUM Component 300)

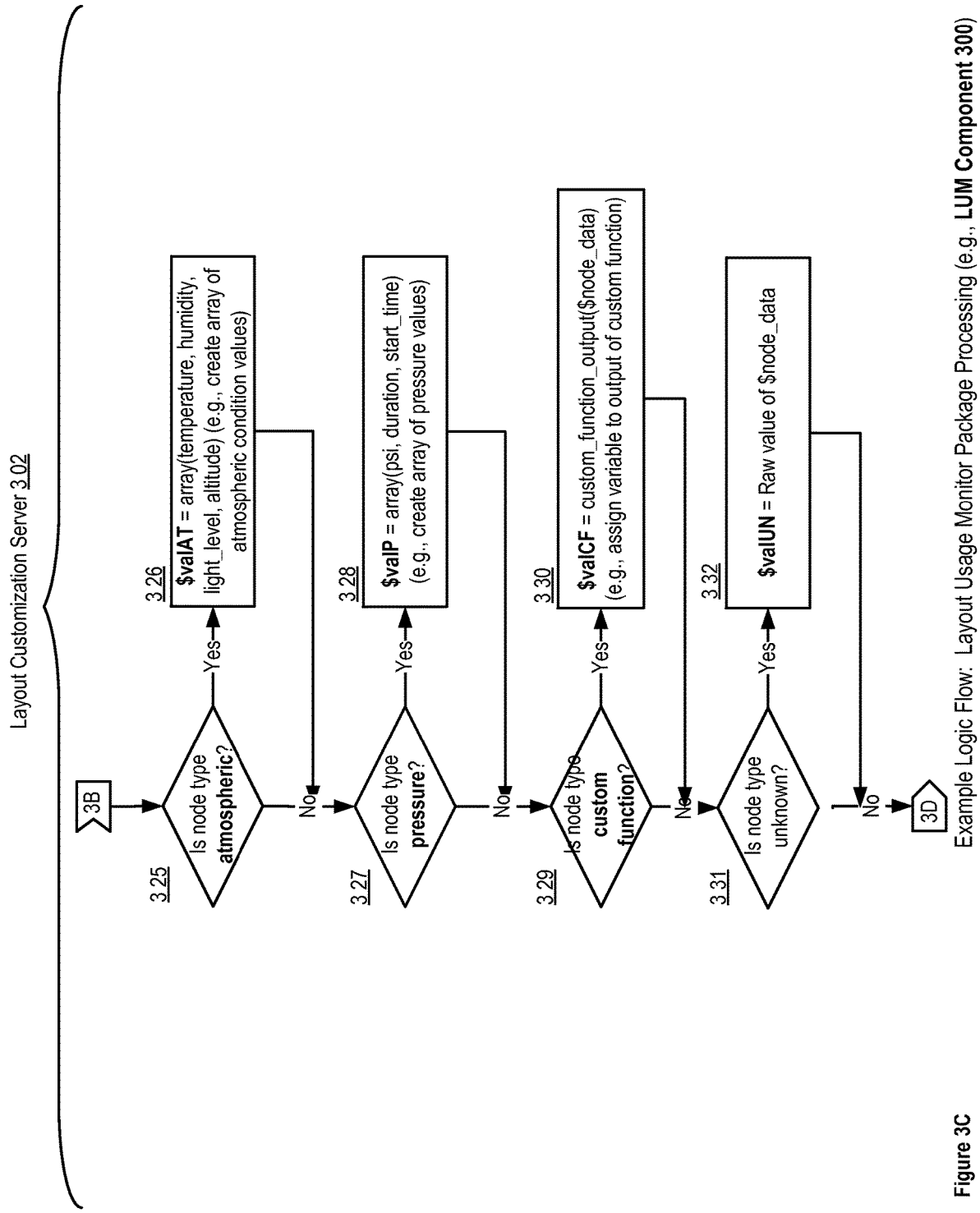

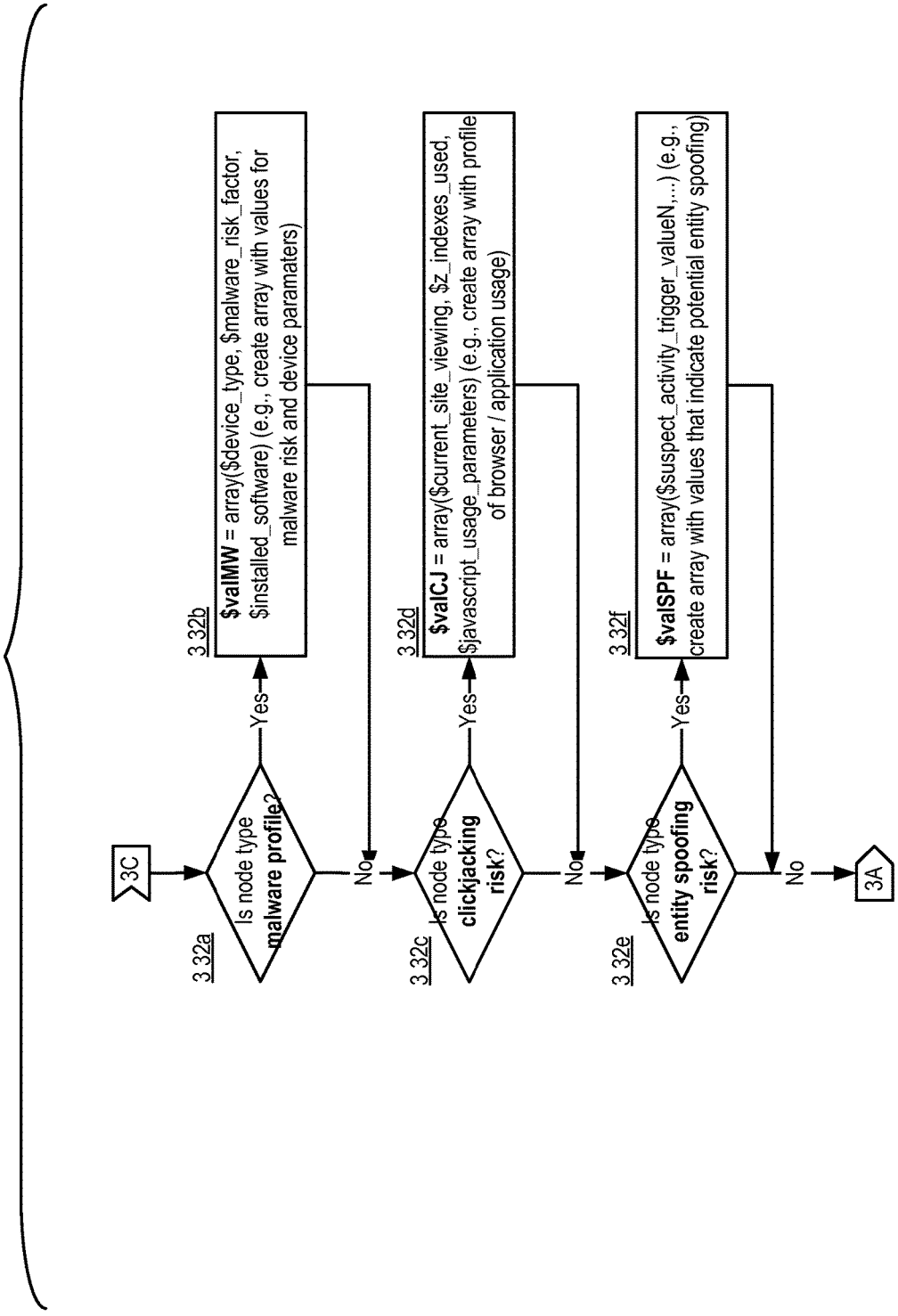
Figure 3D — Example Logic Flow: Layout Usage Monitor Package Processing (e.g., LUM Component 300)

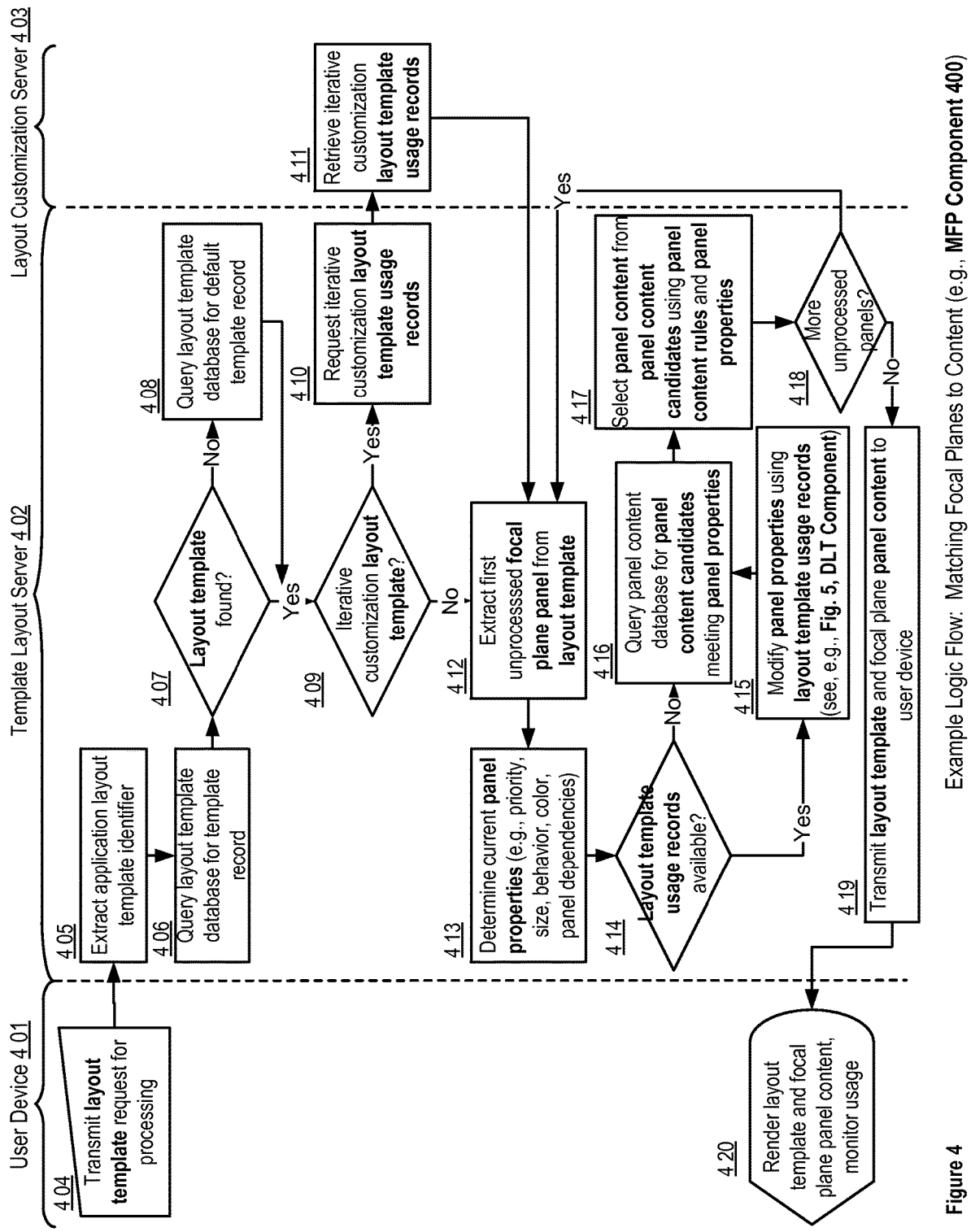
Figure 4 — Example Logic Flow: Matching Focal Planes to Content (e.g., MFP Component 400)

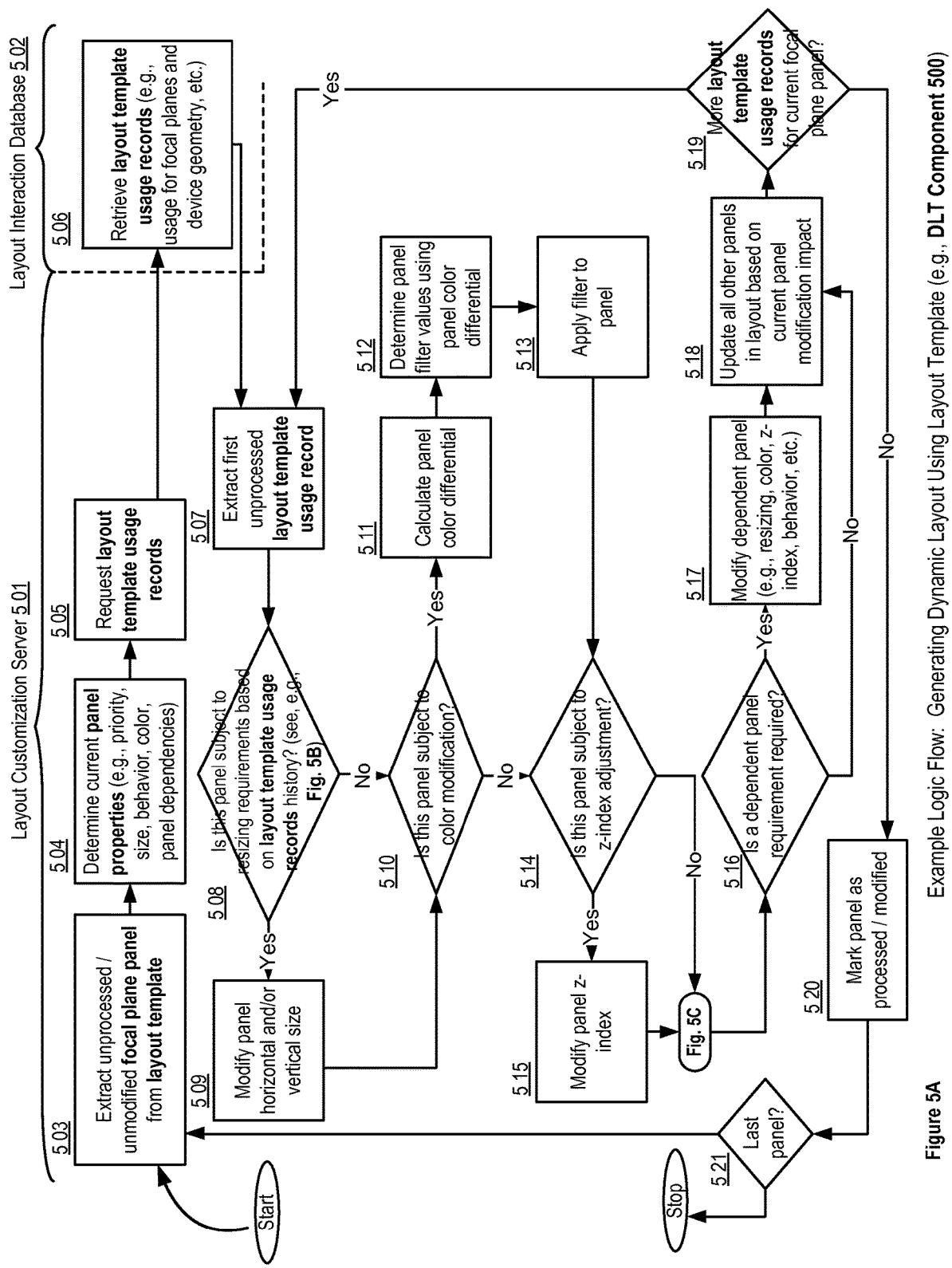
Figure 5A    Example Logic Flow: Generating Dynamic Layout Using Layout Template (e.g., DLT Component 500)

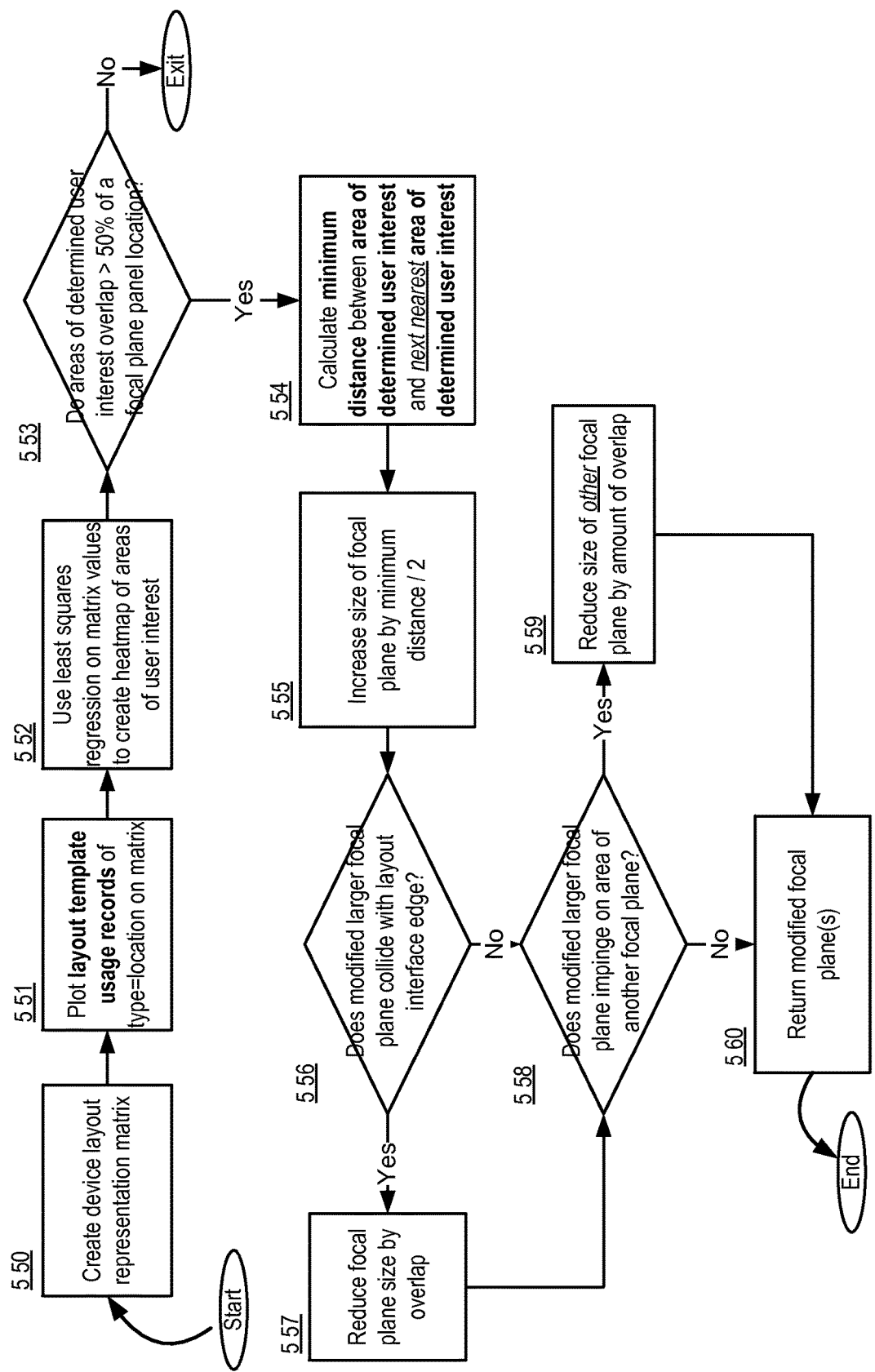
Figure 5B  Example Logic Flow: Modifying Focal Plane Sizes Using Layout Template Usage Records

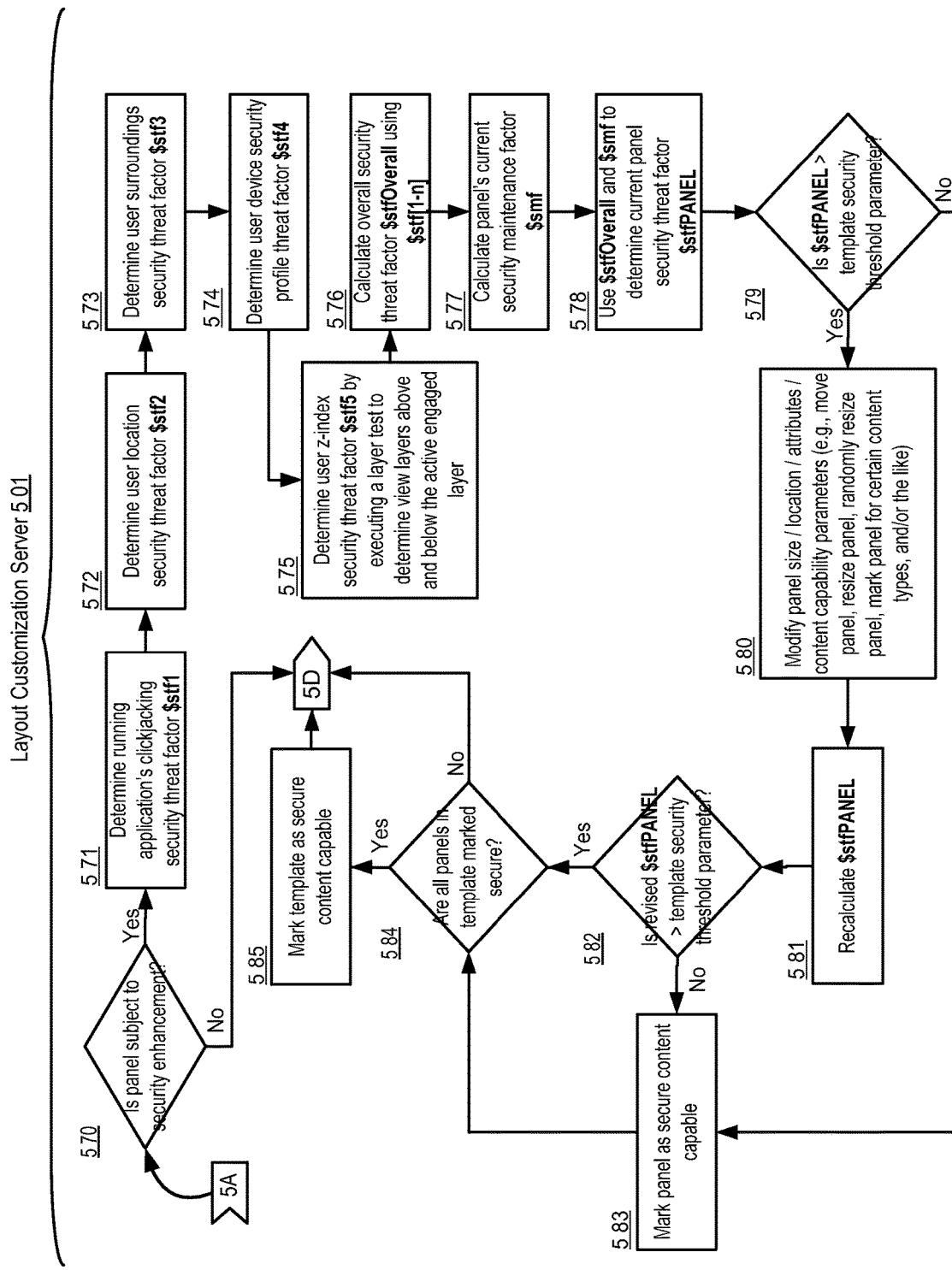
Figure 5C  Example Logic Flow: Generating Dynamic Layout Using Layout Template (e.g., DLT Component 500)

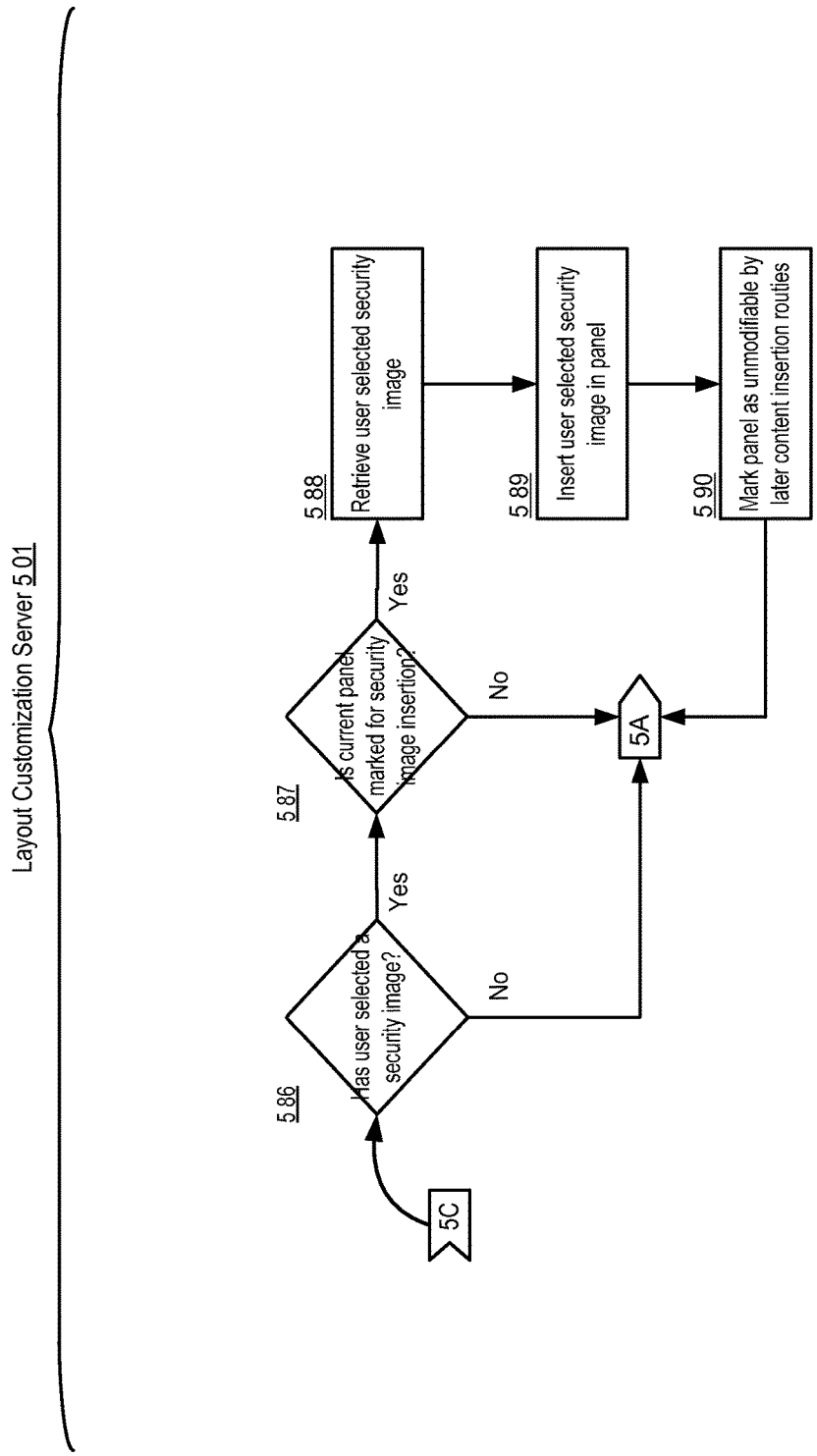
Figure 5D    Example Logic Flow: Generating Dynamic Layout Using Layout Template (e.g., DLT Component 500)

Example User Interface: User Intent Monitoring via Error Detection and Virtual Dynamic Layouts Example User Interface: User Intent Monitoring via Dynamic Panel Color Response Monitoring Figure 9 Example User Interface: User Intent Monitoring via Interaction Frequency Monitoring Example User Interface: User Intent Monitoring via Location and Motion Observation Example User Interface: User Intent Monitoring via Orientation Interaction Preferences Example User Interface: Jumping UI

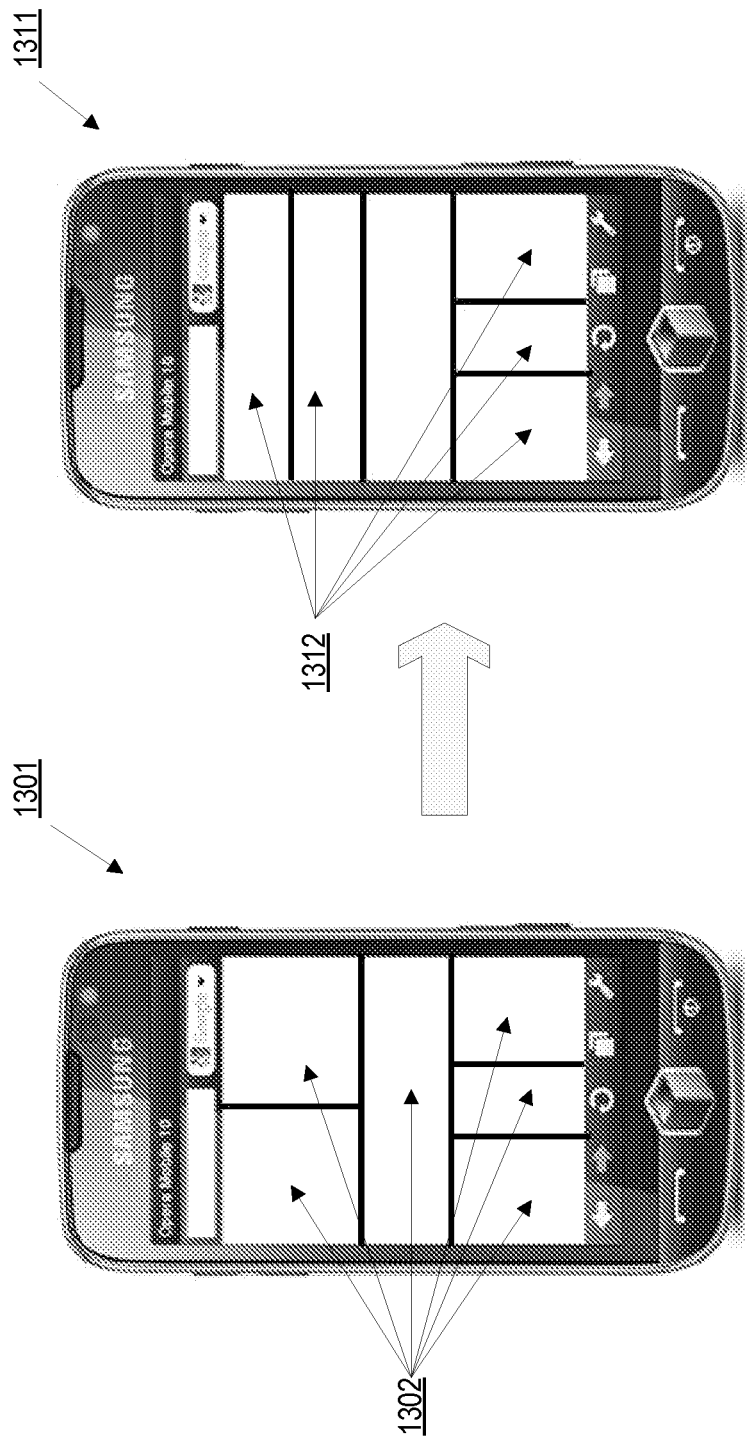
Figure 13A  Example User Interface: Jumping UI Web Mobile Interface Focal Planes Example User Interface: Jumping UI Web Mobile Interface Focal Planes

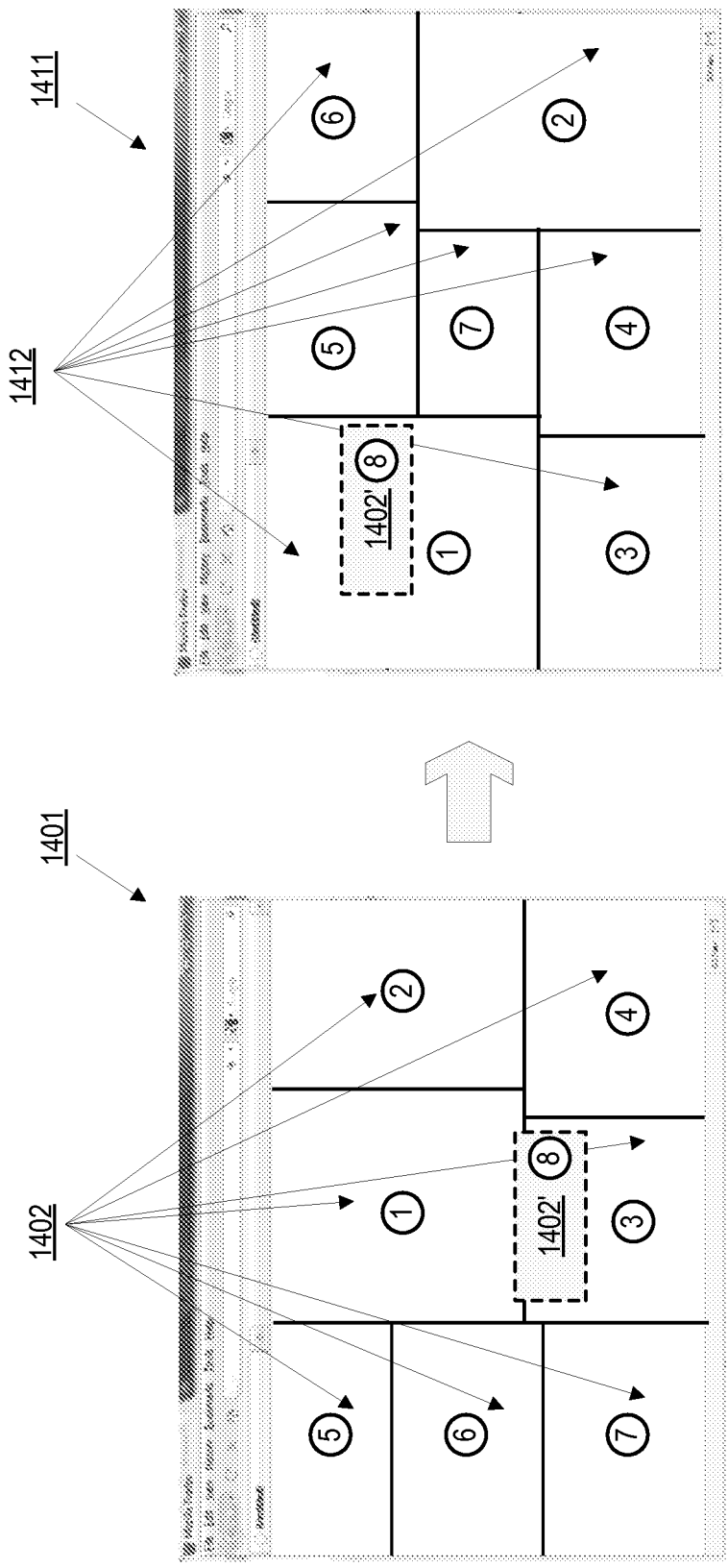
Figure 14A  Example User Interface: Jumping UI Web Interface Focal Planes Example User Interface: Jumping UI Web Interface With Adjacent Populated Focal Planes Example User Interface: Jumping UI Web Interface With Overlapping and Adjacent Populated Focal Planes

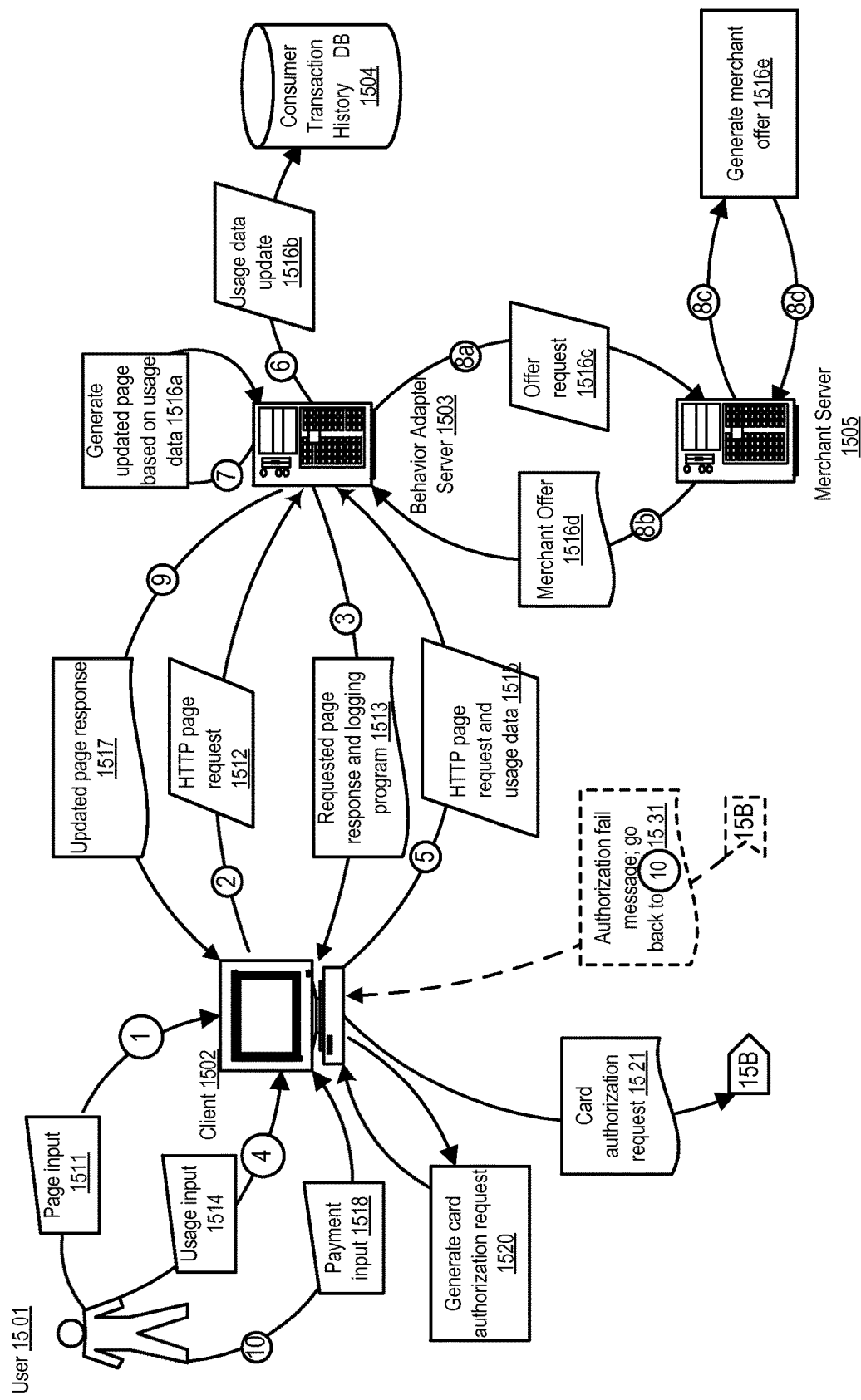
Figure 15A — Example Data Flow: Jumping UI Web System

Example Data Flow: Jumping UI Payment Procedure

Example Data Flow: Jumping UI Payment Procedure

Example Data Flow: Jumping UI Payment Procedure

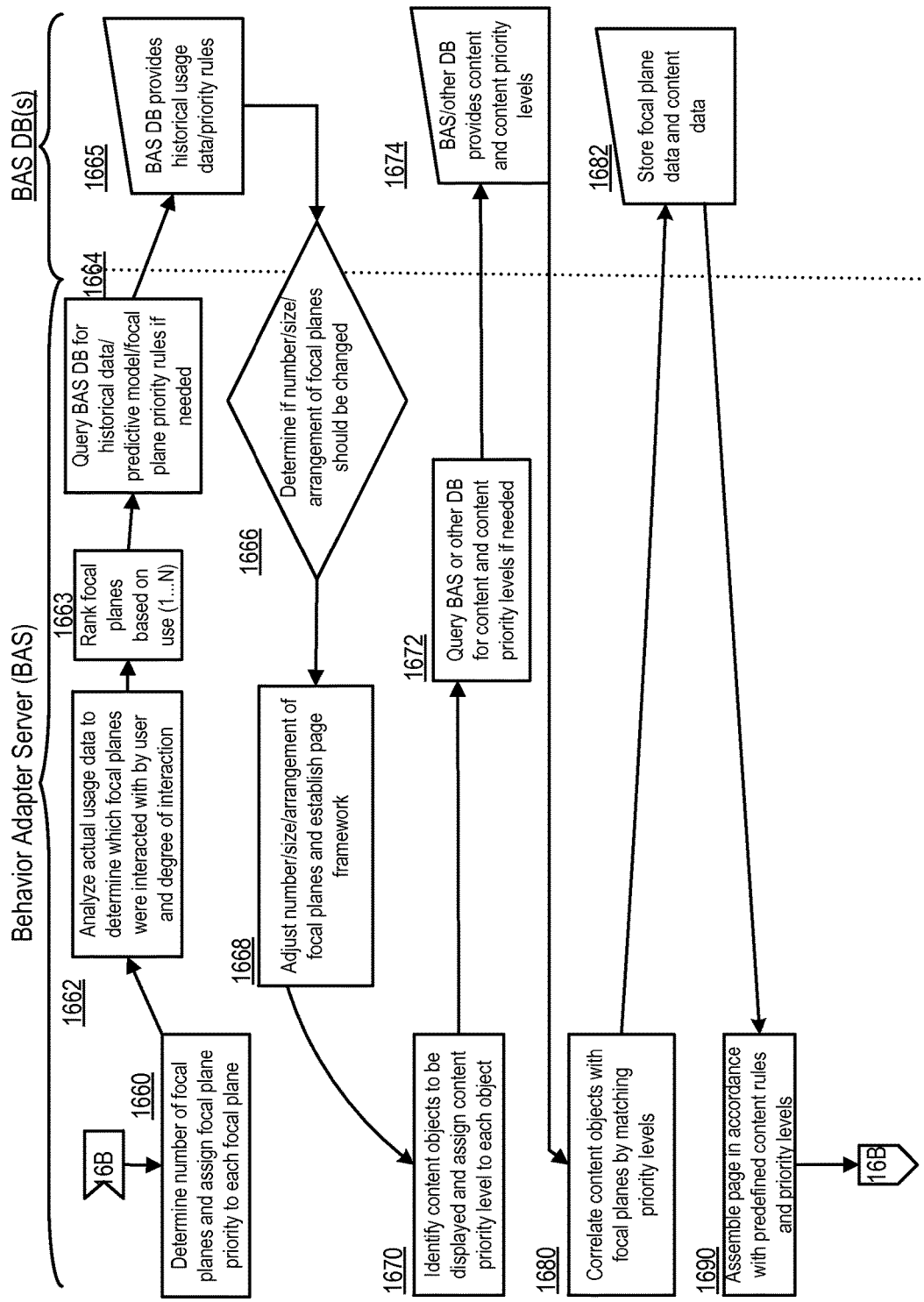
Figure 16C   Example: Jumping UI Page Rendering ("JUIPR") Component 1600b Example: Jumping UI Payment Execution ("JUIPE") component 1600c Example: Jumping UI Payment Execution ("JUIPE") component 1600c Example: Jumping UI Payment Execution ("JUIPE") component 1600c

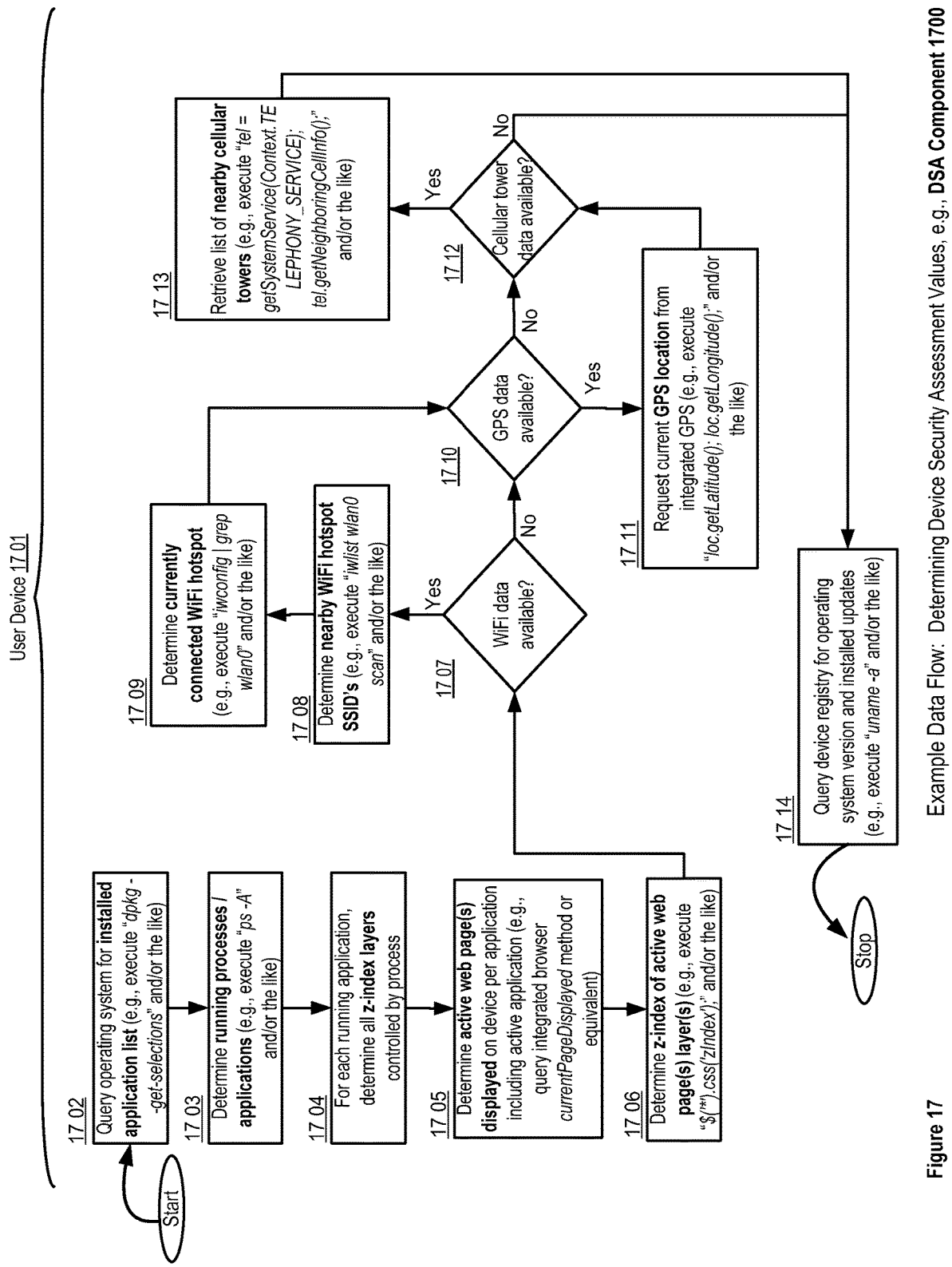
Figure 17    Example Data Flow: Determining Device Security Assessment Values, e.g., DSA Component 1700

SECURE DYNAMIC PAGE CONTENT AND LAYOUTS APPARATUSES, METHODS AND SYSTEMS

PRIORITY CLAIM

This application is a continuation of and claims priority under 35 U.S.C. § 120 to U.S. patent application Ser. No. 13/897,433, filed May 19, 2013, and entitled "Secure Dynamic Page Content and Layouts Apparatuses, Methods and Systems", which is a continuation-in-part and claims priority under 35 U.S.C. § 120 to U.S. patent application Ser. No. 13/737,917, filed Jan. 9, 2013 and entitled "Dynamic Page Content and Layouts Apparatuses, Methods and Systems," which is a non-provisional of and claims the benefit under 35 USC § 119 of: U.S. Provisional Patent Application Ser. No. 61/584,392 filed Jan. 9, 2012, entitled "Apparatuses, Methods and Systems for Providing Dynamic Page Content".

The entire contents of the aforementioned application(s) are expressly incorporated by reference herein.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address the assembly of user-facing pages, and more particularly, include SECURE DYNAMIC PAGE CONTENT AND LAYOUTS APPARATUSES, METHODS AND SYSTEMS.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Web pages are written in HTML (hypertext markup language) and are translated by a Web browser. Static web pages show the same content each time they are viewed. HTML code is provided by a web server, such that when the page is received at a user's browser, all that the browser need do is translate the HTML. Applications may be built having interfaces with layouts of interface widgets.

BRIEF DESCRIPTION OF THE DRAWINGS

The accompanying appendices and/or drawings illustrate various non-limiting, example, innovative aspects in accordance with the present descriptions:

FIG. 2A-B shows an example data flow illustrating aspects of dynamic layout and content, in one implementation of the DPCL operation;

FIGS. 3A-D show an example logic flow illustrating aspects of layout usage monitor package processing, e.g., an example LUM Component, in one implementation of the DPCL operation;

FIG. 4 shows an example logic flow illustrating aspects of matching focal planes to content, e.g., an example MFP Component, in one implementation of the DPCL operation;

FIGS. 5A-D show an example logic flow illustrating aspects of generating dynamic layout using a layout template, e.g., an example DLT Component, in one implementation of the DPCL operation;

FIGS. 13A-B show aspects of an exemplary DPCL user interface for a mobile device subdivided into a set of focal planes, illustrating a transformation in the configuration of the focal planes over time in accordance with the present disclosure, in one implementation of the DPCL operation;

FIGS. 14A-C show aspects of an exemplary DPCL user interface for a web browser subdivided into a set of adjacent focal planes with a floating focal plane disposed in a layer over the adjacent focal planes, illustrating a transformation in the configuration of the focal planes over time in accordance with the present disclosure, in one implementation of the DPCL operation;

FIGS. 15A-D show data flow diagrams illustrating aspects of embodiments of the DPCL user interface in accordance with the present disclosure, in one implementation of the DPCL operation;

FIGS. 16A-G show logic flow diagrams illustrating aspects of embodiments of the DPCL user interface in accordance with the present disclosure, in one implementation of the DPCL operation;

FIG. 17 shows a data flow diagram illustrating aspects of determining device security assessment values, e.g., an example DSA Component 1700 in one implementation of the DPCL operation;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

DPCL

The SECURE DYNAMIC PAGE CONTENT AND LAYOUTS APPARATUSES, METHODS AND SYSTEMS (hereinafter "DPCL" user interface) transform the framework and content of webpages, via DPCL components, in response to user browsing activities. In some embodiments, this is carried out in real time.

Figure 1A:
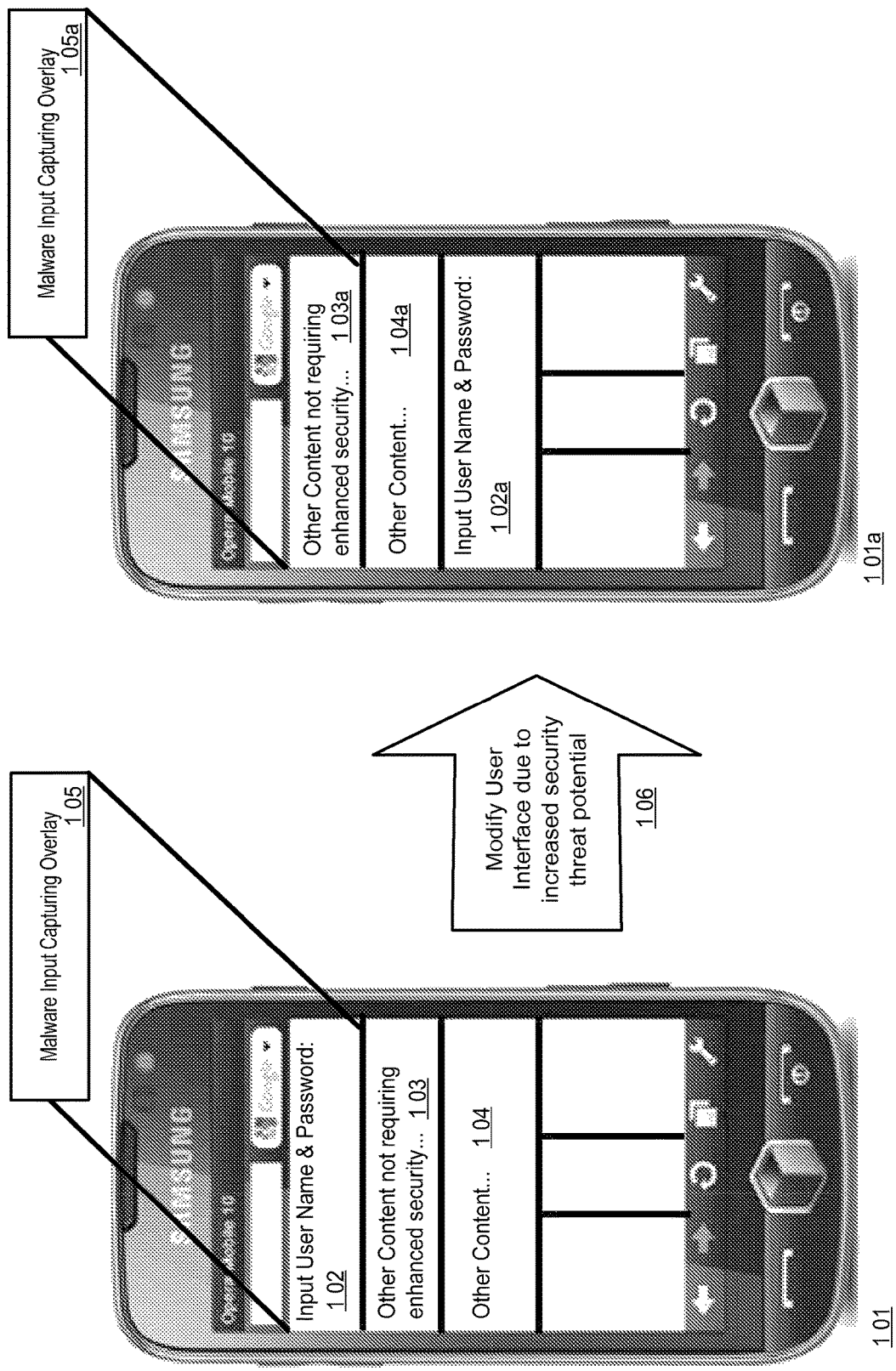
FIG. 1A-B shows an example block diagram illustrating aspects of the DPCL, in one implementation of the DPCL operation.

FIG. 1A shows a block diagram illustrating example aspects of security enhanced dynamic layout and content, in one embodiment of a DPCL. In one embodiment, a user device 101 may display a user interface. The interface may contain content that is sensitive, such as a username or password input box 102, a button that will transfer funds when pressed, and/or the like. The interface may also contain other view panels that have content that does not require heightened security or that is of lesser security risk as the high security content, e.g., 103, 104. In one embodiment, a malware application running on the device, a malware web page rendering on the device, and/or the like, may have an invisible or obscured overlay that is placed over the rendered user interface or portions of the interface such that the user is substantially unaware that the overlay is present, e.g., 105. In one embodiment, the malware overlay may attempt to "capture" a user's input into form fields (e.g., username/password, account numbers, social security numbers, and/or the like) or elements that are known or can be determined to be at a certain location on the user interface.

In one embodiment, the DPCL may determine that the user interface is subject to increased security requirements. The determination may be made based upon the location of a user, the applications running or installed on the user's device, the JavaScript code running on a web page, the configuration (e.g., z-index configuration and/or the like) of applications or web pages on the device, and/or the like. The user interface may be modified in response to the increased security threat potential, e.g., 106. Modification may include resizing view panels, rearranging content, randomizing content location, and/or the like. In one embodiment, the secure content, e.g., 102*a* may then appear at a different location in the user interface such that the malware overlay or monitoring function is substantially unaware that the content is not within the monitored area. Other content, e.g., 103*a*, 104*a*, may be substituted or moved under the malware overlay 105*a*, or that portion of the interface may be left blank or be highlighted/displayed to alert the user to the malware running on the device 101*a*.

Figure 1B:
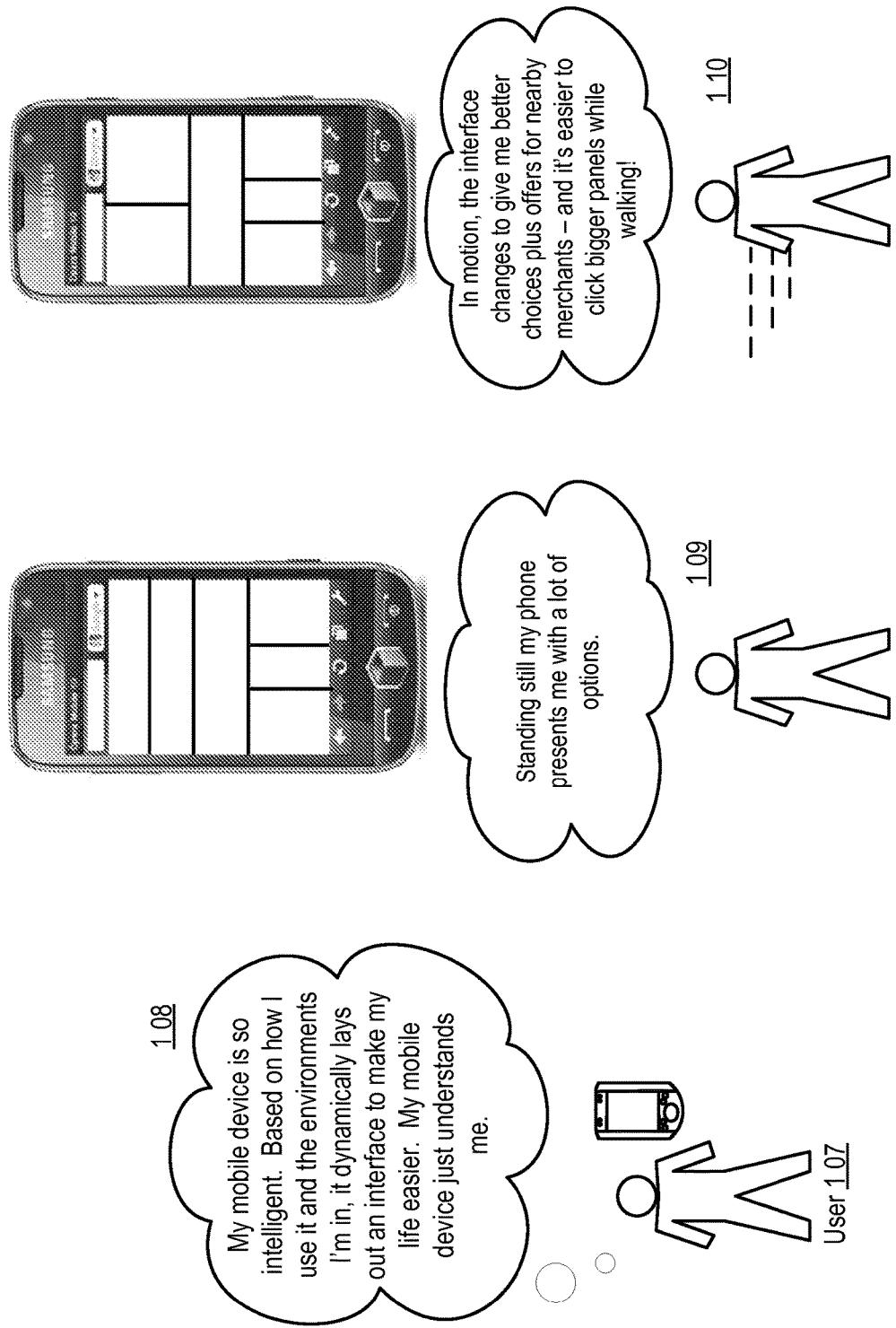

FIG. 1B shows a block diagram illustrating example aspects of a DPCL enabled mobile device, in some embodiments of the DPCL. In one embodiment, user 101 may have a mobile device displaying a DPCL layout. The mobile device may be configured to change layout in response to user interaction history, user motion, location, temperature, weather, eye tracking, and/or the like, e.g., 102. While standing in place, user 101 may be presented with a configured layout. In one embodiment, the layout consists of a series of non-overlapping or overlapping content areas described herein as focal planes, panels, and/or the like, e.g., 103. In one embodiment, when the user is in motion, the panels may dynamically reconfigure to give the user proximity based offers. In other examples, the layout changes based on the user's preferences. In still other layouts, certain panel areas change in shape, layout or configuration (e.g., behavior, content, and/or the like). In one embodiment, the panels reconfigure to allow the user to more easily select an option while in motion, such as by increasing the size of a panel in the region user most often uses while in motion, decreasing in size options that would not be relevant while in motion, and/or the like, e.g., 104.

FIGS. 2A-B are an example data flow illustrating dynamic layout and content, in one embodiment of the DPCL. In one embodiment, user 201 launches an application on a mobile device, 201*a*. The device may be any of an iPhone, smart phone, iPad, tablet, Android phone, personal laptop computer, and/or the like. In one embodiment, user 201 application renders a user interface layout in response to user input, e.g., 202. For example, user device 201*a* may send a base layout template request 203 to a template layout server 201. An example base layout template request 203, substantially in the form of an HTTP(S) POST message including XML-formatted data, is provided below:

```
POST /request_base_layout.php HTTP/1.1
Host: www.templatelayoutserver.com
Content-Type: Application/XML
Content-Length: 667
<?XML version = "1.0" encoding = "UTF-8"?>
<layout_request>
    <timestamp>2020-12-12 15:22:43</timestamp>
    <user_name>John Doe</user_name>
    <user_credentials>
        <password>secretpass1234</password>
        <private_key>h767kwjiwnfe456#@hnniimidrtsxbi</private_key>
    </user_credentials>
    <!- applications may have types (i.e., web app, java, etc.) ->
    application type="web_application">
        <device_requesting type="android _phone">
```

```
            <capability type="java" version="jdkl.1" />
            <capability type="flash" version="5.43" />
            <capability type="voice_recording" />
            <capability type="camera" resolution="9MP" />
        </device_requesting>
        <name>Mobile AppAwesome</name>
        <app_id>4354</app_id>
        <app_credentials>
            <public_key>kihbvwoihugyuftr</public_key>
        </app_credentials>
        <!- layouts may have types (i.e., flash, html5, jscript) ->
        <layout_requested type="html5">
            <layout_id>7645</layout_id>
            <requested_screen layout value="render_order_screen" />
            <is dynamic value="false" />
            <previous_layout_usage_history>
                <history>
                    <type value="tap" />
                    <data x="4.654" y="7.443" />
                </history>
            </previous_layout_usage_history>
        </layout_requested>
    </application>
</layout_request>
```

In one embodiment, the template layout server 201C will then retrieve a default base layout, e.g., 204 from a layout templates table. An example listing, substantially in the form of PHP/SQL commands, for QUERYING a layout templates database for a base layout template is provided below:

```
<?PHP
Header ('Content-Type: text/plain');
mysql_connect ("locaohost",$DBserver,$password); // access database server
mysql_selectdb ("layout_templates.sql");
//select applicable base layout table
$query = "SELECT template_id, template_content FROM layout_templates WHERE
    layout_template_type='$template_type' AND
    application_type='web_app' AND
    application_id=4354 AND
    capability_type = 'Java'";
$result = mysql_query ($query);
mysql_close ("layout_templates.sql"); // close database access
?>
```

The default layout may be used in cases where a user device is requesting an application view for the first time, where the user has indicated that their privacy preference is for the application not to track their view usage, and/or the like. The base layout template may, in some embodiments, be made up of a number of visual or virtual (hidden) content areas, panels, focus planes, and/or the like. The layout and/or rendering of the content to the user may be independent of the layout that the device recognizes (such as may be the case with virtual content areas). In some embodiments, the template layout server 201C may then match focal planes with content appropriate for the focal planes, e.g., 205. In one example, the focal plane matching is based on a user's interaction history with a focal plane in a given location on their mobile device. In another example, the matching is based on a user's purchase history (e.g., transaction history). Further details regarding matching focal planes with content may be found with respect to FIG. 4, e.g., MFP Component 400.

In one embodiment, the template layout server will respond to the user device with a base template layout response, e.g., 206. The base layout template response may contain information sufficient to allow the mobile device application to render a user interface, including focal planes and components of the user interface. In some embodiments, the user interface may be dynamic such that the layout template response 206, user device 201*a*, and/or the like define a logic that is responsive to outside stimuli in order to update the rendered layout. The stimuli may be any of the frequency of a user's interaction with a given content panel (or the layout as a whole), the time of day in which the user interacts with certain content panels, the content of a panel, the atmospheric conditions during the user interaction, and/or the like. An example base layout template response 206, substantially in the form of an HTTP(S) POST message including XML-formatted data, is provided below:

```
POST /layouttemplateresponse.php HTTP/1.1
Host: www.userdevice.com
Content-Type: Application/XML
Content-Length: 667
<?XML version = "1.0" encoding ="UTF-8"?>
<layout_response>
    <timestamp>2020-12-12 15:22:43</timestamp>
    <user_name>John Doe</user_name>
    <application type="web_application">
        <name>Mobile AppAwesome</name>
        <app_id>4354</app_id>
        <device_target value="android_phone" />
        <layout version="1.0">
            <layout_id value="876" />
            <is_default_layout value="true" />
            <layout_usage_rules>
                <use_when type="time_of_day" value="8:00am-9:00pm" />
                <use_when type="location" value="near_geography"
                        lat="45.5435" long="63.75643"distance="5mi" />
                <do_not_use_when type="connection" value="cellular" />
            </layout_usage_rules>
            <layout_content>
                <node id="1" height="2in" width="3.5in" zindex="4"
                        filter_color="#FFFF25" filter_intensity="50%"
                        node_type="htm 15">
                    <content type="text">
                        Click here to view offers.
                    </content>
                    <content type="html5">
                        <table border="0" height="2" width="3.5" zindex="4">
                        <tr><td bgcolor="#FFF25">
                            Click here to view offers.
                        </td></tr>
                        </table>
                    </content>
                    <content type="nib_file">
                    (class WindowController is
                    NSWindowController
                    (ivar (id) textField)
                    (imethod (id) init is
                    (self initWithWindowNibName:"Random")
                    ((self window) makeKeyAndOrderFront:self)self)
                    (imethod (void) seed: (id) sender is
                    (NuMath srandom: ((NSCalendarDate calendarDate)
                            timeIntervalSince1970))
                    (@textField setStringValue:
                            "Click here to view offers."))
                    (imethod (void) generate: (id) sender is
                    (@textField setIntValue: (NuMath random))))
                    </content>
                    <content type="nib_binary">
                        Z[YNSMaxSize_NSTextContainer\NSSharedData
                        YNSTVFlags]NSNextKeyView[NSSuperviewXN
                        SvFlagsZNSDelegate_SNextResponder[NS
                        FrameSize[NSDragTypes€@€€) €-CA
                        CmWNSFrameYNScvFlagsXNSCursor...
                    </content>
                    <type value="visual" />
                    <monitor type="interaction">
                        <trigger>click</trigger>
                        <trigger min_length="2in">swipe</trigger>
                        <trigger>double_click</trigger>
                    </monitor>
                </node>
                <node id="2" height="1.8in" width="2.5in" zindex="5"
                        filter_color="#FFFF25" filter_intensity="50%"
                        node_type="image_stream">
                    <content type="image" loc="https://www.../img.png" />
                    <content type="binary image stream"format="png">
                        EQ±"˝Š*b'&¢ ÒQzï ŏ,, ŏžl/ÿï»³Eê{ÞßÓçÞC'Ý
                        ÚO%Î&ﬂáp9íÒnw ™Í6§Uát ™.~èōr›OUæ¤ ŏ,¡ -
                        ˜¶òQËý¼T0 "âï-, N -ˆ ´éÒ"U2Ëe2Ð?
                        U¤ÝdGqEOÏ, 2«3 ·Äj ¦-²"Uz `ŏÏ´9\)t°tÚÒh;O
                        [*mà´Ù=
                    </content>
                    <type value="virtual" />
                    <monitor type="atmospheric">
                        <trigger type="temperature">
                            <value>is >= 80deg</value>
                            <action type="apply_color_filter" value="#00FF22">
                            <action type="update_node_display"
```

```
                    value="It's getting hot in here!" />
                <action type="resize_node_x" value="+5%" />
                <action type="resize_node_y" value="+10%" />
            </trigger>
            <trigger min_length="2in">swipe</trigger>
            <trigger>double_click</trigger>
        </monitor>
    </node>
    <node>
        ...
    </node>
    </layout_content>
</layout>
<layout>
    ...
</layout>
</application>
</layout_response>
```

In one embodiment, the user device 201a may then render the template. Rendering may be accomplished by an open source renderer, such as WebKit, rendered using libraries accompanying the requesting application, through underlying operating system render calls, or through an integrated parser such as that described with respect to FIG. 18. Once rendered, the user may be presented with an interface based on the rendered layout, e.g., 207, and may then interact with the base interface, e.g., 208. In some examples, the user mobile device will automatically monitor the surroundings and create usage input, e.g., 208 automatically with no user interaction. In one embodiment, interaction monitoring is accomplished by the use of integrated application or operating system procedure calls. An example operating system monitoring procedure call to monitor the input of text into an interface element in iOS is the textFieldDidEndEditing (UITextField) method call. In another embodiment, monitoring may be accomplished by using a third party open source JavaScript library suitable for event listening, such as jQuery Mobile. In one embodiment, an application may track usage by instantiating a native object version of jQuery Mobile. The usage monitoring output may take the form of an array containing a series of tagged cartesian coordinates and supplemental occurrence data such as a timestamp, pressure reading, and/or the like (e.g., array(array(3.7,2.5, 2:00:05 pm), array(2.8,2.5,2:00:07 pm, 5 psi)). Other processes or program software components on the user device or elsewhere in the DPCL may additionally create layout usage input 208. In some embodiments, the user device may store interaction data and periodically send it to the layout customization server 201b. In other embodiments, the user device may real-time stream the layout usage input.

In one embodiment, the user device 201a will create a usage monitor package containing multiple usage records, e.g., 209. These records may represent the user's interaction with the mobile device, such as a click, swipe, tap, double-tap, and/or the like. Additionally, the usage data may contain device monitored data such as the time of day when a user interaction occurred, the temperature, the location of the user (using, e.g., integrated GPS), and/or the like. In one embodiment, a layout monitor package is transmitted from the user device 201a to the layout customization server 201b, e.g., 210. An example layout monitor package 210, substantially in the form of an HTTP(S) POST message including XML-formatted data, is provided below:

```
POST /layout_monitor.php HTTP/1.1
Host: www.layoutcustomizationserver.com
Content-Type: Application/XML
Content-Length: 667
<?XML version = "1.0" encoding ="UTF-8"?>
<layout_monitor_package>
    <application id="4354">
        <layout_id value="876">
            <interaction type="swipe" x_start="2.5"y_start="1.43"
                    length_swipe="2in" time="04-04-2020 12:12:12 EST">
                <data_node type="location">
                    <lat value="43.654" />
                    <long value="23.654" />
                </data_node>
                <data_node type="velocity" value="2_inch_per_sec" />
                <data_node type="content_descriptor" />
                    <type="visual">
                    <content mode="animation">
                        <img seq="1" name="buy_button_start">
                        <img seq="2" name="buy_button_2" duration="2sec">
                        <img seq="3" name="buy_button_3" duration="1sec">
                        <img seq="4" name="buy_button_animation_end">
                    </content>
                </data_node>
                <data_node type="orientation" x_orient="54" y_orient="12"
                        z_orient="33" />
                <data_node type="focal_plane_color">
                    <color_average_red>232</color_average_red>
```

```
            <color_average_blue>100</color_average_blue>
            <color_average_green>20</color_average_green>
        </data_node>
        <data_node type="focal_plane size" x="2.5" y="1.7" />
        <data_node type="virtual_focal_plane_size"
            x="2.75" y="2.95" />
    </interaction>
    <interaction type="tap" x="2.5" y="1.43"
            time="04-04-2020 12:12:12 EST">
        <data_node type="text" />
        <type="visual">
        <content>
            Click here to view offers in your viscinity!
        </content>
    </interaction>
    <interaction>
        ...
    </interaction>
    </layout>
    </application>
    <application>
        ...
    </application>
</layout_monitor_package>
```

In one embodiment, the layout customization server 201b will then extract and process the layout usage information and monitoring information from the layout usage monitor package 210. Further detail regarding the processing of the layout usage monitor package may be found with respect to FIG. 3A-C, e.g., LUM Component 300. In one embodiment, the layout customization server may reply with a layout usage monitor response, indicating to the user device 201a that the layout usage monitoring package has been received and/or processed and optionally updating the layout (e.g., by optionally sending an updated layout template 203, 219), e.g., 212.

In one embodiment, user device 201a may update the currently rendered layout with a dynamic layout. In one example, the user device sends a dynamic layout template request 213 to the template layout server 201c. The dynamic layout template request may be any of a full request, such as that shown herein with respect to base layout template request 203, a partial template request (for generating only part of a dynamic template), a full dynamic template request, and/or the like. An example dynamic template layout request 213, substantially in the form of an HTTP(S) POST message including XML-formatted data, is provided below:

```
POST /request_dynamic_layout.php HTTP/1.1
Host: www.templatelayoutserver.com
Content-Type: Application/XML
Content-Length: 667
<?XML version = "1.0" encoding ="UTF-8"?>
<dynamic_layout_request>
    <timestamp>2020-12-12 15:22:43</timestamp>
    <user_name>John Doe</user_name>
    <user_credentials>
        <password>secretpass1234</password>
        <private_key>h767kwjiwnfe456#@hnniimidrtsxbi</private key>
    </user_credentials>
    <application type="web_application">
        <name>Mobile AppAwesome</name>
        <app_id>4354</app_id>
        <app_credentials>
            <public_key>kihbvwoihugyuftr</public_key>
        </app_credentials>
        <layout_requested type="flash">
            <layout_id>9765</layout_id>
            <current_layout_version value="3.32" />
            <requested_screen_layout value="render_order_screen" />
            <is_dynamic value="true" />
        </layout_requested>
    </application>
</dynamic_layout_request>
```

In another embodiment, an example dynamic template layout request 213, substantially in the form of an HTTP(S) POST message including XML-formatted data, may be:

```
POST /request_dynamic_layout.php HTTP/1.1
Host: www.templatelayoutserver.com
Content-Type: Application/XML
Content-Length: 667
<?XML version = "1.0" encoding ="UTF-8"?>
<dynamic_layout_request>
    <timestamp>2020-12-12 15:22:43</timestamp>
    <user_name>John Doe</user_name>
    <user_credentials>
        <password>secretpass1234</password>
        <private_key>h767kwjiwnfe456#@hnniimidrtsxbi</private_key>
    </user_credentials>
    <device type="iPhone" id="E654654" />
    <application type="web_application">
        <name>Mobile AppAwesome</name>
        <app_id>4354</app_id>
        <app_credentials>
            <public_key>kihbvwoihugyuftr</public_key>
    </app_credentials>
    <merchant id="765653" />
    <layout_requested type="flash">
        <layout_id>9765</layout_id>
        <current_layout_version value="3.32" />
        <requested_screen_layout value="render_order_screen" />
        <is_dynamic value="true" />
    </layout_requested>
    <security_assessment_values>
        <device>
            <operating_system_name="OS-X"
                              version="10.54"
                              all_patches_applied="no" />
            <installed_software>
                <installed type="app"
                              name="MalwareApp"
                              running="true"
                              sha256_hash="TDRERESREDRTEDRESR"
                              trusted=" false"
                              id="65654" />
                <installed type="app"
                              name="AnotherApp"
                              running=" false"
                              sha256_hash="UYGTRDRERETCDFYTGH"
                              trusted="true"
                              id="34224" />
                <installed type="app"
                              name="vWallet"
                              running="true"
                              sha256_hash="CTGCREDTFCGYBGFTRD"
                              trusted="true"
                              id="65487" />
            </installed_software>
        </device>
        <user_interface_configuration>
            <num z indexes val="4" />
            <z_index_status>
                <z id="1" visible="no" app_controlling="MalwareApp"
                              capturing_input="yes" />
                <z id="2" visible="yes" app_controlling="vWallet"
                              capturing_input="no" />
                <z id="3" visible="yes" app_controlling="vWallet"
                              capturing_input="no" />
                <z id="4" visible="yes" app_controlling="OS"
                              capturing_input="yes" />
            </z_index_status>
        </user_interface_configuration>
        <user_interface_browser_configuration>
            <browser id="1" num_pages="2">

<z_index_status>
                        <z id="1" visible="no"
                                      site_ controlling="MalwareSite"
                                      capturing_input="yes" />
                        <z id="2" visible="yes"
                                      site_ controlling="vWalletSite"
                                      capturing_input="no" />
                        <z id="3" visible="yes"
```

```
                        site_controlling="MerchantSite"
                        capturing_input="no" />
                </z_index_status>

...

</browser>
        <browser id="2">
            ...
        </browser>
    </user_interface_browser_configuration>
    <user>
        <user_specified_security_risk_level val="60/100" />
        <last_action_taken type="launch_app" val="id:65654" />
    </user>
    <surroundings>
        <nearby_wifi_hotspots>
            <hotspot ssid="wififorfree" secure="no" />
            <hotspot ssid="corporatewifi" secure="yes"
                                    connected="yes" />
            ...
        </nearby_wifi_hotspots>
        <nearby_cellular_towers>
            <tower id="5653543" loc_lat="23.876" loc_lon="3.867"
                    loc_z="100meters" active="true" connected="true" />
            <tower id="4324322" loc_lat="23.742" loc_lon="3.342"
                    loc_z="54meters" active="true" connected="false" />
            ...
        </nearby_cellular_towers>
        <nearby_users>
            <user type="known_bad_user"
                            determined_by="device_signature"
                            EMID="7657657657" />
            ...
        </nearby_users>
        <device_firewall_intrusion_attempts>
            <attempt time="2020-12-02 12:12:01"
                        exploit="UDP ping vulnerability #765765" />
            ...
        </device_firewall_intrusion_attempts>
    </surroundings>
    </security_assessment_values>
    </application>
</dynamic_layout_request>
```

In one embodiment, the template layout server 201C may retrieve a dynamically capable layout template record for customization, e.g., 214. In one embodiment, a command sufficient to retrieve a dynamically capable layout template record for customization, substantially in the form of PHP/SQL statements, may be found with reference to 204. In one example, this record is equivalent in content to that retrieved as the base layout template 204. In other embodiments, the dynamically capable layout template is different from the base layout template, or derived from the base layout template (e.g., by applying a custom user defined function to the base layout template record(s)).

The data flow then continues with respect to FIG. 2B. In one embodiment, the template layout server 201C sends a dynamic layout template customization request, e.g., 215 to a layout customization server 201*b*. The customization request may contain the layout template to be customized, a pointer to allow the customization server to retrieve the layout template, and/or the like. An example dynamic layout template customization request 215, substantially in the form of an HTTP(S) POST message including XML-formatted data, is provided below:

```
POST /dynamic_layout_customization_request.php HTTP/1.1
Host: www.layoutcustomizationserver.com
Content-Type: Application/XML
Content-Length: 667
<?XML version = "1.0" encoding ="UTF-8"?>
<dynamic_layout_template_customization_request>
    <timestamp>2020-12-12 15:22:43</timestamp>
    <user_name>John Doe</user_name>
    <application>
        <name>Mobile AppAwesome</name>
        <app_id>4354</app_id>
        <layout_to_customize version="1.0">
        <layout_id value="876" />
        <customizations_to_apply>
            <customization type="insert_local_offers" />
```

```
                <customization type="update_based_on_user_location" />
                <customization type="update_based_on_purchase_history" />
        </customizations_to_apply>
        <current_layout_content>
            <node id="1" height="2.5in" width="3.5in" zindex="4"
                    filter_color="#FFFF25" filter_intensity="50%">
                <content type="text">
                        Click here to view offers.
                </content>
                <content type="html5">
                        <table border="0" height="2" width="3.5" zindex="4">
                        <tr><td bgcolor="#FFF25">
                            Click here to view offers.
                        </td></tr>
                        </table>
                </content>
                <content type="nib_file">
                        (class WindowController is
                        NSWindowController
                        (ivar (id) textField)
                        (imethod (id) init is
                        (self initWithWindowNibName:"Random")
                        ((self window) makeKeyAndOrderFront:self)self)
                        (imethod (void) seed: (id) sender is
                        (NuMath srandom: ((NSCalendarDate calendarDate)
                            timeIntervalSince1970))
                        (@textField setStringValue:
                            "Click here to view offers."))
                        (imethod (void) generate: (id) sender is
                        (@textField setIntValue: (NuMath random))))
                </content>
                <content type="nib_binary">
                        Z[YNSMaxSize_NSTextContainer\NSSharedData
                        YNSTVFlags] NSNextKeyView[NSSuperviewXN
                        SvFlagsZNSDelegate_SNextResponder[NS
                        FrameSize_[NSDragTypes€@€€)€-€A
                        €mWNSFrameYNScvFlagsXNSCursor...
                </content>
                <type value="visual" />
                <monitor type="interaction">
                        <trigger>click</trigger>
                        <trigger min_length="2in">swipe</trigger>
                        <trigger>double_click</trigger>
                </monitor>
            </node>
            <node id="2" height="1in" width="2.5in" zindex="5"
                    filter_color="#FFFF25" filter_intensity="50%">
                <content type="text">
                    Click here to view offers.
                </content>
                <type value="virtual" />
                <monitor type="atmospheric">
                    <trigger type="temperature">
                        <value>is >= 80deg</value>
                        <action type="apply_color_filter" value="#00FF22">
                        <action type="update_node_display"
                                value="It's getting hot in here!" />
                        <action type="resize_node_x" value="+5%" />
                        <action type="resize_node_y" value="+10%" />
                    </trigger>
                    <trigger min_length="2in">swipe</trigger>
                    <trigger>double_click</trigger>
                </monitor>
            </node>
            <node>
                ...
            </node>
        </current_layout_content>
    </layout_to_customize>
<layout_to_customize>
    ...
</layout_to_customize>
<security_assessment_values>
    <device>
        <operating_system name="OS-X"
                        version="10.54"
                        all_patches_applied="no" />
        <installed_software>
            <installed type="app"
```

```
                            name="MalwareApp"
                            running="true"
                            sha256_hash="TDRERESREDRTEDRESR"
                            trusted=" false"
                            id="65654" />
            <installed type="app"
                            name="AnotherApp"
                            running=" false"
                            sha256_hash="UYGTRDRERETCDFYTGH"
                            trusted="true"
                            id="34224" />
            <installed type="app"
                            name="vWallet"
                            running="true"
                            sha256_hash="CTGCREDTFCGYBGFTRD"
                            trusted="true"
                            id="65487" />
        </installed_software>
    </device>
    <user_interface_configuration>
        <num z_indexes val="4" />
        <z_index_status>
            <z id="1" visible="no" app_controlling="MalwareApp"
                                        capturing_input="yes" />
            <z id="2" visible="yes" app_controlling="vWallet"
                                        capturing_input="no" />
            <z id="3" visible="yes" app_controlling="vWallet"
                                        capturing_input="no" />
            <z id="4" visible="yes" app_controlling="OS"
                                        capturing_input="yes" />
        </z_index_status>
    </user_interface_configuration>
    <user_interface_browser_configuration>
        <browser id="1" num_pages="2">

<z_index_status>
                    <z id="1" visible="no"
                                site_controlling="MalwareSite"
                                capturing_input="yes" />
                    <z id="2" visible="yes"
                                site_controlling="vWalletSite"
                                capturing_input="no" />
                    <z id="3" visible="yes"
                                site_controlling="MerchantSite"
                                capturing_input="no" />
                </z_index_status>

...

</browser>
        <browser id="2">
            ...
        </browser>
    </user_interface_browser_configuration>
    <user>
        <user_specified_security_risk_level val="60/100" />
        <last_action_taken type="launch_app" val="id:65654" />
    </user>
    <surroundings>
        <nearby_wifi_hotspots>
            <hotspot ssid="wififorfree" secure="no" />
            <hotspot ssid="corporatewifi" secure="yes"
                                                connected="yes" />
            ...
        </nearby_wifi_hotspots>
        <nearby_cellular_towers>
            <tower id="5653543" loc_lat="23.876" loc_lon="3.867"
                    loc_z="100meters" active="true" connected="true" />
            <tower id="4324322" loc_lat="23.742" loc_lon="3.342"
                    loc_z="54meters" active="true" connected=" false" />
            ...
        </nearby_cellular_towers>
        <nearby_users>
            <user type="known_bad_user"
                    determined_by="device_signature"
                    EMID="7657657657" />
            ...
        </nearby_users>
```

```
            <device_firewall_intrusion_attempts>
                <attempt time="2020-12-02 12:12:01"
                        exploit="UDP ping vulnerability #765765" />
                ...
            </device_firewall_intrusion_attempts>
        </surroundings>
    </security_assessment_values>
    </application>
</dynamic_layout_template_customization_request>
```

In one embodiment, the layout customization server may then customize the dynamic layout template, e.g., 216. Customization may be any of element resizing (e.g., content panel resizing, scaling, content fitting, and/or the like), layout scaling, determining a different layout based on user's purchase history, inserting advertising elements into the layout, determining a preferred content set for display in the layout (e.g., content promoting offers, flash deals, news event summaries, weather, and/or the like). Further detail regarding generating/customizing dynamic layout templates may be found with respect to FIG. 5, e.g., DLT Component 500.

In one embodiment, the layout customization server will then provide a modified layout template to the template layout server 201C. The dynamic layout customization response 217 may contain additional elements not present in the dynamic layout customization request 215, may contain modified elements, may be a default template, or may be an unmodified version of the dynamic layout template customization request. An example dynamic layout template customization response 217, substantially in the form of an HTTP(S) POST message including XML-formatted data, is provided below:

```
POST /dynamic_layout_template_customization_response.php HTTP/1.1
Host: www.templatelayoutserver.com
Content-Type: Application/XML
Content-Length: 667
<?XML version = "1.0" encoding = "UTF-8"?>
<dynamic_layout_template_customization_response>
    <timestamp>2020-12-12 15:22:43</timestamp>
    <user_name>John Doe</user_name>
    <application>
        <name>Mobile AppAwesome</name>
        <app_id>4354</app_id>
        <layout_customized version="1.0">
            <layout_id value="876" />
            <customizations_applied>
                <customization type="insert_local_offers" />
                <customization type="update_based_on_user_location" />
                <customization type="update_based_on_purchase_history" />
            </customizations_applied>
            <modified_layout_content>
                <node id="1" height="3.5in" width="5in" zindex="8"
                        filter_color="#FFFF25" filter_intensity="5%">
                    <content type="text">
                        We noticed you are moving, so all elements
                        have been scaled up on your device.
                    </content>
                    <content type="html5">
                        <table border="0" height="3.5" width="5" zindex="8">
                        <tr><td bgcolor="#FFF25">
                            We noticed you are moving, so all elements
                        have been scaled up on your device.
                        </td></tr>
                        </table>
                    </content>
                    <content type="nib_file">
                        (class WindowController is
                        NSWindowController
                        (ivar (id) textField)
                        (imethod (id) init is
                        (self initWithWindowNibName:"Random")
                        ((self window) makeKeyAndOrderFront:self)self)
                        (imethod (void) seed: (id) sender is
                        (NuMath srandom: ((NSCalendarDate calendarDate)
                                timeIntervalSince1970))
                        (@textField setStringValue:
                            "We noticed you are moving, so all elements
                        have been scaled up on your device."))
                        (imethod (void) generate: (id) sender is
                        (@textField setIntValue: (NuMath random))))
                    </content>
                    <content type="nib_binary">
                        Z[YNSMaxSize_NSTextContainer\NSSharedData
```

```
                YNSTVFlags] NSNextKeyView [NSSuperviewXN
                SvFlagsZNSDelegate_SNextResponder[NS
                FrameSize[NSDragTypes€@€€) €-€A
                €mWNSFrameYNScvFlagsXNSCursor...
            </content>
            <type value="visual" />
            <monitor type="interaction">
                <trigger>click</trigger>
                <trigger min_length="2in">swipe</trigger>
                <trigger>double_click</trigger>
            </monitor>
        </node>
        <node id="2" height="1in" width="2.5in" zindex="5"
                Filter_color="#FFFF25" filter intensity="50%">
            <content type="text">
                There is a pizza place offering a deal near you now!
            </content>
            <type value="virtual" />
            <monitor type="atmospheric">
                <trigger type="temperature">
                    <value>is >= 80deg</value>
                    <action type="apply_color_filter" value="#00FF22">
                    <action type="update_node_display"
                            value="It's getting hot in here!" />
                    <action type="resiz_ node_x" value="+5%" />
                    <action type="resize_node_y" value="+10%" />
                </trigger>
                <trigger min_length="2in">swipe</trigger>
                <trigger>double_click</trigger>
            </monitor>
        </node>
        <node>
            ...
        </node>
    </modified_layout_content>
  </layout_customized>
  <layout_customized>
    ...
  </layout customized>
 </application>
</dynamic_layout_template_customization_response>
```

In one embodiment, the template layout server may store the dynamic layout template customization response 217 (or only the dynamic layout template itself) in a local database for further customization, e.g., 218. An example listing, substantially in the form of PHP/SQL commands, for storing a dynamic layout customization response in a layout template database is provided below:

```
<?PHP
Header ('Content-Type: text/plain');
mysql_connect ("locaohost",$DBserver,$password); // access database server
mysql_select_db ("layout_templates.sql");
//create variable to hold response
$response_to_store = '<dynamic_layout_customization_response>
        ...response_content...
        </dynamic_layout_customization_response>';
//make response safe for database insertion
$response_to_store = addslashes ($response_to_store);
// insert dynamic layout customization response
$query = "INSERT into layout_templates (layout_id, user_id,
        dynamic_template_customization_response) VALUES
    ($layout_id, $user_id, $response_to_store)";
$result = mysql_query ($query);
mysql_close ("ARBITRATORS.SQL");
?>
```

Such iterative customization may allow layout response improvement (e.g., user engagement, sales using mobile device, user ratings of mobile device experience) greater than a single round of layout customization. In an iterative version of the DPCL, the modified layout template record may be retrieved at a later time and passed again to the layout customization server 201b for further modification (e.g., based on the results of previous layout customization, based on layout usage inputs, and/or the like).

In one embodiment, the template layout server 201C may provide the dynamic layout template to the user device for rendering. The dynamic layout template response may be a layout template further customized from that received from the layout customization server 201b. An example dynamic layout template response 219, substantially in the form of an HTTP(S) POST message including XML-formatted data, is provided below:

```
POST /dynamic_layout_template_response.php HTTP/1.1
Host: www.userdevice.com
Content-Type: Application/XML
Content-Length: 667
<?XML version = "1.0" encoding =" UTF-8"?>
<dynamic_layout_template_response>
    <timestamp>2020-12-12 15:22:43</timestamp>
    <user_name>John Doe</user_name>
    <application>
        <name>Mobile AppAwesome</name>
        <app_id>4354</app_id>
        <layout_customized version="1.0">
            <layout_id value="876" />
            <layout_content>
                <node id="1" height="3.5in" width="5.5in" zindex="8"
                        filter_color="#FFFF25"_filter_intensity="5%">
                    <content type="text">
                        We noticed you are moving, so all elements
                        have been scaled up on your device.
                    </content>
                    <content type="html5">
                        <table border="0" height="3.5" width="5" zindex="8">
                        <tr><td bgcolor="#FFF25">
                            We noticed you are moving, so all elements
                            have been scaled up on your device.
                        </td></tr>
                        </table>
                    </content>
                    <content type="nib_file">
                        (class WindowController is
                        NSWindowController
                        (ivar (id) textField)
                        (imethod (id) init is
                        (self initWithWindowNibName:"Random")
                        ((self window) makeKeyAndOrderFront:self)self)
                        (imethod (void) seed: (id) sender is
                        (NuMath srandom: ((NSCalendarDate calendarDate)
                                timeInterval Since 1970))
                        (@textField setStringValue:
                                "We noticed you are moving, so all elements
                                have been scaled up on your device."))
                        (imethod (void) generate: (id) sender is
                        (@textField setIntValue: (NuMath random))))
                    </content>
                    <content type="nib_binary">
                        Z[YNSMaxSize_NSTextContainer\NSSharedData
                        YNSTVFlags] NSNextKeyView [NSSuperviewXN
                        SvFlagsZNSDelegate_SNextResponder[NS
                        FrameSize [NSDragTypes€@€€) €-CA
                        €mWNSFrameYNScvFlagsXNSCursor...
                    </content>
                    <type value="visual" />
                    <monitor type="interaction">
                        <trigger>click</trigger>
                        <trigger_min_length="2in">swipe</trigger>
                        <trigger>double_click</trigger>
                    </monitor>
                </node>
                <node id="2" height="1in" width="2.5in" zindex="5"
                        Filter_color="#FFFF25" filter_intensity="50%">
                    <content type="text">
                        There is a pizza place offering a deal near you now!
                    </content>
                    <type value="virtual" />
                    <monitor type="atmospheric">
                        <trigger type="temperature">
                            <value>is >= 80deg</value>
                                <action type="apply_color_filter" value="#00FF22">
                                <action type="update_node_display"
                                        value="It's getting hot in here!" />
                                <action type="resize_node_x" value="+5%" />
                                <action type="resize_node_y" value="+10%" />
                        </trigger>
                        <trigger min_length="2in">swipe</trigger>
                        <trigger>double_click</trigger>
                    </monitor>
                </node>
                <node>
                    ...
                </node>
            </layout_content>
```

```
        </layout_customized>
        <layout_customized>
           ...
        </layout_customized>
     </application>
</ / dynamic_layout_template_response >
```

In one embodiment, user device 201a will render and display the dynamic customized layout, e.g., 220, and set any additional (or modify existing) monitors required by the updated layout. The user device may then monitor use of the layout template, e.g., 208.

FIGS. 3A-D are an example logic flow illustrating layout usage monitor package processing, e.g., LUM Component 300, in one embodiment of the DPCL. In one embodiment, user device 301 may transmit a usage monitor package for processing by the layout customization server 302, e.g., 304. The layout customization server may extract a template identifier, e.g., 305. The template identifier may identify the particular layout on which monitoring data is being processed, may specify a type or a class of layouts, or may be usage data unconnected to a layout template (such as application use data, mobile device use data, and/or the like). If the template identifier specifies that the data is for a base template, e.g., 308, the layout customization server may notify the template layout server of the received usage monitor package, e.g., 307. The template layout server 303 may then update the base layout record or update stored customized layouts. Updating may include modifying the layout template and is discussed in more detail herein with respect to FIG. 5, e.g., DLT Component 500.

Each interaction stored in the usage monitor package may contain multiple data points regarding both user input into the device and monitored observations (e.g., location, temperature, etc.). With respect to FIG. 3A, each piece of data in the usage monitor package may be referred to as a node. In one embodiment, an unprocessed node is extracted from the usage monitor package, e.g., 309.

A user interaction may be extracted from the node or otherwise determined, e.g., 310. A user interaction may be any of a click, tap, swipe, "bump", focal plane click, panel click, button press, eye track movement, and/or the like. A user interaction may have multiple parameters associated with it, and those may also be extracted from the node, e.g., 311. Example user interaction parameters include the length of a swipe, the pressure of a button press, the temperature of a user's finger, a sensed pulse from the user, and/or the like. Additional data may be contained within the node, of varying types and categories, e.g., 312.

If the node is of type location, e.g., 313, a current location may be extracted from the node data (e.g., GPS, cellular, WiFi triangulation, and/or the like). If multiple locations are contained within a node, a directed graph of locations may be assembled in order to determine user movement. A directed graph may be in the form of a series of nodes with locations and edges between said nodes specifying a magnitude, direction, distance, and/or the like, e.g., 314. If the node is of type velocity, e.g., 315, a velocity value (such as meters-per-second, and/or the like) may be stored along with a time of the observed velocity.

The logic flow continues now with respect to FIG. 3B. If the node type is a content descriptor, e.g., 317, a content descriptor value may be extracted from the node. The value may be the actual content that was displayed to the user at the time of the interaction, a representation of the content (such as summary text), a hash of the content, and/or the like, e.g., 318. If the node is of type orientation, a geometric orientation may be extracted from the node. A geometric orientation may have components x-axis, y-axis, z-axis, a time of observation, and/or the like, e.g., 320. If the node is of type interaction focal plane color, a color value for a focal plane may be extracted from the node. The value may contain an image representation of the visual shown to the user (such as a JPG), may contain a mapping of locations to colors (such as an array of RGB values), or may contain a reduced subset of displayed colors (such as an array of RGB values representing most common color(s) displayed in a panel). An average color value for an interaction focal plane may be created and stored (e.g., by averaging the node's color values mathematically), e.g., 322, or color multiple values may be stored. If the node is of type interaction focal plane size, a focal plane size may be extracted from the node. A focal plane size may consist of an x-axis size, a y-axis size, a virtual-x-axis-size (which may represent non-displayed content in a focal plane), a virtual-y-axis-size, a time of observation, and/or the like, e.g., 324.

The logic flow continues now with respect to FIG. 3C. If the node is of type atmospheric, e.g., 325, metrics associated with the environment of the device at a point in time may be stored by the node. For example, temperature, humidity, light level(s), altitude, and/or the like may be extracted from the node data, e.g., 326. If the node is of type pressure, e.g., 327, an array of pressure reading(s) (e.g., pounds per square inch, and/or the like) may be extracted from the node as well as a duration of pressure and a time of start of the duration, e.g., 328. Such data may be used in order to determine user intent with respect to the layout. In one embodiment, frustration with the layout is determined by high pressure readings associated with a user's interaction with a device layout. Such a determination may then be used in modifying a layout template to optimize a user's experience, such as by using a simpler layout template for an inexperienced user. In one embodiment, a node may contain a custom function, e.g., 329. A custom function may be a user defined function representing a user's preferences with respect to a layout. An example custom function, e.g., 330, substantially in the form of JavaScript, is provided below:

```
<script language="JavaScript">
    var location = current_node_location('self');
    var home_location = user_profile(lookup=>'home_address');
    if (distance_miles (location,home_location) < 2) {
        var msg = "We're almost home, I'm changing the
```

```
        layout to be your preferred home layout.";
    alert (msg);
    update_device_layout (user_profile(lookup=>'preferred_layout');
  }
</script>
```

In one embodiment, the custom function may be stored in a customized layout for later deliver to a user mobile device. In so doing, aspects of the DPCL may allow users to specify layout behaviors and/or customizations that are responsive to their own interactions with a device as well as the observations of the device itself (e.g., temperature, pressure, location, and/or the like).

In one embodiment, the node type may be unknown, e.g., 331. The raw value of the node may then be stored, e.g., 332, for use later or when a processing mechanism (e.g., 313-330) has been defined for the unknown node data type.

Figure 3A:
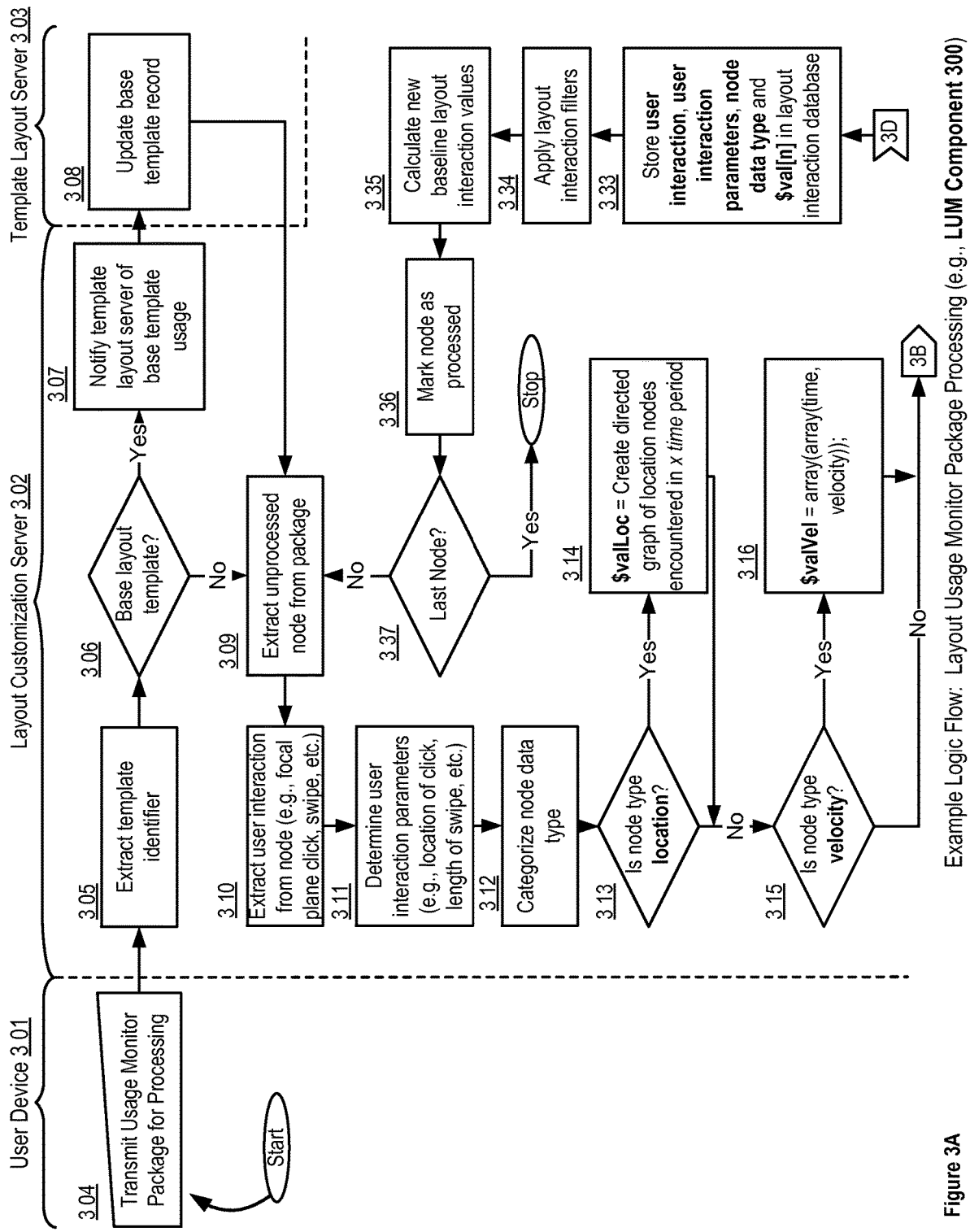

The logic flow continues now with respect to FIG. 3D. If the node is of type malware profile, e.g., 332a, values corresponding to a malware function may be extracted, e.g., 332b. The values may include the device type, software installed or running on the device, a malware threat assessment value (e.g., by searching a publically accessible search engine such as Google for each installed application and determining based on the results and keywords therein if the software is malware), and/or the like. If the node is of type clickjacking risk, e.g., 332c, values such as the application view configuration, web sites loaded or being viewed, the z-index of the application or web page layers, any JavaScript functions loaded by the browser, and/or the like may be extracted, e.g., 332d. These values may be used to determine a clickjacking risk score, such that the score may represent an increased risk of a malware application capturing user input intended for another element or application. For example, if any unknown (e.g., not white listed) applications have view layers on top of the current application view layer, the clickjacking risk score may be increased. In one embodiment, if the node is of type entity spoofing risk, e.g., 332e, values corresponding to suspect processes, actions or interactions (e.g., invalid security certificates, credential mismatches from known credentials for an entity, and/or the like), and/or the like may be extracted, e.g., 332f. The logic flow now returns to FIG. 3A.

In one embodiment, the user interaction (e.g., tap, swipe, "bump", and/or the like), user interaction parameters (e.g., length of swipe, time of tap, and/or the like), and any node data type/value pairs (e.g., pressure=>array(psi, time), location=>array(lat,long,time), and/or the like may be stored in a layout interaction database, e.g., 333. Filters may be applied to the stored interaction filters based on any of the stored data, e.g., 334. An example filter is a filter that disregards excessive pressure readings of a tap (such as when a user sits on their mobile device), or removing data relating to very long (>1 min) taps on the user device (such as when a user unknowingly presses ("taps") a mobile device while holding it in his/her hand. Once the values have been stored and filters applied, a new baseline layout interaction value may be established, e.g., 335. A baseline interaction value may be an average of a user's interaction of a given type. In doing so, the system may more intelligently determine which input is user conscious input (e.g., intentional taps) and which input is user unconscious input. Additionally, the baseline values may be used by the template layout server 303 and/or the layout customization server 302 in determining layout modifications and/or layout selections for the user. In one embodiment, the baseline interaction values (or other data processed by LUM) may be aggregated across users in order to enable layout template modifications using demographic or user cohort data. In one example, the aggregated data may be used to determine a default or baseline layout template for a user based on the experience/usage monitor data of users in a similar demographic profile (such as a similar age, geographic region, etc.) In one embodiment, the current node may be marked as processed, e.g., 336. If there are no more nodes, e.g., 337, the logic flow may end.

FIG. 4 shows an example logic flow illustrating aspects of matching focal planes to content, e.g., MFP Component 400, in one embodiment of the DPCL. In one embodiment, a user device 401 transmits a layout template request for processing, e.g., 404. The template layout server 402 may extract an application layout template identifier, e.g., 405. An application layout template identifier may specify any of an application name, an application id, a template id, user preferences for layout customization, and/or the like. In one embodiment, the template layout server 402 queries a layout template database, e.g., 1819n, in order to retrieve layout template(s) matching the template identifier, e.g., 406. If a layout template record is not found, e.g., 407, a second query may be made for a default layout template record, e.g., 408.

In one embodiment, the retrieved template may have been previously customized or modified (i.e., is not a default or a base template), e.g., 409. The template layout server may then request layout template usage records, e.g., 410 from the layout customization server 403. The layout customization server may return, e.g., 411, layout template usage records corresponding to an individual user's use of a layout template, an aggregated use of a layout template (such as across users with a certain demographic attribute), or usage records corresponding to similar (i.e., similar layout, attributes, behavior, use case, and/or the like) layout templates.

In one embodiment, a layout template contains a series of focal planes. A focal plane may be known as a focal area, a focal point, a panel, a content area, and/or the like. The template layout server 402 may then extract the first unprocessed focal plane panel from the layout template and proceed to match appropriate content to the focal plane (e.g., text content for display to user, images, audio, and/or the like). In one embodiment, the current panel's properties are determined using meta data associated with the layout template and/or focal plane panel, e.g., 413. The panel properties may be any of a panel priority (such as may be used when certain panels are specified for important or timely information), a panel size, a panel color (a base color, and overlay color, a filter color, and/or the like), and any dependencies that the panel has (such as panel properties of other panels that, when present, impact the current panel properties).

In one embodiment, layout template usage records may be available, e.g., 414. The panel properties may then be modified based on the layout template usage records, e.g., 415. Modification of panel properties using layout template usage records is discussed herein and particularly with respect to FIG. 5, e.g., DLT Component 500. In one embodiment, a panel content database may be queried to determine content suitable for inclusion in the focal plane panel, e.g., 416. Content may be any of text, an image, an audio recording, and/or the like. Such selection may be based on the size of the panel, its display capabilities, and/or the like. From the set of panel content candidates meeting panel properties, a subset of content for inclusion in the focal plane panel may be selected using panel content rules and panel properties, e.g., 417. An example panel content rule may be "only display this content after Nov. 1, 2020". Another panel content rule may be "display this content when the user is near their place of business." If there are no more unprocessed panels, e.g., 418, the layout template and the selected focal plane panel content is sent to the user device 401, e.g., 419. The user device may render the layout template, populate the template focal plane panels with the provided content, and monitor usage of the template, e.g., 420.

FIG. 5A-D show an example logic flow illustrating aspects of generating dynamic layouts using layout templates, e.g., a DLT Component 500. In one embodiment, a layout customization server 501 may extract an unprocessed or unmodified focal plane panel from a layout template for customization, e.g., 503. The current panel's properties (i.e., panel priority, size, behavior, and/or the like) may be determined based on meta data associated with the layout template or the panel, e.g. 504. Layout template usage records may be requested from a layout interaction database, e.g., 505. The layout interaction database may contain records regarding usage of layouts, focal planes, and device usage (such as device orientation/geometry data, and/or the like), e.g., 506.

In one embodiment, the first unprocessed layout template record usage record from the layout interaction database 502 is extracted from the returned usage records for processing, e.g., 507. Based on the layout template usage record(s) and business rules, a determination is made if the panel is subject to resizing, e.g., 508. An example logic flow illustrating determining if a panel is subject to resizing is discussed herein, particularly with respect to FIG. 5B. If the panel is subject to resizing, the panel's horizontal and/or vertical size is scaled up or down, e.g., 509.

In one embodiment, the panel may be subject to color modification, such as adding a filter to make the panel more prominent in the layout, e.g., 510. A determination of any panel modification may be made by a custom defined business function, an exemplary example being provided with respect to FIG. 5B. In one embodiment, a panel color differential is calculated, e.g., 511, representing a difference in the current panel color property and the color property determined by the layout template usage records and business rules function. A panel filter value may be determined that modifies the current panel color, e.g., 512, and the filter may be applied to the panel color value parameter, e.g., 513. If the panel is subject to z-index adjustment modification, e.g., 514, the panel's z-index may be modified, e.g., 515.

The logic flow now continues with respect to FIG. 5C. In one embodiment, if the panel is subject to enhanced security, e.g., 570, applications that are running on the device may be determined and used to determine a risk factor (for example, unknown applications may increase the risk factor), e.g., 571. If the user's location is in an area designated as high risk (such as an airport, area known for WiFi signal interception, and/or the like), e.g., 572, a user location security threat factor may be determined. The user's surroundings may similarly generate a risk factor, e.g., 573, such as if the user is near a WiFi hotspot known to be compromised. In one embodiment, the security profile of the user's device (e.g., operating system, installed patches, capabilities, location history, and/or the like) may be used to determine a device security profile threat factor, e.g., 574. The running application on a user's device may be analyzed to determine, for example, if an application on an application black-list is running and has invoked a transparent view layer on top of a known application's view layer, e.g., 575. The threat factors above and other similar factors may be used to determine an overall security threat factor, e.g., 576. In one embodiment, the current panel may have a certain security maintenance factor, e.g., 577. For example, the panel may be colored or sized, contain content and/or the like that increases its ability to maintain security. The overall security threat factor and the panel security maintenance factor may be used to determine a security threat factor for the panel as a whole, e.g., 578. In one embodiment, if the determined panel security threat factor is greater than a threshold template or panel security parameter, e.g., 579, the panel may be modified, e.g., 580. Modifying the panel may include but is not limited to moving the panel so that it is not under a known or potential malware overlay, randomizing the location or content of a panel, marking the panel as preferring, not-preferring, being capable of, or being not capable of holding certain content or content with certain security requirements, and/or the like. In one embodiment, after the panel has been modified the panel's security threat factor is re-calculated, e.g., 581. If the revised panel security threat factor is less than a threshold security parameter, e.g., 582, the panel may be marked as capable or preferred for holding secure content, e.g., 583. If all of the panels in the template are marked as secure content capable or preferred, e.g., 584, the template may be marked as secure content capable, e.g., 585.

The logic flow now continues with respect to FIG. 5D. In one embodiment, if the user has selected a security image (e.g., an image previously chosen or otherwise determined to be known to the user), e.g., 586, and the current panel is marked or capable of security image insertion, e.g., 587, the image may be retrieved 588 (e.g., via an HTTP GET call, from the local file system, and/or the like) and inserted into the panel, e.g., 589. In other embodiments only a link to the image may be inserted, such as an HTML image link and/or the like. In so doing, the user may be presented with a known image located at a known or unknown position in the user interface. By seeing the image, the user may determine if the interface he/she is interacting with is the intended interface. In other embodiments, layers that are on top of the active layer (e.g., potential malware layers) may be colored in the area over the location of the image. The coloring (in some embodiments, semi-transparently) of the overlaying layers may cause the image to render differently or be perceived differently by the user (such as, for example, the known image having a blue-tint caused by an overlay) such that the user can instantly determine if there are layers over the currently active layer. In one embodiment, the panel may be marked with a parameter so that later iterations or manipulations of reconfiguring the user interface template (whether in the current session or a later session) do not alter the panel containing the inserted image, e.g., 590. The logic flow now continues with respect to FIG. 5A.

In one embodiment, the panel may have dependencies with respect to other panels as discussed herein, e.g., 516. In one example, the content or panel parameters of a different panel may be adjusted or changed in response to modification on the current panels, e.g., 517. All other panels are then updated based on the impact of the current panel's modifications (such as decreasing another panel's size when the current panel was resized). In order to avoid an infinite loop event regarding modification impacts, some embodiments may mark the current panel as "no future changes" so that subsequent panel processing does not change the current panel's parameters or content. In one embodiment, a panel processing priority value may be assigned in the layout template in order to ensure that certain panels are processed before other panels in the layout template. If no more layout template usage records for the current focal plane panel require processing, e.g., 519, the current panel is marked as processed and/or modified, e.g., 520. If there are more panels to process, e.g., 521, the logic flow may continue with respect to the other panels.

FIG. 5B shows an example logic flow for determining if a given focal plane panel is subject to resizing. A similar procedure may be employed for other determinations of focal plane panel modifications. In one embodiment, a layout matrix representing the user device on which a layout is rendered is created as a multidimensional matrix array (e.g., array(array(x,y))), e.g., 550. The layout usage records of type location (here, depicting the location of an interaction on a user's device screen) is plotted on the matrix, e.g., 551. A least squares regression is applied to create a heatmap of areas of user interest, e.g., 552. If an area of determined interest overlaps more than 50% of a focal plane panel location (e.g., a strong mapping between user interest and a panel location), e.g., 553, then a minimum distance between the area of determined user interest and the next nearest area of determined user interest may be calculated, e.g., 554. The focal plane panel may then be modified by resizing the panel by half of the calculated minimum distance, e.g., 555. If the modified panel size collides with an edge of the layout or user device, e.g., 556, then the panel may be reduced in size until there is no overlap collision, e.g., 557. If the modified panel size collides with another panel, e.g., 558, the other panel may be reduced in size by the amount of the overlap, e.g., 559. The modified focal plane(s) may then be returned, e.g., 560, and other focal planes processed in a similar fashion.

Figure 6:
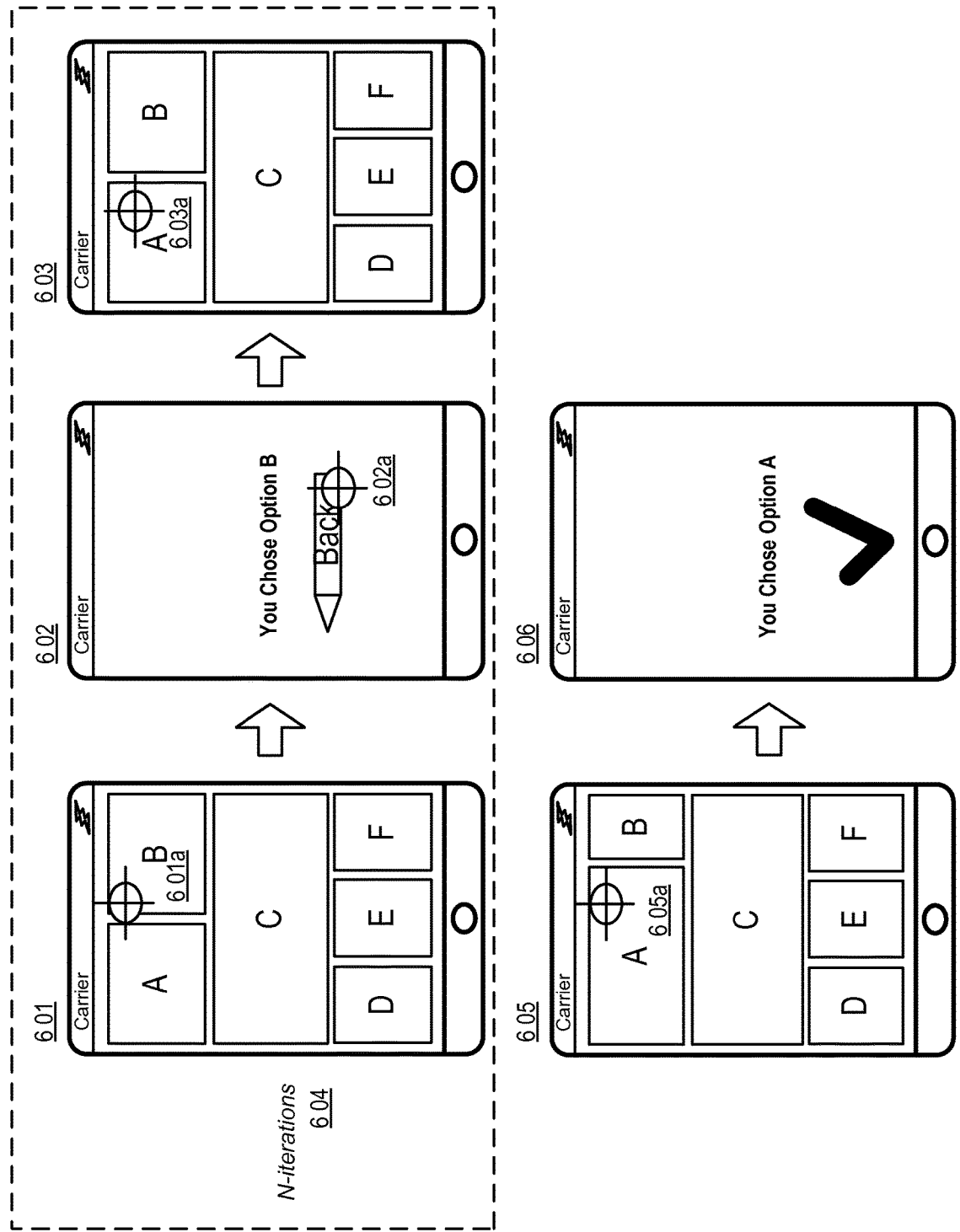
FIG. 6 shows an example user interface illustrating aspects of usage intent monitoring via error detection and dynamically sizing layouts, in one implementation of the DPCL operation.

FIG. 6 is an example user interface illustrating user intent monitoring via error detection and dynamically sizing layouts, in one embodiment of the DPCL. In one embodiment, a user may tap their mobile phone, 601-603, in a location corresponding to a given panel, e.g., 601a. The panel edges may be visible to the user or not visible to the user. The user may then realize an error has been made in their intended panel selection and choose to tap the mobile device at a point to "go back", e.g., 602a. The user may then tap their intended panel with more precision, e.g., 603a. This error/back/re-tap correct panel cycle may repeat over many iterations, e.g., 604.

In one embodiment, the DPCL will monitor the user's usage of the layout and dynamically modify the layout in response to this error condition correction cycle, e.g., 605. The modified layout may show the panel that the user often "misses" as enlarged, to facilitate the user's correct selection of a panel in the future, e.g., 606.

Figure 7:
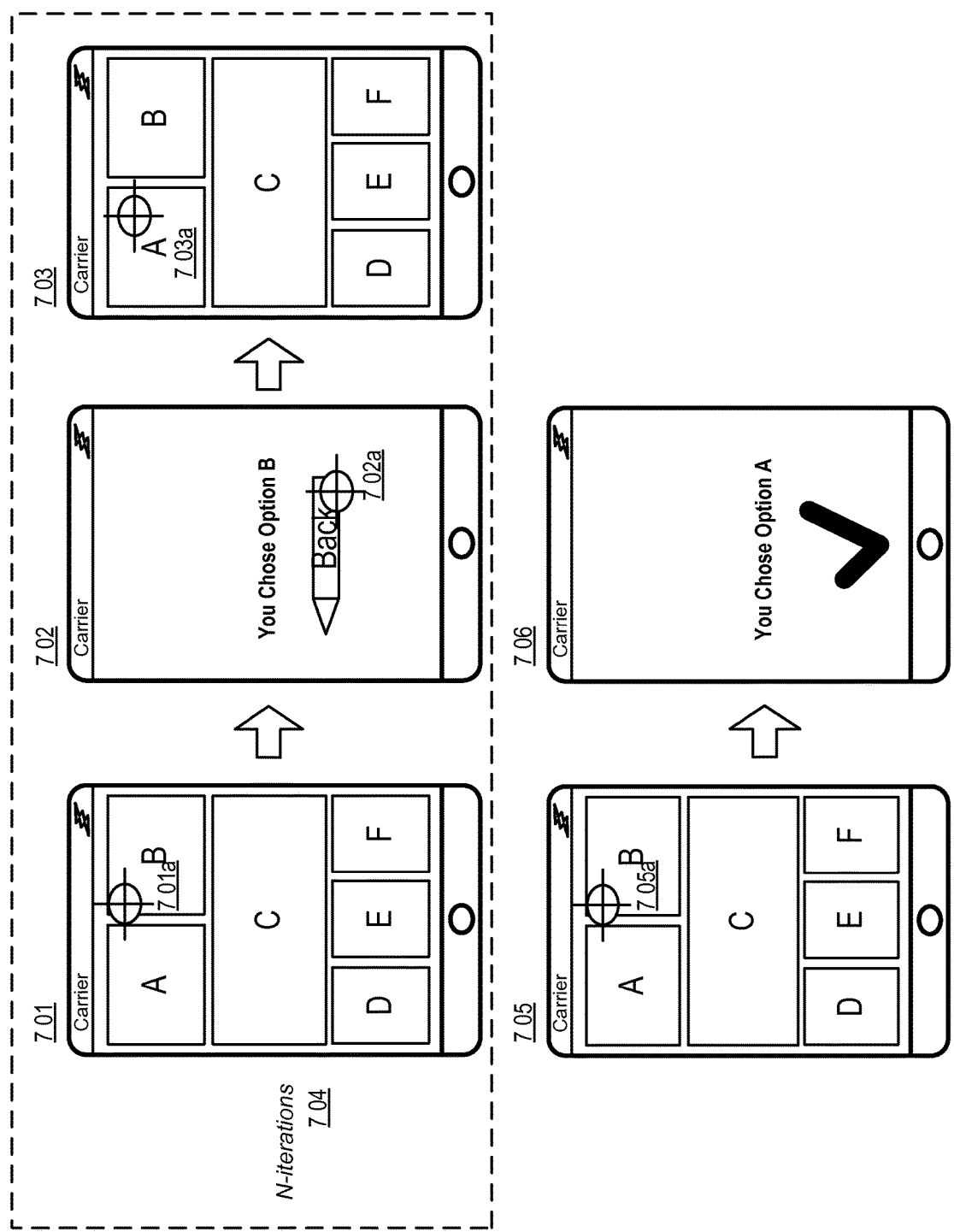
FIG. 7 shows an example user interface illustrating aspects of usage intent monitoring via error detection and virtual dynamic layouts, in one implementation of the DPCL operation.

FIG. 7 is an example user interface illustrating user intent monitoring via error detection and dynamically sizing virtual layouts, in one embodiment of the DPCL. In one embodiment, a user may tap their mobile phone, 701-703, in a location corresponding to a given panel, e.g., 701a. The panel edges may be visible to the user or not visible to the user. The user may then realize an error has been made in their intended panel selection and choose to tap the mobile device at a point to "go back", e.g., 702a. The user may then tap their intended panel with more precision, e.g., 703a. This error/back/re-tap correct panel cycle may repeat over many iterations, e.g., 704.

In one embodiment, the DPCL will monitor the user's usage of the layout and dynamically modify the virtual layout in response to this error condition correction cycle, e.g., 705. A virtual layout may be a layout corresponding to the active behavior regions of a layout (e.g., areas that may be interacted with by the user), but that may be different from the displayed layout. The virtual layout allows the mobile device to respond to input that, although physically tapped at a point in space, was actually intended for another point in space. The virtual layout may sense a user tap on mobile device 705 at point 705a as intended for the panel marked "A", even though the actual tap was on the panel marked "B". In doing so, the virtual layout may facilitate the user's correct selection of a user's intended panel in the future, e.g., 706.

Figure 8:
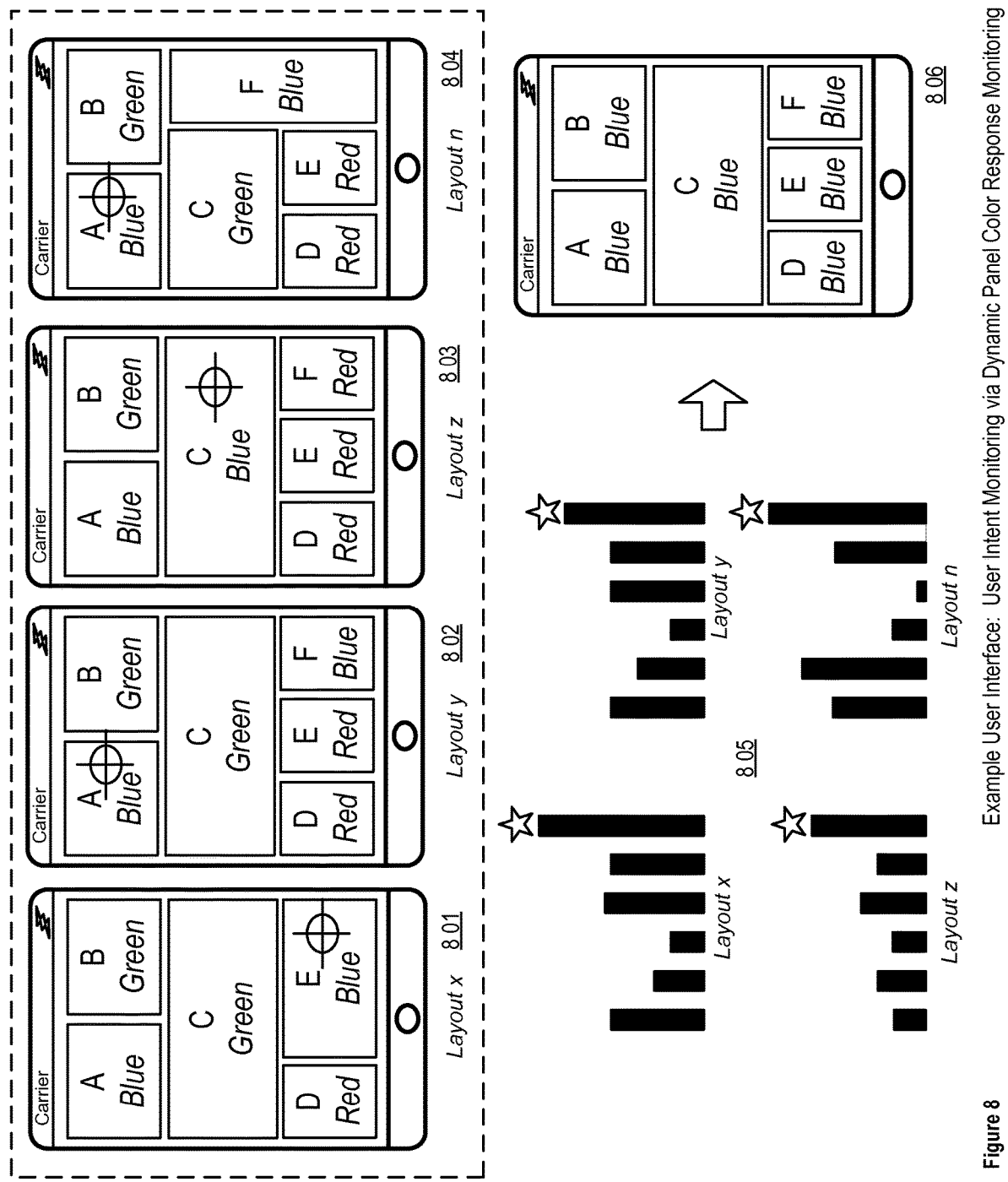
FIG. 8 shows an example user interface illustrating aspects of usage intent monitoring via dynamic panel color response monitoring, in one implementation of the DPCL operation.

FIG. 8 is an example user interface illustrating user intent monitoring via dynamic panel color response monitoring. In one embodiment, a user interacts with a mobile device (e.g., 801-804). The color profile of the panels interacted with is observed (e.g., a color hue, a color value, an average color of a panel, and/or the like) as well as the layout at the time of interaction. The layouts and color values are analyzed to determine the optimum layout and color combination that the user responds to (e.g., by finding maximum tap engagement per unit time with mobile device as a function of both panel color and layout template), e.g., 805. In one embodiment, an optimal layout is chosen and the user preferred color is applied to substantially all of the panels in the interface, e.g., 806.

Figure 9:
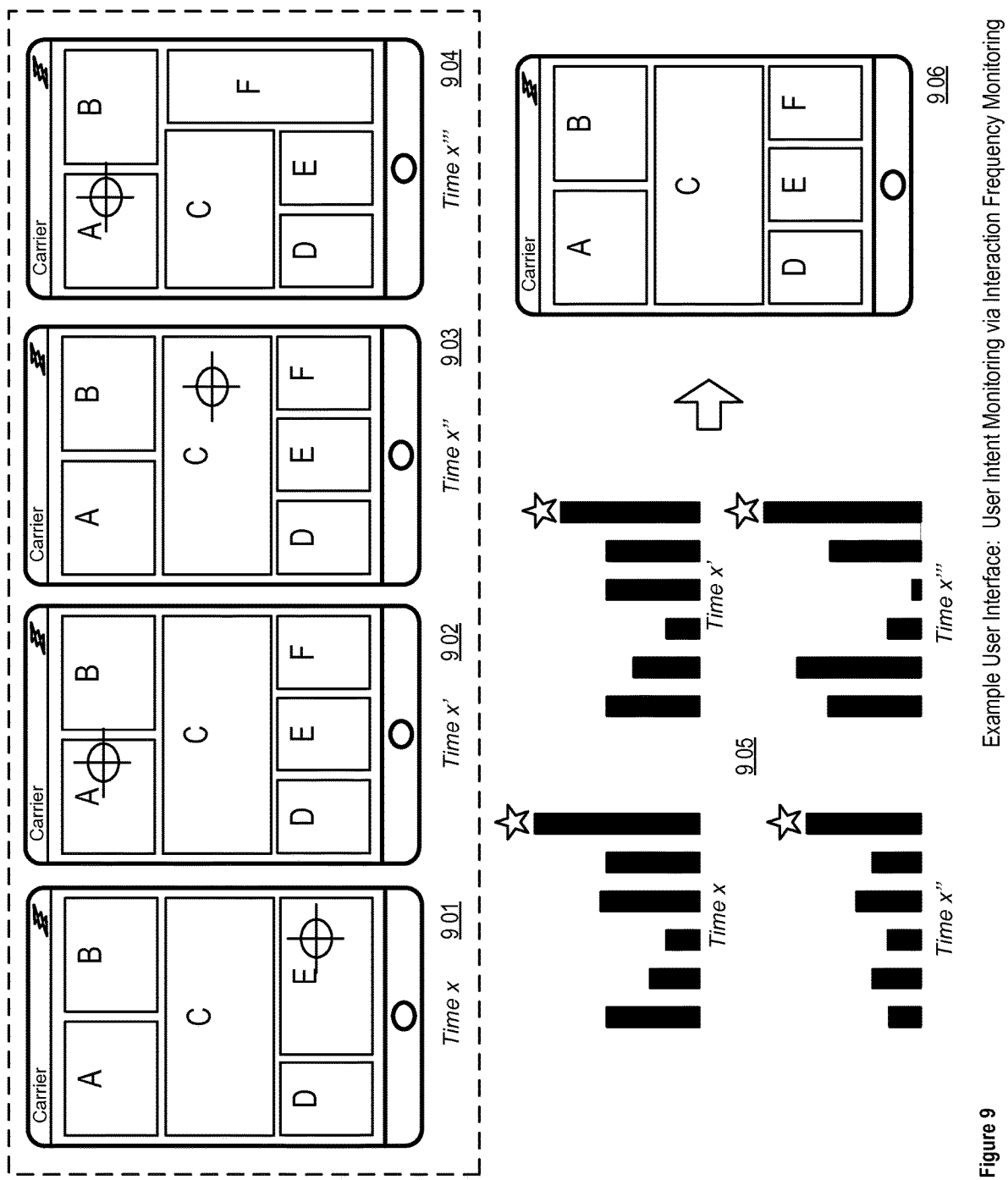
FIG. 9 shows an example user interface illustrating aspects of usage intent monitoring via interaction frequency monitoring, in one implementation of the DPCL operation.

FIG. 9 is an example user interface illustrating user intent monitoring via interaction frequency monitoring. In one embodiment, a user interacts with a mobile device (e.g., 901-904) at various times of day and with various layouts. The times of day and layout interactions are analyzed to determine an optimum time of day to present a given layout template, e.g., 905. For instance, a user may prefer big interface buttons in the morning hours and smaller ones while at work during the normal business day. At a given time of day, an optimal layout template is then displayed, e.g., 906.

Figure 10:
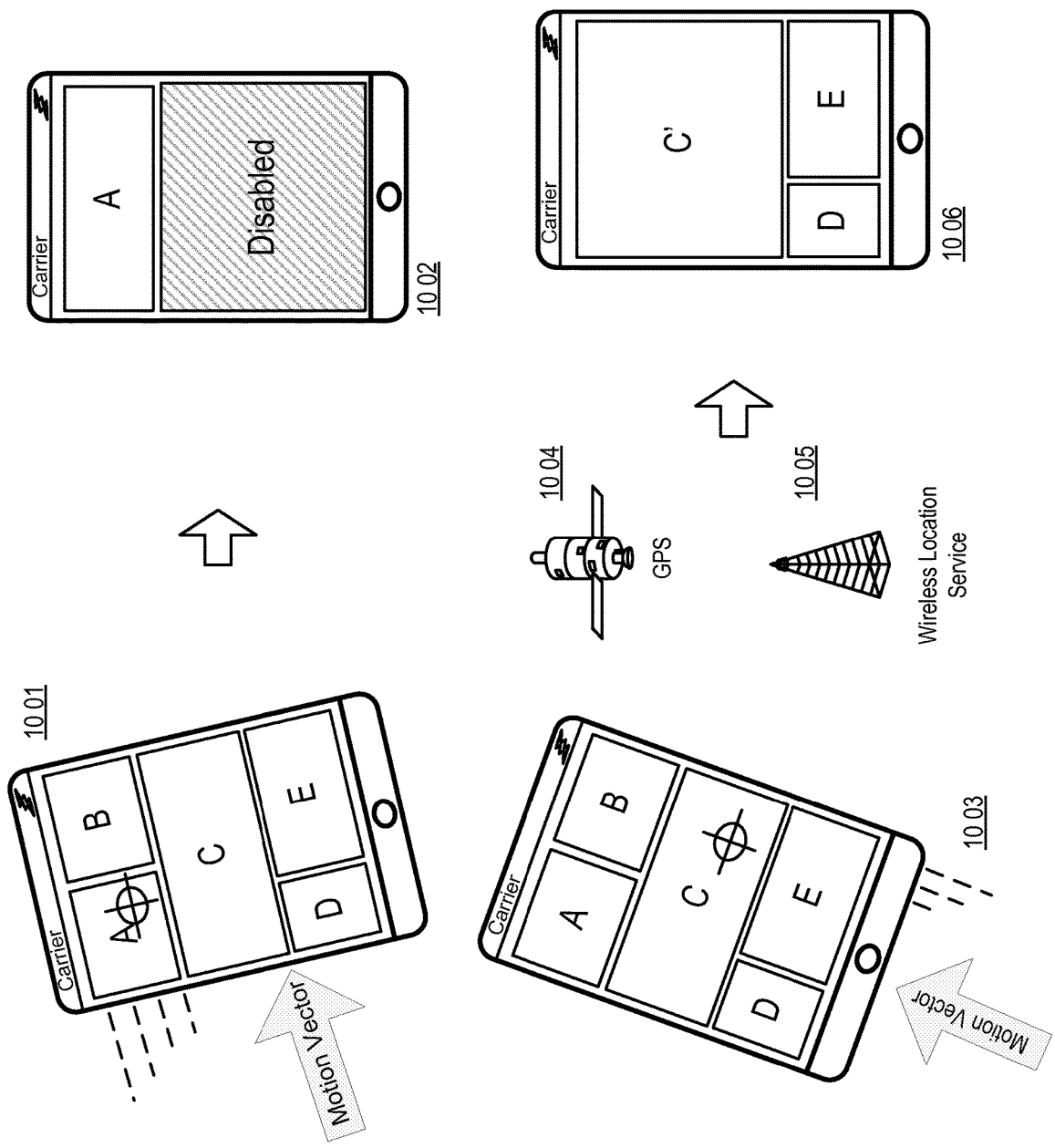
FIG. 10 shows an example user interface illustrating aspects of usage intent monitoring via location and motion observation, in one implementation of the DPCL operation.

FIG. 10 is an example user interface illustrating user intent monitoring via location and motion observation. In one embodiment, a user device may be in motion in a certain vector while the user simultaneously taps on a location on the display, e.g., 1001. The motion vector may be monitored by an application running on the user device and in communication with an integrated 3-axis accelerometer, through the use of a device camera to detect motion in space, and/or the like. In one embodiment, previous user interactions while in a motion vector may cause a dynamic layout to render with a larger preferred option choice and/or portions of the interface disabled, e.g., 1002.

In one embodiment, a user device may be in motion in a certain vector and be displaying a given rendered layout template when a user registers a tap on the device input screen, e.g., 1003. Additionally, the device may be in communication with outside services, e.g., 1004, 1005 suitable for determining a current device location (such as GPS using an integrated receiver, or via cellular or WiFi triangulation). A software application running on the user device may then, at a future point, render a modified layout template when sensing a substantially equivalent motion vector and location, e.g., 1006. Such a modified layout template may, for example, enlarge buttons when a user is on a fast moving train (motion vector) passing a given city (location) in order to offer the user preferred layout options highlighting, for example, local news or offers for the city that is being passed so that future journeys may include said city. Alternatively, a user in his/her office elevator (location) may be presented with a layout that displays the profiles of the companies on the floors the elevator is passing (motion vector).

Figure 11:
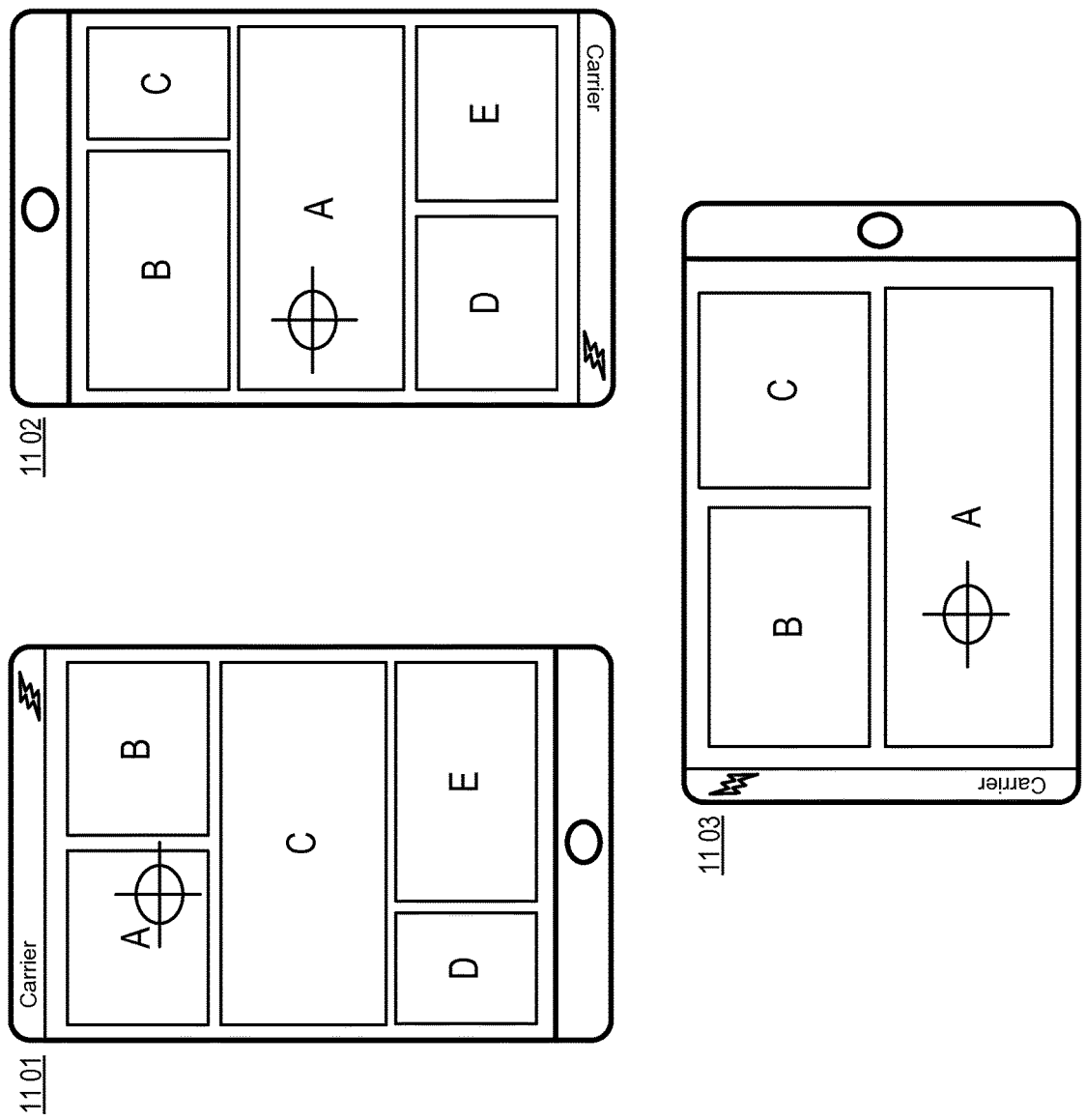
FIG. 11 shows an example user interface illustrating aspects of usage intent monitoring via orientation interaction preferences, in one implementation of the DPCL operation.

FIG. 11 is an example user interface illustrating user intent monitoring via orientation interaction parameters. Device orientation may be monitored in connection with user interaction events (e.g., taps, clicks, swipes, and/or the like). In one embodiment, a preferred layout panel element "A" is observed in a profile orientation of the user device, e.g., 1101. That preferred panel may be subsequently moved to the user's preferred interaction panel, e.g., 1102. When the device orientation is changed to landscape, the same preferred panel "A" may be displayed in a user's preferred interaction panel as observed in a landscape orientation, e.g., 1103. In so doing, the user is able to access preferred content in preferred locations irrespective of device location. Additionally, orientation interaction preferences may be used by the DPCL to provide preferred content, such as offers for local merchants, in locations on the device that have been observed to be user preferred.

Figure 12:
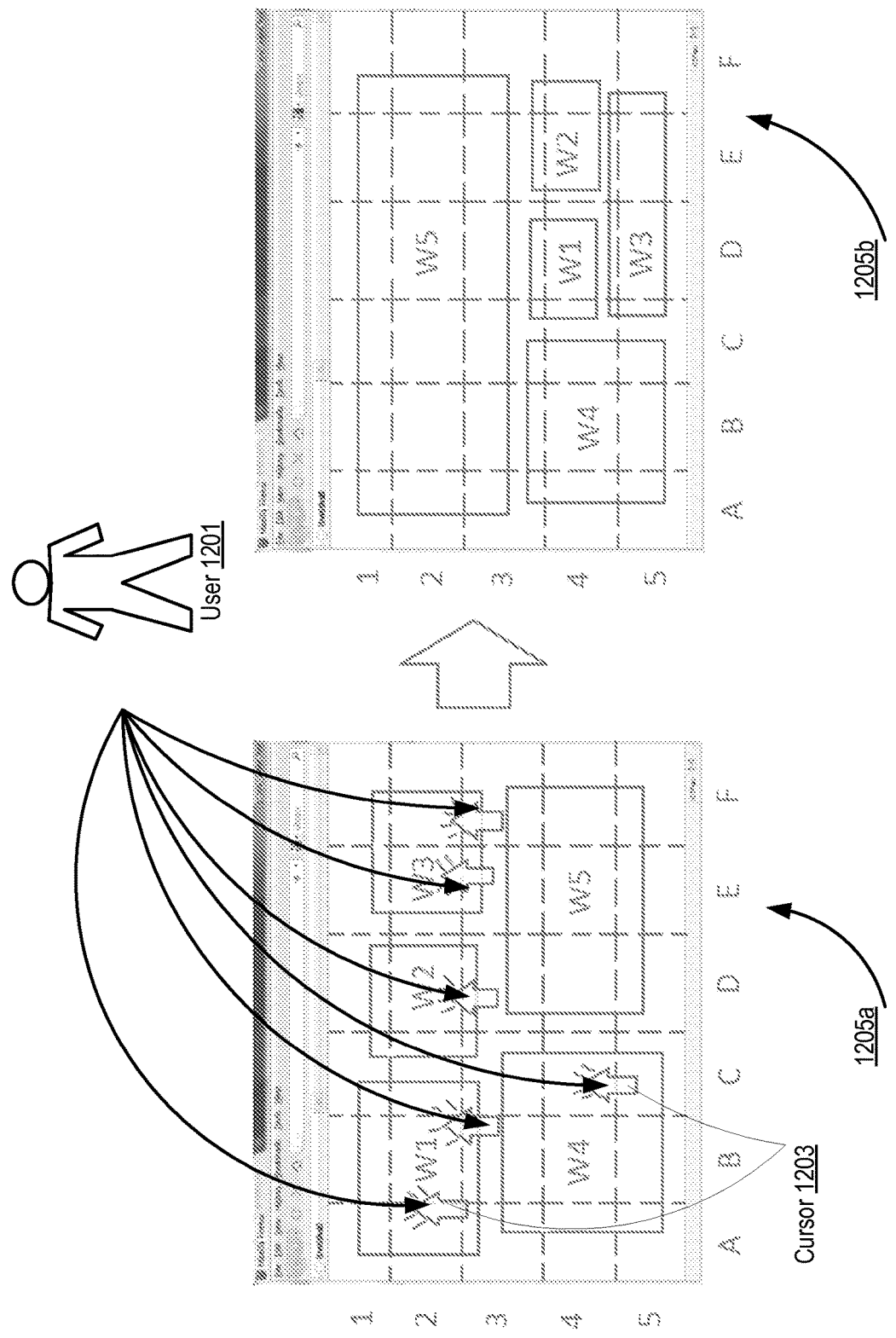
FIG. 12 shows block diagrams illustrating exemplary aspects of embodiments of a DPCL user interface in accordance with the present disclosure, in one implementation of the DPCL operation.

FIG. 12 shows block diagrams illustrating example aspects of a DPCL user interface in some embodiments of the DPCL. With reference to FIG. 12, in some implementations, a user, e.g., 1201, may wish to review a web page of interest by way of a browser user interface 1205a. The user requests a page and then reviews the page that is delivered. The page 1205a may include a number of objects W1-W5 including, for example, different types of content or advertisements and the like. The user may be viewing the website using a secure display (e.g., that is part of a trusted computing device of the user). In the process of reviewing the page, the user may interact with various objects W1-W5 in different portions of the page 1205a such as by directing a cursor 1203 over one or more of the objects W1-W5 or by touching a portion of a touch screen, depending on the nature of the user interface. Information relating to the interaction can be compiled into actual usage data, for example, by the user device (not shown) that is displaying the page and then directed back to the server that rendered the page. The server can be a behavior adapter server that processes the actual usage data, and then changes the layout of the page based on the actual usage data. The server may adapt the content and layout of the page to place content proposing a commercial transaction (e.g., an advertisement offering a product for a certain price) in a region of the display that the user interacted with the most, based on actual usage data that is being monitored in real time, actual usage data that is stored, and/or based on a predictive model. In any event, the behavior adapter server generates a new page 1205b with the elements W1-W5 of the page in a rearranged format based on user input and delivers it to the user 1201.

In some implementations, DPCL user interface may be utilized for authentication/verification purposes, and for providing digital consent for disclosure of personal and/or private information, such as actual usage information or other information. The user interface may include a user interface element that the user may activate to initiate shopping checkout and payment. Upon the user activating the user element, the client displaying the online shopping website may provide a message to a server of the merchant to initiate secure purchase transaction processing. The server of the merchant operating the online shopping website may establish a secure connection (e.g., a Secure Sockets Layer connection) to a pay network server of a payment network, discussed below. Also, the pay network server may establish a secure connection to the client. For example, the client may include a secure I/O chip that only allows secure connections to be established by the client with pay network servers of the payment network.

Figure 13B:
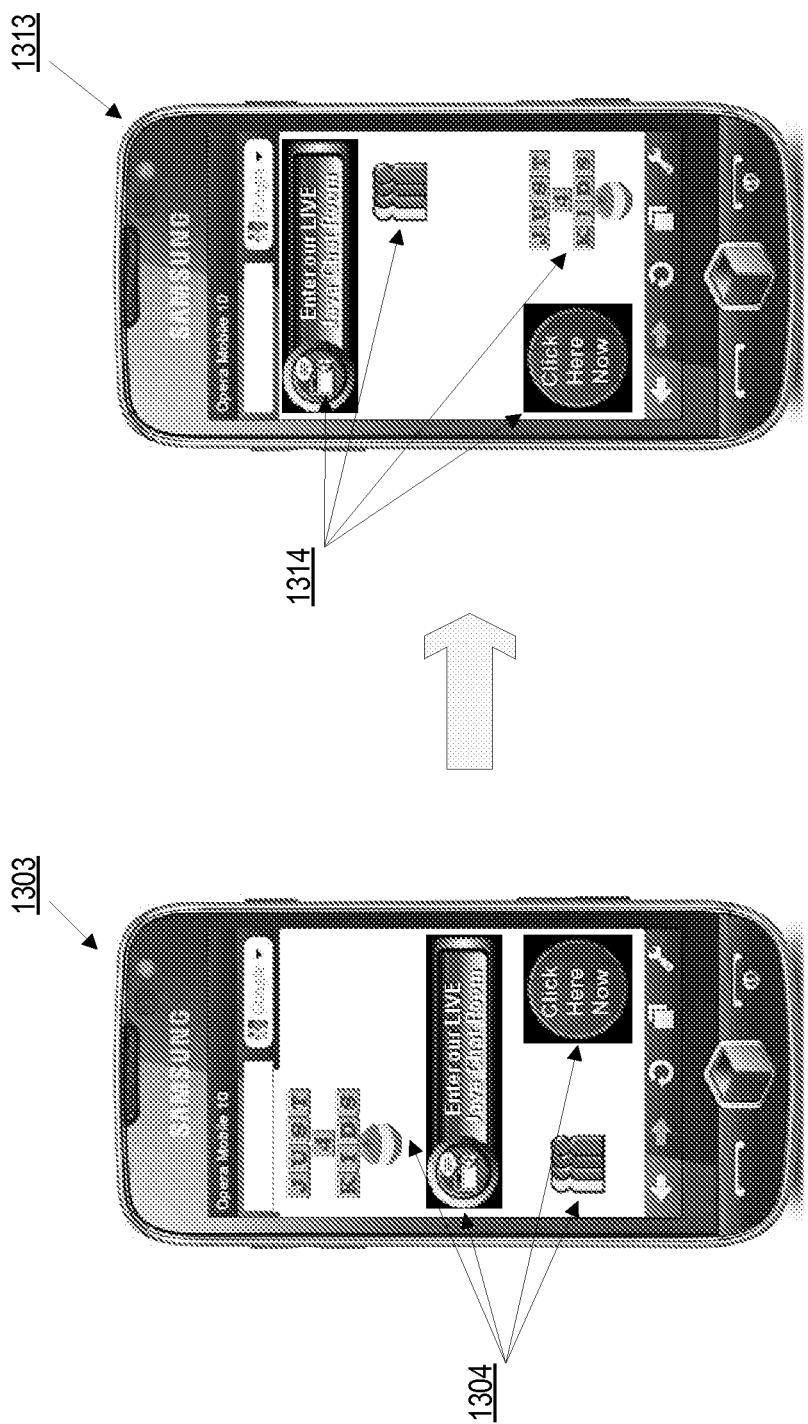

FIGS. 13A-B show application user interface diagrams illustrating example features of a DPCL user interface in some embodiments of the DPCL for a mobile device. A page that is generated and delivered to a user is preferably subdivided into a desired number of focal planes 1302 to make up a framework 1301. The focal planes 1302 can be of any desired size or shape and can be constructed, for example, using html tables, frames, cascading style sheets ("CSS"), JavaScript, scripting languages such as PHP, Perl, ASP, or JSP and the like. In some embodiments, HTML 5 or tagged UI objects may be reallocated within a user interface view. For example, text views, buttons and/or pop up elements may be reoriented within an IOS view and/or tab view. Similarly, desktop view elements in an (e.g., Android or other smartphone mobile) application can be reoriented accordingly.

The focal planes are then associated with and populated by content 1304 to form a user interface 1303. After the user interface is provided, data is collected, for example, by the user device indicating the amount of time and/or number of times that the user interacts with each focal plane. This can be done in the case of a web browser on a desktop computer, laptop computer or other terminal having a pointing device by recording the x-y coordinates of the cursor during the time that the user is reviewing the page. In the case of a mobile device, the location of screen touches can similarly be logged. Based on actual user data and/or a predictive model and predictive rules engine (discussed below), a modified UI can be provided to the user based on user input, or automatically.

In some implementations, the framework of the DPCL user interface can change over time. As illustrated in FIG. 13A, the layout of a first page is defined by separating the first page into a plurality of discrete focal planes 1302 to form a first framework 1301. The focal planes 1302 can be adjacent as illustrated, or can be overlapping as discussed in further reference to FIGS. 14A-C below. This first framework 1301 of focal planes 1302 can be transformed, for example, by an adaptive rules engine running on a behavior adapter server (discussed below) from a first configuration 1301 into a second framework 1311 having a differing configuration. As illustrated, the selection and arrangement of focal planes 1312 differs from focal planes 1302. One or more of the focal planes 1312 can be assigned differing focal plane priority levels within a focal plane hierarchy, wherein the focal plane priority levels are assigned based on actual user data or predictive usage data obtained from a data storage server that stores consumer transaction history, among other things, as discussed below with reference to FIGS. 15A-D. In some implementations of the DPCL user interface, the predictive usage data is indicative of the amount that at least one user is expected to interact with each focal plane. It is contemplated that a behavior adapter server can generate changing user interfaces for more than one user, such as for a group of users, such as a group of users using a particular software program over the world wide web, or locally over a LAN or WAN.

The framework and other components of the DPCL user interface can similarly be provided to a web browser running on a desktop PC, laptop PC or other user terminal. As illustrated in FIG. 14A, the layout of a first page for a web browser is defined by separating the first page into a plurality of discrete adjacent or overlapping focal planes 1402 to form a first framework 1401. If desired, one or more floating focal planes 1402' can be provided that can overlap and/or underlay other focal planes. It will be further appreciated that, while the focal planes as illustrated are indicated as being adjacent, it is possible for them to partially or wholly overlay each other.

This first framework 1401 of focal planes 1402 can be transformed, for example, by an adaptive rules engine running on a behavior adapter server (discussed below) from a first configuration into a second framework 1411 having a differing configuration. As illustrated, the selection and arrangement of focal planes 1412 differs from focal planes 1402, and floating focal plane 1402' has been moved to overlay other focal planes at different x-y coordinates. One or more of the focal planes 1412 can be assigned differing focal plane priority levels within a focal plane hierarchy, wherein the focal plane priority levels are assigned based on actual user data or predictive usage data obtained from a data storage server.

Likewise, the content that is selected to populate each focal plane can be assigned to one or more different focal planes in accordance with at least one predefined content rule that assigns a content priority level to each content object. The net result is that selected content can be used to populate discrete portions of a user interface based on the actual and/or anticipated behavior of the user when assembling a page.

For example, as illustrated in FIG. 13B, a first set of content objects 1304 is associated with the corresponding focal planes 1302 illustrated in FIG. 13A for a mobile DPCL user interface. The content objects 1304 themselves, as well as their association with focal planes can similarly be transformed by way of an adaptive rules engine residing on a behavior adapter server (discussed in further detail below). In some embodiments, the focal plane configuration is not changed and the association with respective content objects is altered. Alternatively, both the focal plane framework 1301 and the content associated with those focal planes 1304 can be transformed over time in accordance with predetermined rules into a new DPCL user interface 1313 composed of rearranged and/or new content objects 1314.

Figure 14B:
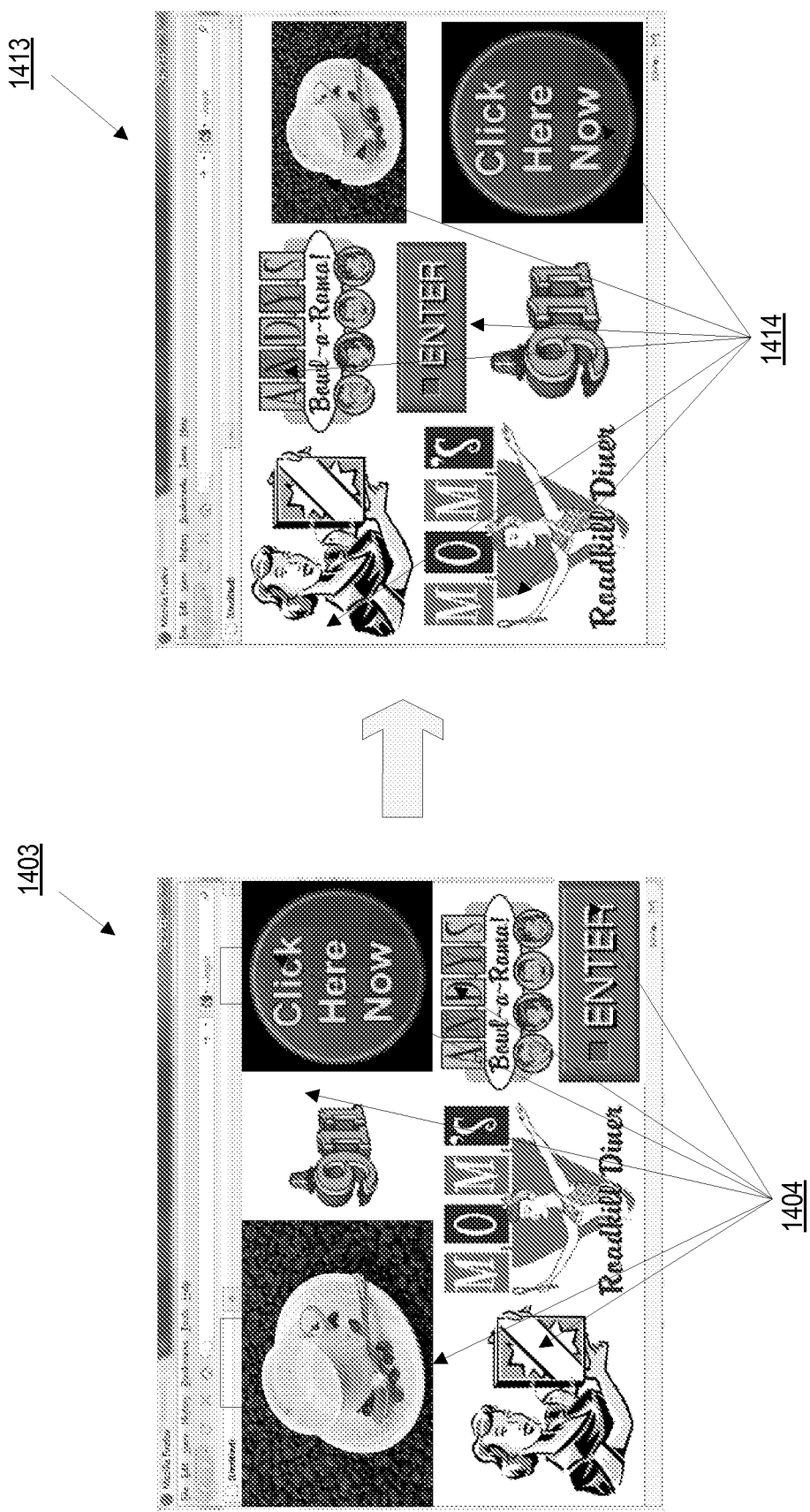

By way of further example, as illustrated in FIG. 14B, a first set of content objects 1404 is associated with the corresponding focal planes 1402 illustrated in FIG. 14A for a web browser interface. The content objects 1404 themselves, as well as their association with focal planes 1402 can similarly be transformed by way of an adaptive rules engine residing on a behavior adapter server (discussed in further detail below). In some embodiments, the focal plane framework 1401 is not changed and the association with respective content objects is altered. Alternatively, both the focal plane framework 1401 and the content 1404 associated with those focal planes can be transformed over time in accordance with predetermined rules into a new DPCL user interface 1413 composed of rearranged and/or new content objects 1414.

Figure 14C:
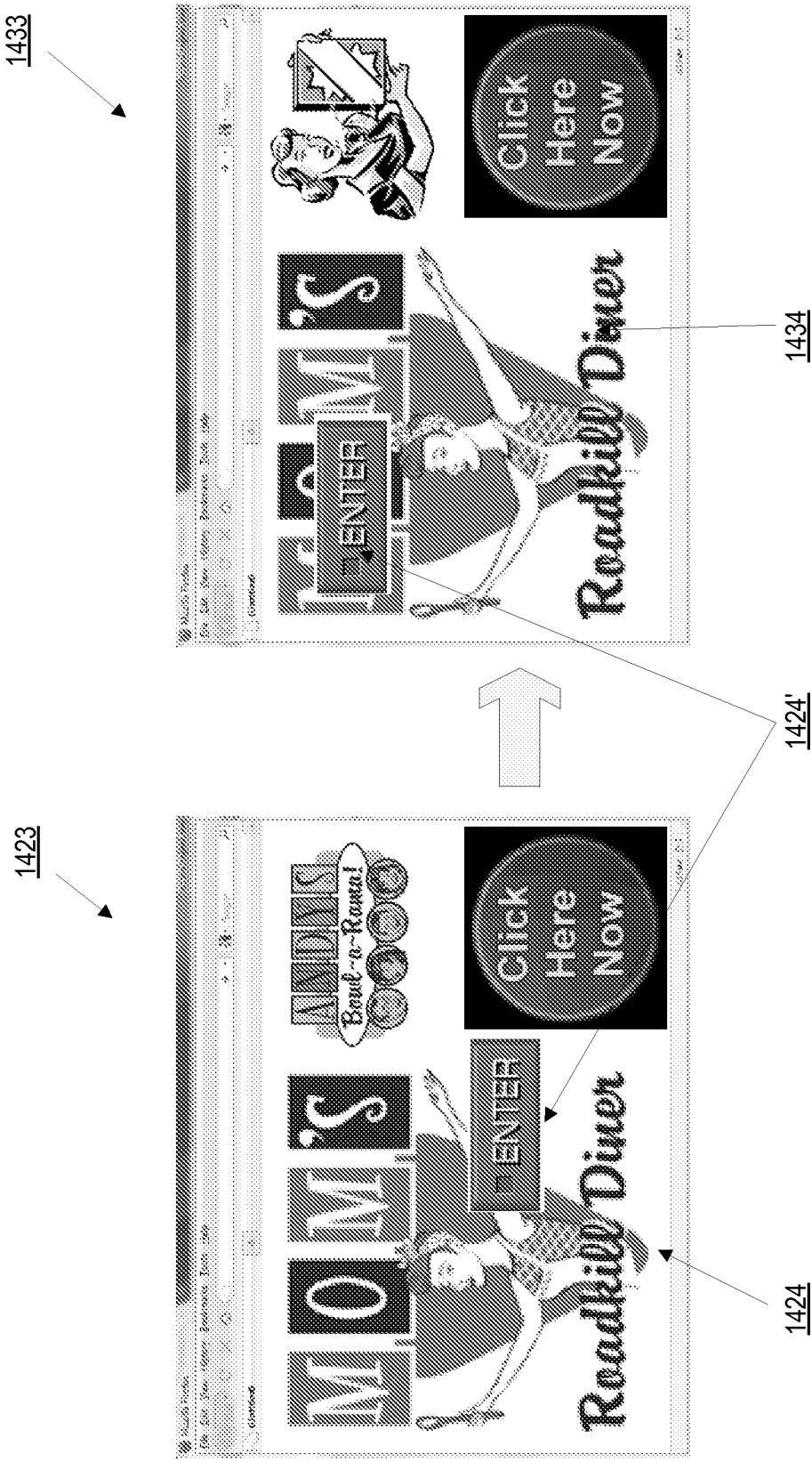

By way of still further example, as illustrated in FIG. 14C, a first set of content objects 1424 is associated with one or more of the corresponding focal planes 1402 illustrated in FIG. 14A for a web browser interface. A further content object 1424' can be associated with floating focal plane 1402', as illustrated. The content objects 1424 themselves, as well as their association with focal planes 1402 can similarly be transformed by way of an adaptive rules engine residing on a behavior adapter server (discussed in further detail below) from a first user interface 1423 into a second user interface 1433. As illustrated in FIG. 14C, some of the content objects 1424 remain the same size and are not moved, while others are replaced and floating content objects are moved, for example, in accordance with perceived or actual user habits vis-à-vis cursor placement. It will be further appreciated that content objects can be resized, for example, by associating the content object with more than one focal plane and/or permitting it to overlay other content objects.

It will be appreciated by those of skill in the art that updated pages can be sent to the user having varying layouts and/or content based on the user's behavior. In some implementations of the DPCL user interface, this can be accomplished by automatically sending updated pages to the user in predetermined time increments, such as once per every ten seconds, every twenty, thirty or forty seconds, or once per minute. In other implementations, the timing of sending updated pages can be a result of other metrics, such as the amount of interaction with particular focal planes, such as the amount of time a pointer cursor hovers over a particular focal plane. By way of further example, an updated page can be generated based on the usage data when the user engages in activity that would ordinarily result in a new page being delivered, such as by clicking on a button or other interactive object, by selecting a new page from a menu, or by requesting a page at another address.

Figure 15B:
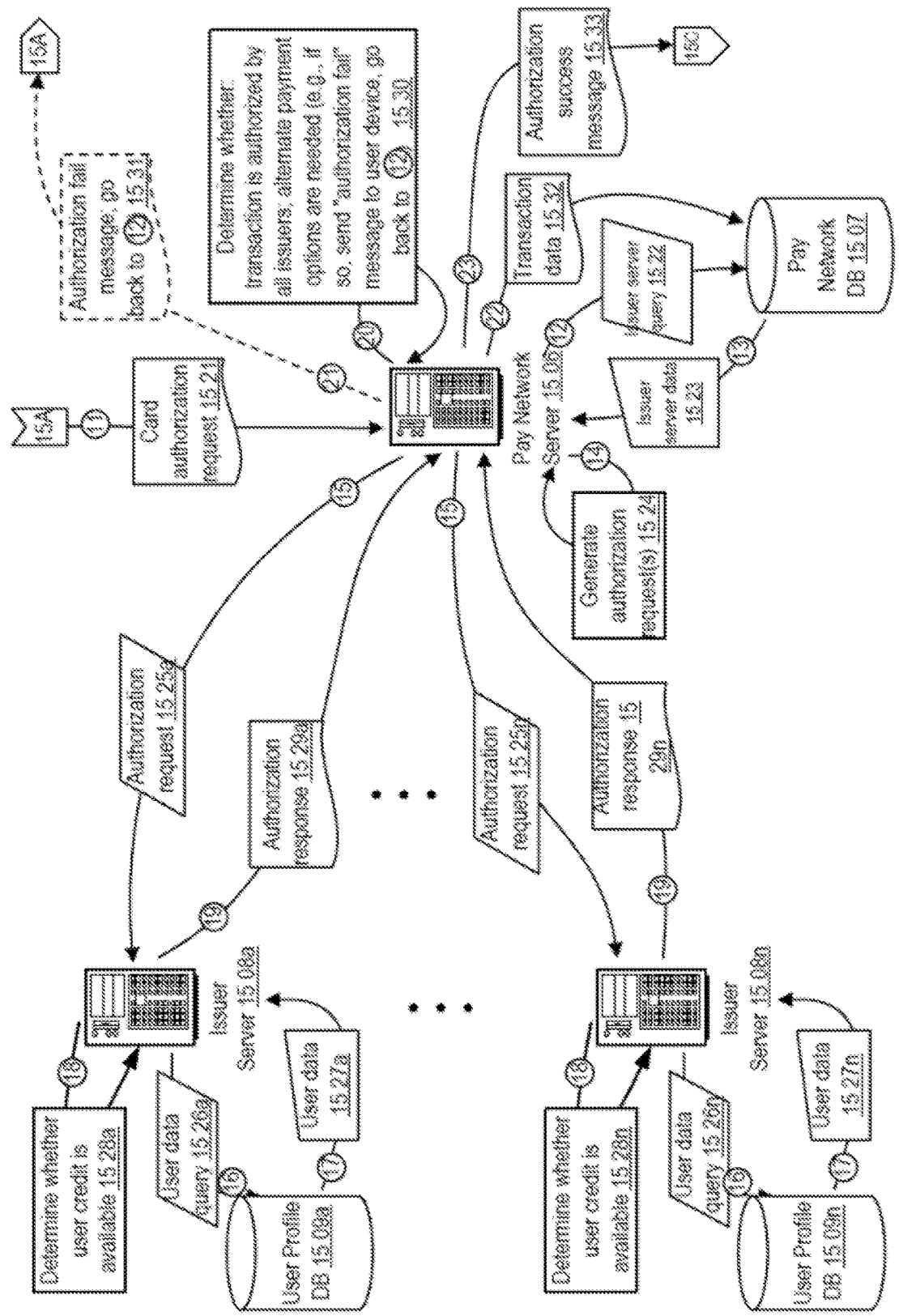

FIGS. 15A-D show data flow diagrams illustrating an exemplary system and procedure for providing a DPCL user interface in accordance with the disclosure. With reference to FIG. 15A, in some implementations, a user, e.g., 1501, may desire to request a page from a host, e.g., 1503, via, for example, a merchant online site, a search engine or the like. The user may communicate with a behavior adapter server at the host, e.g., 1503, via a client such as, but not limited to: a personal computer, mobile device, television, point-of-sale terminal, kiosk, ATM, and/or the like (e.g., 1502). For example, the user may provide user input, e.g., page request input 1511, into the client 1502 indicating the user's desire to request a page, or purchase a product after having interacted with a website implementing a DPCL user interface, as discussed below. For example, a user at a desktop station or in transit may submit a request for a page, for example, by typing or copying a URL into a browser, by clicking or touching on an object, or the like. The client 1502 may then generate a page request, e.g., 1512, and provide the page request to the behavior adapter server 1503. For example, the client 1502 may provide a (Secure) Hypertext Transfer Protocol ("HTTP(S)") GET message including the page details for the behavior adapter server in the form of data formatted according to the eXtensible Markup Language ("XML"). Below is an example HTTP(S) GET message including an XML-formatted page request for the behavior adapter server:

---

GET /<<jumpingui>> HTTP/1.1
Host: <<visa.com>>
User-Agent: Mozilla/5.0 (Macintosh; Intel Mac OS X 10.7; rv:8.0)
Gecko/20100101
Firefox/8.0
Accept: text/html,application/xhtml+xml,application/xml;q=0.9,*/*;q=0.8
Accept-Language: en-us,en;q=0.5
Accept-Encoding: gzip, deflate
Accept-Charset: ISO-8859-1,utf-8;q=0.7,*;q=0.7
Referer: <<http://www.visa.com/jumpingui >>

```
Cache-Control: max-stale=0
Connection: Keep-Alive
X-BlueCoat-Via: b629d7b84667d49e
```

In some implementations, the behavior adapter server 1503 may obtain the page request from the client 1502, and extract the page detail (e.g., XML data) from the page request. For example, the behavior adapter server 1503 may utilize a parser such as the example parsers described below in the discussion with reference to FIG. 18.

If the user has requested a page from the server 1503 in the first instance, a page containing a DPCL user interface (e.g., 1313, 1413) can be assembled into a HTML or other document by associating content objects 1304 with focal planes 1302 of a framework 1301 and delivering the requested page to the user as a requested page response 1513.

Once received by the client, the client 1502 displays the DPCL user interface to the user 1501. The user then interacts with the DPCL user interface, such as by moving a cursor about the user interface by using a pointing device, or by interacting with a touch screen.

In some embodiments, movement of a cursor about a user display can be tracked by way of a logging program that can be programmed in JavaScript, flash or the like, such as a java applet. If not already present on the client 1502, behavior adapter server 1503 can prepare and send such an application with page response 1513 to track the user's interaction with the user interface. Periodic updates of the data on the client device can then be compiled into usage data that is forwarded to the behavior adapter server 1503 either automatically, or with a subsequent page request 1515. The user 1501 can be provided with a request to opt in or to decline such tracking in a variety of ways, such as by way of a click wrap agreement or other disclosure explaining the nature of the tracking system that requires a user 1501 to check one or more check boxes and/or buttons to assent to participate.

Thus, if desired, a browser application executing on the client device 1502 may provide, on behalf of the user, a Hypertext Transfer Protocol ("HTTP(S)") GET message 1512 for a HyperText Markup Language ("HTML") page, wherein the HTML page that is returned 1513 includes JavaScript™ commands to embed an Adobe® Flash object including a logging application to monitor the user's pointing device/screen touches in the HTML page. An exemplary HTTP(S) GET message that may be provided by a browser executing on the client device to request an HTML page is provided below:

```
GET /jumpingui.html HTTP/1.1
Host: www.visa.com
User-Agent: Mozilla/4.0
```

In response to the page request 1512, the behavior adapter server 1503 (and/or an independent application server (not illustrated)) may provide the logging application requested by the client 1502. For example, with reference to the example browser HTTP(S) GET request above, the hosting server may provide an HTML page including a reference to an Adobe® Flash object (including the logging application) stored on behavior adapter server 1503 or other server. An exemplary HTML code listing including JavaScript™ commands referencing an Adobe® Flash object within the HTML page is provided below:

```
<html>
<div id="Logger">
    If you're seeing this, you don't have Flash Player installed.
</div>
<script type="text/javascript">
    var app = new SWFObject ("http://utilities.visa.com/logger.swf", "Media", "640", "480", "8", "#000000");
    app.addParam ("quality", "high");
    app.write ("Logger");
</script>
</html>
```

Upon obtaining the app, the client device 1502 may execute the app for presentation to the user. For example, with reference to the examples above, a web browser executing on the client device 1502 may render the HTML web page and may communicate with the server 1503 and/or application server (not shown) to download the Adobe® Flash object. An Adobe® Flash browser plug-in installed on the client device 1502 and operating in conjunction with the browser may play/execute the downloaded Flash object. The application permits the user 1501 to provide user input/feedback 1514 via a variety of mechanisms (e.g., mouse input in a graphical user interface, gestures on a touch-sensitive interface, pupil tracking, etc.). In some implementations the application can solicit additional inputs from the client device 1502, such as the local time, the geo-coordinates of the client/user, the local weather conditions and the like. In some implementations, the client device executing the app may generate, maintain, update and/or store data pertaining to the user's interaction with the app (e.g., an app state, an app data structure, a block of memory with data variables, a Flash movie clip indicating eye/pupil viewing patterns, etc.). For example, the app may store a data structure encoded according to the JavaScript Object Notation ("JSON") format. An exemplary JSON-encoded data structure is provided below:

```
"app_data"
{
"app_id": "A236269",
"app_name": "logger",
"user_id": "jqpublic",
"user_name": "John Q. Public",
"website_id": "AHWJ20100630",
```

-continued

```
"md5_auth", "f585e3efede0c3b400b25908f8fa3f6d",
"user_action": {
"timestamp": "2011-01-10 09:23:47",
"action_type": "halfclick",
"xy_coordinates": "342, 151",
"geographic_coordinates": "37 23.516 –122 02.625",
"local_atmospheric_temperature": "61.6F",
"local_atmospheric_relative_humidity":"73.2pct",
"perceived_pupil_vector_xy": "315, 146",
"local_weather": "overcast"}
}
```

As will be appreciated, the JSON-encoded data structure can include data relating to a variety of variables, including, for example: (i) each instance of mouse hovering at a particular x-y location, a time stamp relating to when the hovering began and the duration of such hovering, (ii) each instance of a mouse half click/single click/1.5 clicks/2.0 clicks and 2.5 clicks and so on, including a timestamp of when the clicking even occurred and the location of such event, (iii) the geolocation of the user and/or client including a time stamp as to when the user was at that location, (iv) the weather conditions at the location of the client 1502, (v) pupil tracking activity of the user including a time stamp, time increment, computed x-y location of the screen the user is computed to be viewing, and the like.

In some implementations, the logging application may provide data stored on the client device 1502 for the server 1503 or other servers. For example, an Adobe® Flash object may include ActionScript™ 3.0 commands to create a Secure Sockets Layer ("SSL") connection with a server, generate a message including a JSON-encoded data structure such as illustrated in the example above, and send the message via the secure SSL connection to the server. Exemplary commands, written substantially in the form of ActionScript™ 3.0, to create a secure SSL connection to a server, load data from a locally stored JSON-encoded data file, and send a message including the JSON-encoded data via the SSL connection to the server, are provided below:

```
// import required packages
import flash.events.*;
import flash.net.socket;
import flash.net.URLLoader;
import flash.net.URLRequest;
import com.adobe.serialization.json.*;
// obtain server socket policy file, create socket connection to server port
system.security.loadPolicyFile("xmlsocket://utilities.visa.com:208");
msg = new socket( );
msg.connect("https:// utilities.visa.com", 255);
// load data as text string from .json file
var loader:URLLoader = new URLLoader( );
var request:URLRequst = new URLRequest( );
request.URL = "data.json";
loader.dataformat = "text"
loader.load(request)
// transmit data to server via secure SSL connection, then close socket
msg.writeMultiByte(loader.data, "UTF-8");
msg.close( );
```

In some implementations, the server (e.g., 1503) receiving data from the client device 1502 executing the app may obtain the data, extract variables from the data if needed, and store the data and/or variables in a user profile having a plurality of fields as described herein in consumer transaction history database 1504. For example, with reference to the exemplary client transmission of JSON-encoded data via a SSL connection provided above, the server may be executing a Hypertext Preprocessor ("PHP") script. The PHP script may implement a SSL socket server which listens to incoming communications on a server port to which the client device sends the JSON-encoded data. Upon identifying an incoming communication, the PHP script may read the incoming message from the client device, parse the received JSON-encoded text data to extract information from the JSON-encoded text data into PHP script variables, and store the data and/or extracted information in a relational database accessible using the Structured Query Language ("SQL"). An exemplary listing, written substantially in the form of PHP/SQL commands, to accept JSON-encoded text data from a client device via a SSL connection, parse the text data to extract variables, and store the data to a database, is provided below:

```
<?PHP
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind ($sock, $address, $port) or die ('Could not bind to address');
socket_listen ($sock);
$client = socket_accept ($sock);
// read input data from client device in 1024 byte blocks until end of
message
do {
    $input =
    $input = socket read($client, 1024);
    $data .= $input;
} while($input != " ");
// parse data to extract variables
$obj = json_decode($data, true);
// store input data in consumer transaction history database 404
mysql_connect ("254.93.179.112",$DBserver,$password); // access
database server
mysql_select ("USAGEDATA.SQL"); // select database to append
mysql_query ("INSERT INTO usage_info (transmission)
VALUES ($data)"); // add data to usage_info table in Usagedata database
mysql_close ("USAGEDATA.SQL"); // close connection to database
?>
```

Thus, as set forth above, the usage data/input 1514 from the user 1501 can include a compilation of the x-y coordinates of the cursor over time, and/or a compilation/recording of the screen touches of the user 1501. This data can then be processed by the behavior adapter server 1503 at step 1516a. Processing the data can include transforming the cursor data into a usage map of the user interface in terms of x-y coordinates by correlating the x-y data over time with the x-y coordinates of each focal plane. The processing can additionally or alternatively include computing the amount of time that the cursor occupied each of the focal planes (1302, 1312, 1403, 1412) of the DPCL user interface. If desired, the focal planes can then be ranked, for example, from most occupied to least occupied over time, which in turn can be used to establish a focal plane hierarchy from most to least interacted, wherein focal planes having a relatively high interaction rate with a user/cursor are ranked higher than focal planes that are interacted with by the user/cursor less frequently. For example, the ranking can be numerical (1, 2, 3, 4 . . . ) and each focal plane can be assigned a rank as illustrated in FIG. 14A. This data can then be stored in tabular format, for example, in the consumer transaction history database 1504. The usage data may be provided in batches in specific time increments (e.g., every second, five seconds, ten seconds, twenty seconds, or the like) by action of the logging program or when user 1501 requests a further page.

The usage data can then be used to determine if the focal planes should be adjusted, and/or whether the content objects should be moved within the user interface to move a content object of interest (e.g., a credit card offer) to a focal plane that has been used more frequently by the user. The usage data can also be compared with earlier usage data, and/or with respect to a model intended to predict interaction with the different focal planes. If the user is interacting with the DPCL user interface in a manner that is determined to be favorable, the page may not be updated. However, if the usage data evidences that the cursor is associated with a focal plane that does not contain prioritized content, the behavior adapter server can send a modified page to the client 1502 for display to the user. Alternatively, if desired, the client 1502 may automatically generate a new page request and send the page request to the behavior adapter server in order to initiate a usage comparison and/or to generate a new page. If desired, new pages can be generated and sent in synchronization with the usage data updates provided by the client 1502.

In some implementations, the logging program (e.g., applet) can interact with a user-facing camera of the client 1502, such as a webcam on a tablet or desktop PC, or a camera on a smart phone (e.g., iPhone3, iPhone4, etc.) to track the eye movement of a user such that the usage data additionally or alternatively includes a user's eye movements. The camera in the client 1502 can thus be adapted via the logging program to focus on one or both eyes and record their movement as the user 1501 views the DPCL user interface. In some embodiments, the logging program can be adapted and configured to use contrast to locate the center of the pupil of the user 1501. Two types of eye tracking techniques that can be used include bright pupil and dark pupil. For example, in the case of bright pupil, if illumination (e.g., from the screen of client 1502) incident upon the eyes of the user 1501 is coaxial with the optical path to the screen, then the eye 1501 of the user can act as a retroreflector as the light reflects off the retina creating a bright pupil effect similar to red eye. User eye tracking can be used to supplement the tracking of the x-y coordinates of the cursor or screen touches of the user 1501.

In some implementations, the behavior adapter server 1503 may query, e.g., 1514, a consumer transaction history database, e.g., 1504, to obtain usage data, e.g., 1515, such as actual usage data of the particular user that made the page request, or other users that made similar page requests in the past. Similarly, server 1503 can provide usage data updates 1516*b* as illustrated in FIG. 15. For example, the database may be a relational database responsive to Structured Query Language ("SQL") commands. The behavior adapter server may execute a hypertext preprocessor ("PHP") script including SQL commands to query the database for usage data. An example PHP/SQL command listing, illustrating substantive aspects of querying the database, is provided below:

```
<?PHP
Header ('Content-Type: text/plain');
Mysql_connect ("254.93.179.112",$DBserver,$password); // access database server
Mysql_select db ("USAGEDATA.SQL"); // select database table to search
//create query
$query = "SELECT usage_info FROM Usagedata";
$result = mysql_query ($query); // perform the search query
mysql_close ("USAGE.SQL"); // close database access
?>
```

In some implementations, in response to obtaining the usage data, the behavior adapter server 1503 may generate a usage comparison to compare actual usage data of the user with previous actual user data of the particular user or other users, or with predicted behavior generated by a predictive behavior engine.

In some implementations, the behavior adapter server 1503 can generate and send an offer request 1516*c* to a merchant server 1505. Merchant server 1505 can then in turn generate a merchant offer 1516*e* for goods, services or the like and send the merchant offer 1516*d* to the behavior adapter server 1503 to include the merchant offer as a content object (1304, 1404) within a desired focal plane of the user interface (1303, 1403).

Thus, after receiving an updated page request and/or user data 1515, the behavior adapter server can generate and send an updated page in an updated page response 1517. The updated page can include more or less focal planes than the earlier page and adjust the position and size of the focal planes, as well as associating new content with the new focal planes, as appropriate. A page accompanying such a response 1517 can further include a merchant offer (from step 8(*b*)) illustrated in FIG. 15A, among other things.

In some implementations, a user can be a consumer that selects to initiate a payment process by way of the DPCL user interface, such as by interacting with an object (1304, 1314, 1404, 1414) including an offer for a sale of goods or services.

Upon obtaining the user payment input 1518, the user device may generate a card authorization request, e.g., 1520. For example, the user device may provide a card authorization request, e.g., 1521, on behalf of the user, a HTTP(S) GET message including the product order details for a pay network server, e.g., 1506, in the form of XML-formatted data. Below is an example HTTP(S) GET message including an XML-formatted card authorization request for the pay network server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
    <alerts_URL>www.merchant.com/shopcarts.php?sessionID=AEBB4356</alerts_URL>
    <timestamp>2011-02-22 15:22:43</timestamp>
    <user_ID>john.q.public@gmail.com</user_ID>
    <client_details>
        <client_IP>192.168.23.126</client_IP>
        <client_type>smartphone</client_type>
        <client_model>HTC Hero</client_model>
```

```xml
            <OS>Android 2.2</OS>
            <app_installed_flag>true</app_installed_flag>
        </client_details>
        <purchase_details>
            <num_products>1</num_products>
            <product>
                <product_type>book</product_type>
                <product_params>
                    <product_title>XML for dummies</product_title>
                    <ISBN>938-2-14-168710-0</ISBN>
                    <edition>2nd ed.</edition>
                    <cover>hardbound</cover>
                    <seller>bestbuybooks</seller>
                </product_params>
                <quantity>1</quantity>
            </product>
        </purchase_details>
        <merchant_params>
            <merchant_id>3FBCR4INC</merchant_id>
            <merchant_name>Books & Things, Inc.</merchant_name>
            <merchant_auth_key>1NNF484MCP59CHB27365</merchant_auth_key>
        </merchant_params>
        <account_params>
            <account_name>John Q. Public</account_name>
            <account_type>credit</account_type>
            <account_num>123456789012345</account_num>
            <billing_address>123 Green St., Norman, OK 98765</billing_address>
            <phone>123-456-7809</phone>
            <sign>/jqp/</sign>
            <confirm_type>email</confirm_type>
            <contact_info>john.q.public@gmail.com</contact_info>
        </account_params>
        <shipping_info>
            <shipping_adress>same as billing</shipping_address>
            <ship_type>expedited</ship_type>
            <ship_carrier>FedEx</ship_carrier>
            <ship_account>123-45-678</ship_account>
            <tracking_flag>true</tracking_flag>
            <sign_flag>false</sign_flag>
        </shipping_info>
</purchase_order>
```

In some implementations, the card authorization request generated by the user device 1502 may include a minimum of information required to process the purchase transaction. For example, this may improve the efficiency of communicating the purchase transaction request, and may also advantageously improve the privacy protections provided to the user and/or merchant. For example, in some implementations, the card authorization request may include at least a merchant ID, a session ID for the user's shopping session with the merchant, and a device ID of a device (e.g., smartphone) of the user that is linked to a user's virtual wallet.

In some implementations, the user may select to conduct the transaction using a one-time anonymized credit card number. For example, the DPCL may utilize a pre-designated anonymized set of card details. As another example, the DPCL may generate, e.g., in real-time, a one-time anonymous set of card details to securely complete the purchase transaction. In such implementations, the DPCL may automatically set the user profile settings such that the personal identifying information of the user will not be provided to the merchant and/or other entities. In some implementations, the user may be required to enter a user name and password to enable the anonymization features.

With reference to FIG. 15B, in some implementations, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained at a server of the acquirer.

In some implementations, the pay network server may generate a query, e.g., 1522, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 1508a-n, of the issuer(s) may maintain details of the user's account. In some implementations, a database, e.g., pay network database 1507, may store details of the issuer server(s) associated with the issuer(s). For example, the database may be a relational database responsive to Structured Query Language ("SQL") commands. The pay network server may query the pay network database for issuer server(s) details. For example, the pay network server may execute a hypertext preprocessor ("PHP") script including SQL commands to query the database for details of the issuer server(s). An example PHP/SQL command listing, illustrating substantive aspects of querying the database, is provided below:

```
<?PHP
Header ('Content-Type: text/plain');
Mysql_connect ("254.93.179.112",$DBserver,$password); // access database server
Mysql_select_db ("ISSUERS.SQL"); // select database table to search
//create query for issuer server data
$query = "SELECT issuer_name issuer_address issuer_id ip_address mac_address auth_key port_num security_settings_list FROM IssuerTable WHERE account_num LIKE '%' $accountnum";
$result = mysql_query ($query); // perform the search query
mysql_close ("ISSUERS.SQL"); // close database access
?>
```

In response to obtaining the issuer server query, e.g., 1522, the pay network database may provide, e.g., 1523, the requested issuer server data to the pay network server. In some implementations, the pay network server may utilize the issuer server data to generate authorization request(s), e.g., 1524, for each of the issuer server(s) selected based on the predefined payment settings associated with the user's virtual wallet, and/or the user's payment options input, and provide the card authorization request(s), e.g., 1525a-n, to the issuer server(s), e.g., 1508a-n. In some implementations, the authorization request(s) may include details such as, but not limited to: the costs to the user involved in the transaction, card account details of the user, user billing and/or shipping information, and/or the like. For example, the pay network server may provide a HTTP(S) POST message including an XML-formatted authorization request similar to the example listing provided below:

```
POST /authorization.php HTTP/1.1
Host: www.issuer.com
Content-Type: Application/XML
Content-Length: 624
<?XML version = "1.0" encoding = "UTF-8"?>
<card_query_request>
    <query_ID>VNEI39FK</query_ID>
    <timestamp>2011-02-22 15:22:44</timestamp>
    <purchase_summary>
        <num_products>1</num_products>
        <product>
            <product_summary>Book - XML for dummies</product_summary>
            <product_quantity>1</product_quantity?
        </product>
    </purchase_summary>
    <transaction_cost>$22.61</transaction_cost>
    <account_params>
        <account_type>checking</account_type>
        <account_num>1234567890123456</account_num>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
</card_query_request>
```

In some implementations, an issuer server may parse the authorization request(s), and based on the request details may query a database, e.g., user profile database 1509a-n, for data associated with an account linked to the user. For example, the issuer server may issue PHP/SQL commands similar to the example provided below:

```
<?PHP
Header ('Content-Type: text/plain');
Mysql_connect ("254.93.179.112",$DBserver,$password); // access database server
mysql_select_db ("USERS.SQL"); // select database table to search
//create query for user data
$query = "SELECT user_id user_name user_balance account_type FROM UserTable
WHERE account_num LIKE '%' $accountnum";
$result = mysql_query ($query); // perform the search query
mysql_close ("USERS.SQL"); // close database access
?>
```

In some implementations, on obtaining the user data, e.g., 1527a-n, the issuer server may determine whether the user can pay for the transaction using funds available in the account, e.g., 1528a-n. For example, the issuer server may determine whether the user has a sufficient balance remaining in the account, sufficient credit associated with the account, and/or the like. Based on the determination, the issuer server(s) may provide an authorization response, e.g., 1529*a-n*, to the pay network server. For example, the issuer server(s) may provide a HTTP(S) POST message similar to the examples above. In some implementations, if at least one issuer server determines that the user cannot pay for the transaction using the funds available in the account, see e.g., 1530-1531, the pay network server may request payment options again from the user (e.g., by providing an authorization fail message 1531 to the user device and requesting the user device to provide new payment options), and re-attempt authorization for the purchase transaction. In some implementations, if the number of failed authorization attempts exceeds a threshold, the pay network server may abort the authorization process, and provide an "authorization fail" message to the merchant server, user device and/or client.

Figure 15C:
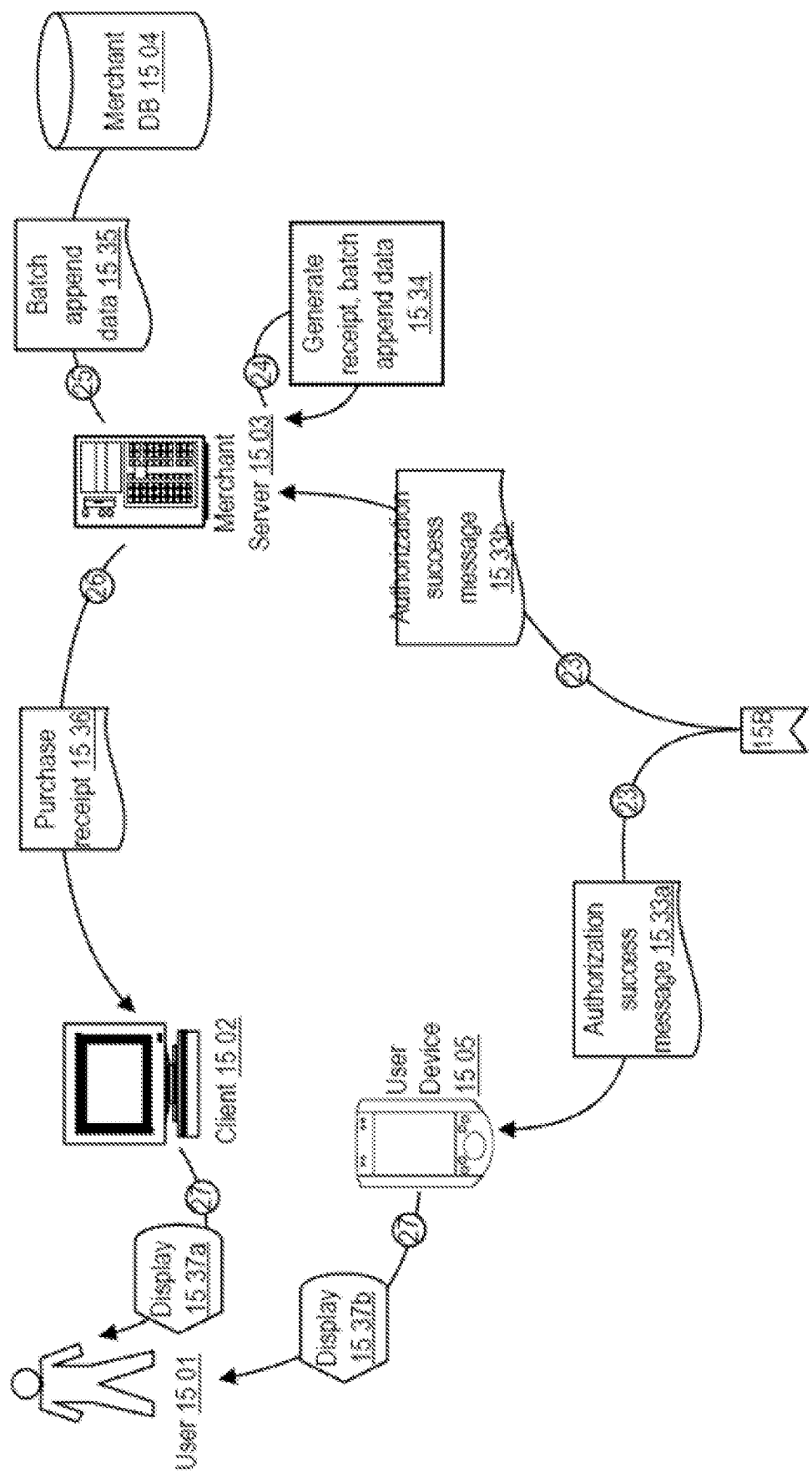

With reference to FIG. 15C, in some implementations, the pay network server may obtain the authorization message including a notification of successful authorization, see e.g., 1530, 1533, and parse the message to extract authorization details. Upon determining that the user possesses sufficient funds for the transaction, the pay network server may generate a transaction data record, e.g., 1532, from the authorization request and/or authorization response, and store the details of the transaction and authorization relating to the transaction in a transactions database. For example, the pay network server may issue PHP/SQL commands similar to the example listing below to store the transaction data in a database:

```
<?PHP
Header ('Content-Type: text/plain');
mysql_connect ("254.92.185.103",$DBserver,$password); // access database server
mysql_select ("TRANSACTIONS.SQL"); // select database to append
mysql_query ("INSERT INTO PurchasesTable (timestamp, purchase_summary_list,
num_products, product_summary, product_quantity, transaction_cost,
account_params_list, account_name, account_type, account_num, billing_addres,
zipcode, phone, sign, merchant_params_list, merchant_id, merchant_name,
merchant_auth_key)
VALUES (time( ), $purchase_summary_list, $num_products, $product_summary,
$product_quantity, $transaction_cost, $account_params_list, $account_name,
$account_type, $account_num, $billing_addres, $zipcode, $phone, $sign,
$merchant_params_list, $merchant_id, $merchant_name, $merchant_auth_key)"); // add
data to table in database
mysql_close ("TRANSACTIONS.SQL"); // close connection to database
?>
```

In some implementations, the pay network server may forward an authorization success message, e.g., 1533*a-b*, to the user device and/or merchant server. The merchant may obtain the authorization message, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 1534, and store the XML data file, e.g., 1535, in a database, e.g., merchant database 1504. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MCF59CHB27365</merchant_auth_key>
    <account_number>123456789</account_number>
</merchant_data>
<transaction_data>
    <transaction 1>
        . . .
    </transaction 1>
    <transaction 2>
        . . .
    </transaction 2>
    .
    .
    .
    <transaction n>
        . . .
```

```
</transaction n>
</transaction_data>
```

In some implementations, the server may also generate a purchase receipt, e.g., 1534, and provide the purchase receipt to the client, e.g., 1536. The client may render and display, e.g., 1537*a*, the purchase receipt for the user. In some implementations, the user device 1505 may also provide a notification of successful authorization to the user, e.g., 1537*b*. For example, the client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 15D:
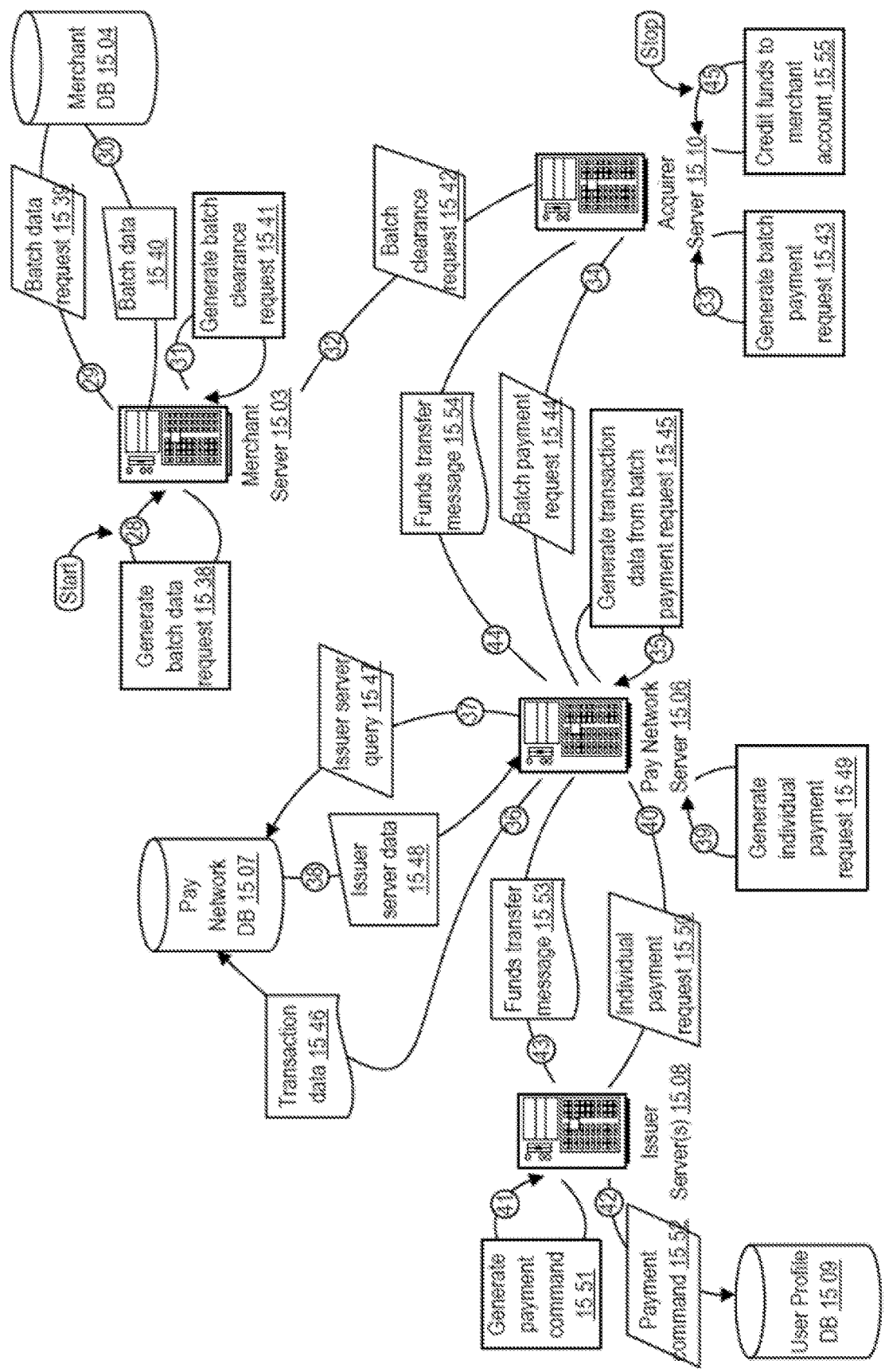

With reference to FIG. 15D, in some implementations, the merchant server may initiate clearance of a batch of authorized transactions. For example, the merchant server may generate a batch data request, e.g., 1538, and provide the request, e.g., 1539, to a database, e.g., merchant database 1504. For example, the merchant server may utilize PHP/SQL commands similar to the examples provided above to query a relational database. In response to the batch data request, the database may provide the requested batch data, e.g., 1540. The server may generate a batch clearance request, e.g., 441, using the batch data obtained from the database, and provide, e.g., 1542, the batch clearance request to an acquirer server, e.g., 1510. For example, the merchant server may provide a HTTP(S) POST message including XML-formatted batch data in the message body for the acquirer server. The acquirer server may generate, e.g., 1543, a batch payment request using the obtained batch clearance request, and provide the batch payment request to the pay network server, e.g., 1544. The pay network server may parse the batch payment request, and extract the transaction data for each transaction stored in the batch payment request, e.g., 1545. The pay network server may store the transaction data, e.g., 1546, for each transaction in a database, e.g., pay network database 1507. For each extracted transaction, the pay network server may query, e.g., 1547-1548, a database, e.g., pay network database 1507, for an address of an issuer server. For example, the pay network server may utilize PHP/SQL commands similar to the examples provided above. The pay network server may generate an individual payment request, e.g., 1549, for each transaction for which it has extracted transaction data, and provide the individual payment request, e.g., 1550, to the issuer server, e.g., 1508. For example, the pay network server may provide a HTTP(S) POST request similar to the example below:

```
POST /requestpay.php HTTP/1.1
Host: www.issuer.com
Content-Type: Application/XML
Content-Length: 788
<?XML version = "1.0" encoding = "UTF-8"?>
<pay_request>
     <request_ID>CNI4ICNW2</request_ID>
     <timestamp>2011-02-22 17:00:01</timestamp>
     <pay_amount>$34.78</pay_amount>
     <account_params>
          <account_name>John Q. Public</account_name>
          <account_type>credit</account_type>
          <account_num>123456789012345</account_num>
          <billing_address>123 Green St., Norman, OK
98765</billing_address>
          <phone>123-456-7809</phone>
          <sign>/jqp/</sign>
     </account_params>
     <merchant_params>
          <merchant_id>3FBCR4INC</merchant_id>
          <merchant_name>Books & Things, Inc.</merchant_name>
          <merchant_auth_key>1NNF484MCP59CHB27365</merchant_auth_key>
     </merchant_params>
     <purchase_summary>
          <num_products>1</num_products>
          <product>
               <product_summary>Book - XML for
dummies</product_summary>
               <product_quantity>1</product_quantity?
          </product>
     </purchase_summary>
</pay _request>
```

In some implementations, the issuer server may generate a payment command, e.g., 1551. For example, the issuer server may issue a command to deduct funds from the user's account (or add a charge to the user's credit card account). The issuer server may issue a payment command, e.g., 1552, to a database storing the user's account information, e.g., user profile database 1509. The issuer server may provide a funds transfer message, e.g., 1553, to the pay network server, which may forward, e.g., 1554, the funds transfer message to the acquirer server. An example HTTP(S) POST funds transfer message is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some implementations, the acquirer server may parse the funds transfer message, and correlate the transaction (e.g., using the request_ID field in the example above) to the merchant. The acquirer server may then transfer the funds specified in the funds transfer message to an account of the merchant, e.g., 1555.

Figure 16A:
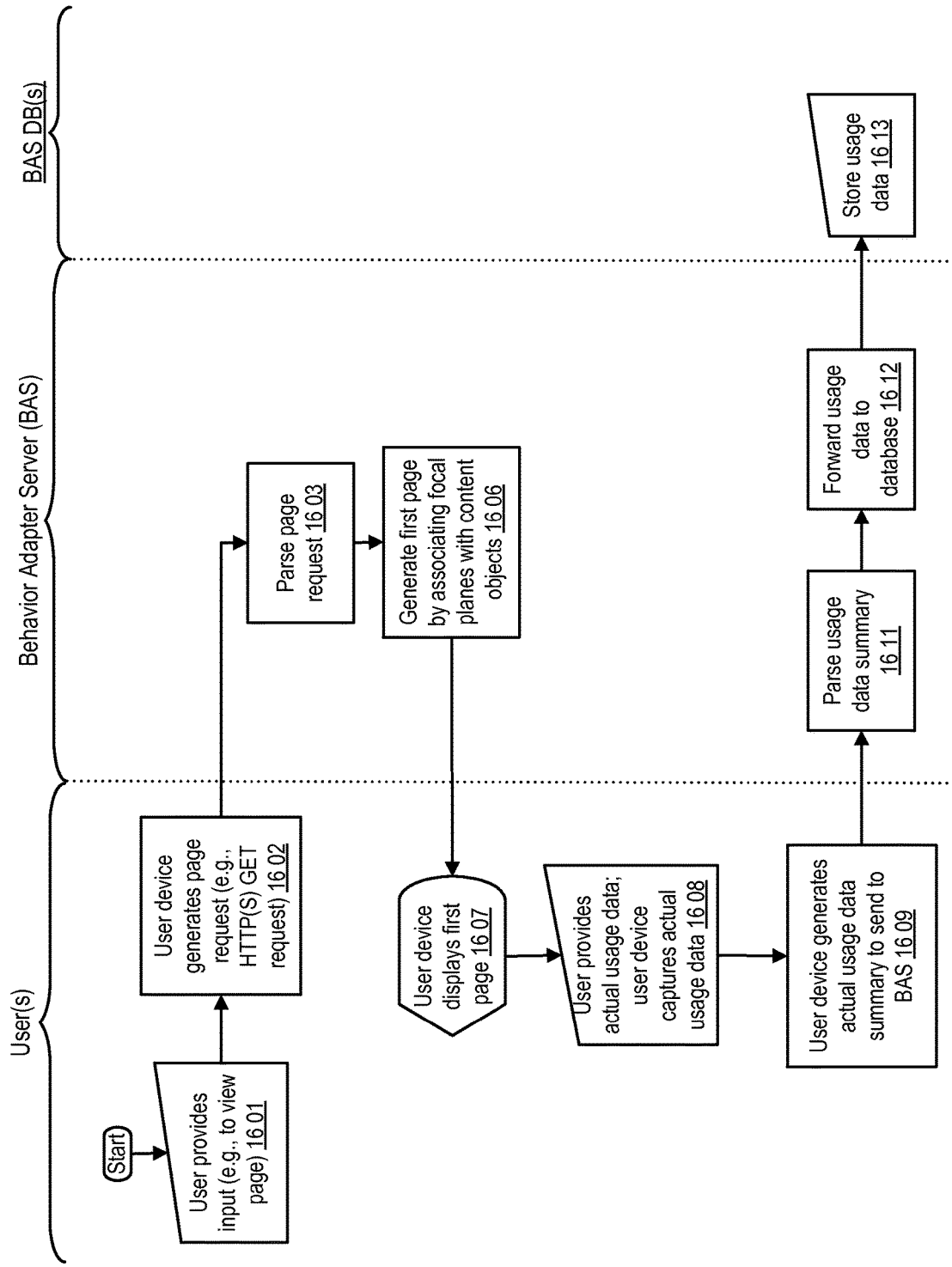
Figure 16B:
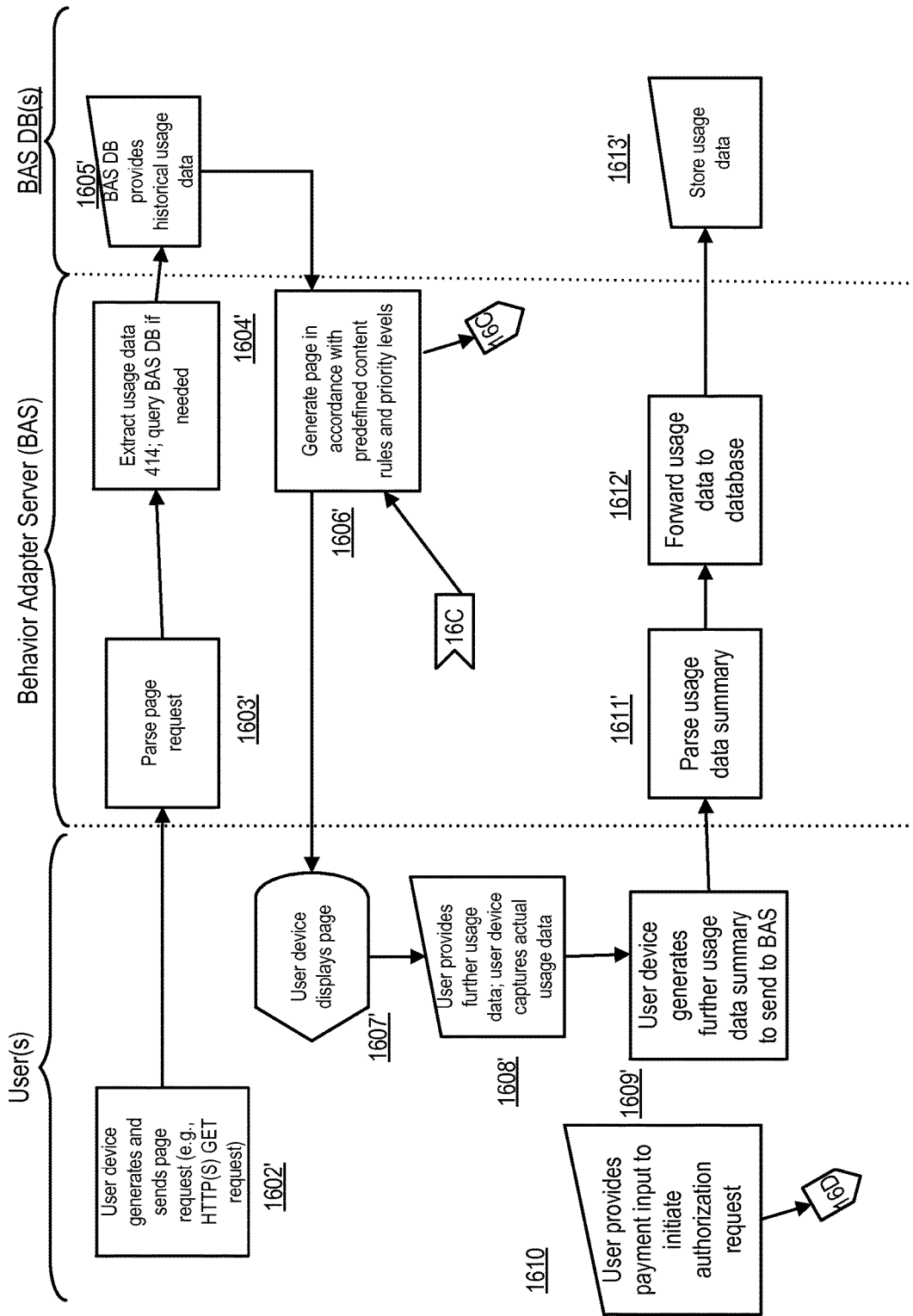

FIGS. 16A-G show logic flow diagrams illustrating example aspects of executing a DPCL user interface or application in some embodiments of the DPCL component 1800. For example, with reference to FIG. 16A, an exemplary DPCL Usage Data Collection ("JUIUDC") Component 1600a is illustrated, whereas FIGS. 16B-C illustrate an exemplary DPCL Page Rendering ("JUIPR") Component 1600b and FIGS. 16D-G illustrate aspects of an exemplary Jumping UI Payment Execution ("JUIPE") component 1600c.

In some implementations, a user may desire to view a page on a remote server (e.g., behavior adapter server 1503). The user may communicate with the behavior adapter server via a client (e.g., 1502). For example, the user may provide user input, e.g., 1601, into the client indicating the user's desire to request the page. The client (e.g. 1502) may generate a page request, e.g., 1602, and provide the page request to the behavior adapter server. The behavior adapter server may obtain the page request from the client, and parse and extract the page detail (e.g., XML data) from the behavior adapter request, e.g., 1603. For example, the behavior adapter server may utilize a parser such as the example parsers described below in the discussion with reference to FIG. 18. The behavior adapter server may extract the page data, as well as the client data from the page request.

In response to obtaining the usage data, the behavior adapter server may generate, e.g., 1606, a first page to be sent to the user. For example, preparing the first page can include defining the layout of the first page by separating the first page into a plurality of discrete focal planes as described herein. Any desired number and arrangement of focal planes can be used. Focal planes can be any desired shape. While the focal planes illustrated in FIGS. 13 and 14 are illustrated as being rectangular, any suitable shape (e.g., trapezoidal, triangular, rhomboidal) and the like can be used. Generating the page also can include associating each discrete focal plane of the first page with a focal plane priority level within a focal plane hierarchy. The priority level can be, for example, from 1-n wherein 1 is the highest priority and each subsequent number is of a lower priority. If desired, two or more of the focal planes can be assigned different focal plane priority levels within the focal plane hierarchy. By way of further example, two focal planes can similarly be assigned the same priority level within the hierarchy.

With reference to FIG. 16B, in some embodiments of the DPCL user interface, the focal plane priority levels can be assigned based on predictive usage data obtained from a data storage server (e.g., consumer transaction database 1504). As discussed herein, the predictive usage data can be indicative of the amount that at least one user is expected to interact with each focal plane of the DPCL user interface. In some implementations (e.g., FIG. 16B), the behavior adapter server 1503 may query, e.g., 1604', a consumer transaction history database (e.g., 1504) to obtain usage data 1514, e.g., 1605', such as the amount that the particular user or previous users interacted with various focal planes process the page request.

In further accordance with the disclosure, in some embodiments, assembling the first page can further include associating a content object (e.g., advertisement, text content, hyperlinks, actuation buttons, etc.) with each focal plane based on the focal plane priority level of each focal plane in association with at least one predefined content rule. The content rule(s) can be used to assign a content priority level with each content object from highest to lowest. For example, if the proprietor of the DPCL user interface wishes for certain content (e.g., a credit card offer) to be highly likely to be selected by a user, it can in turn be assigned a highest priority within the content priority level.

Thus, in a first aspect, a first group of content objects that can be used to populate the DPCL user interface may be provided, for example, on a content object database that is in operative association with the behavior adapter server 1503. Various content rules can then be applied to rank the content in terms of priority, or other criteria, and then associated with each content location/focal plane.

For example, a content rule can be provided that mandates a particular content object to be present at a specified focal plane. In some implementations, this can result, for example, in an advertisement of the website proprietor always being located at a bottom of the page. A subset of content objects can be identified from the first group of content objects in association with demographics of the particular user. For example, an advertisement for a company near the user's geographic location can be selected as a content object to be used in association with the user's zip code on file and/or the user's geolocation if they are using a smartphone or tablet that is GPS enabled.

The content priority level can also be assigned a priority level that permits the content to take priority over all content except, for example, content that is mandated. A principal content level can also be assigned, wherein the principal content level is associated with "principal" content; that is to say, the main content of the page or application with which the page is associated, such as an article or the like. By way of further example, principal content can occupy a plurality of focal planes and other types of content can float over the principal content and occupy a subset of the focal planes. Thus, a "preferred" content level can be defined that permits content to overlay principal content and move about the user interface. Similarly, some content can be assigned a low or no-priority level, permitting it to be moved or removed as the user or the proprietor of the page may prefer.

Thus, in accordance with the disclosure it is possible to obtain in-session and summarized behavioral metrics representing how an individual, a user group (e.g., by community or demographic), and/or a user base (e.g., all users of an application) interacts with pages. This information can then be analyzed and recorded and made available to a page rendering engine to render pages.

In further accordance with FIG. 16A, once the first page is rendered, the server 1503 may provide the page client device for display, e.g., 1606. The client (e.g., 1502) may then obtain and display the page on a display screen associated with the client device. In some implementations, an adapter control can be included within a DPCL web application to instrument an adapter framework to define the page layout and provide prediction and adaptation information. The adapter framework can be available to the page delivered to the user (e.g., as a copy-paste script statement) and self-instrument with the content objects.

With further reference to FIG. 16A, the client (e.g., 1502) can then generate and forward an actual usage summary 1609 to be sent to the behavior adapter server 1503. For example, the user may provide usage input into the user device or client, e.g., 1608. Upon obtaining the usage information, the user device or client may generate a usage summary, e.g., 1609, and provide the usage summary to the behavior adapter server 1503.

The behavior adapter server 1503 then parses the usage data summary 1611 and can then forward the usage data to the database 1612. This usage data can then be stored in a database at 1613.

In some implementations, as illustrated in FIG. 16B, an adapter framework can evaluate content against summarized behavioral data at 1604', 1606' to determine if the proper content objects have been associated with the proper focal planes. If desired, the actual usage data can be compared with previous usage data in a database obtained at 1605' to determine if the recent data is within statistical parameters, or if it is outlying data and should be discarded. The result of the analysis is then used to generate an updated page at 1606' by re-associating focal planes with content as needed. A new page is rendered and forwarded to the client for display at 1607'. The process then continues in loop fashion, monitoring usage and updating the page accordingly.

As illustrated in FIG. 16C, the JUIPR operates to first determine the number of focal planes and assign focal plane priorities to each focal plane at 1660 as discussed herein. This can include analyzing actual usage data (e.g., 1514) to determine which of the focal planes were interacted with by user 1501 and the type and degree of interactions at 1662. This data compilation thereby permits the focal plane to be ranked based on use (e.g., from 1 to N) at 1663. Next, as illustrated at 1664, the BAS or other database can be queried for a variety of things, including for example (i) historical usage data of user 1501, other users, or groups of users, (ii) results of a predictive model indicating which focal planes were predicted by the model to be interacted with the most, as well as the resulting focal plane ranking from such a model, (iii) focal plane priority rules to determine, for example, if some focal planes should always be at a predetermined location on the user interface or of a certain size, and the like. The BAS DB or other database provides the queried subject matter at 1665 to the Behavior Adapter Server. The BAS 1503 then determines, for example, if the number, size, arrangement or ranking or ordering of the focal planes should be altered at 1666. Based on this determination, the framework of the page is modified, if needed, at 1668 by adjusting the number, shape, size and/or arrangement of the focal planes.

With further reference to FIG. 16C, having arranged the framework for the requested page (e.g., 1513, 1517) the content objects to be displayed are identified and assigned content priority levels at 1670. The BAS DB or other database can be queried at 1672 for specific items of content and/or content priority levels of such content. The BAS DB or other database can accordingly provide such data to the BAS 1503. Next, at 1680, the content objects are correlated with the focal planes, for example, by matching the priority level of the focal planes with the priority levels of the content objects in accordance, for example, with one or more predefined rules. In some embodiments, the rule can simply specify a match between high ranking focal planes with content objects (e.g., 1-1, 2-2, n-n). Other rules can be used additionally or alternatively, as desired. The new page (e.g., 1513, 1517) is then assembled with the predefined rules, etc., and then sent to the user for display (see, e.g., 1607' at FIG. 5(B)).

Figure 16D:
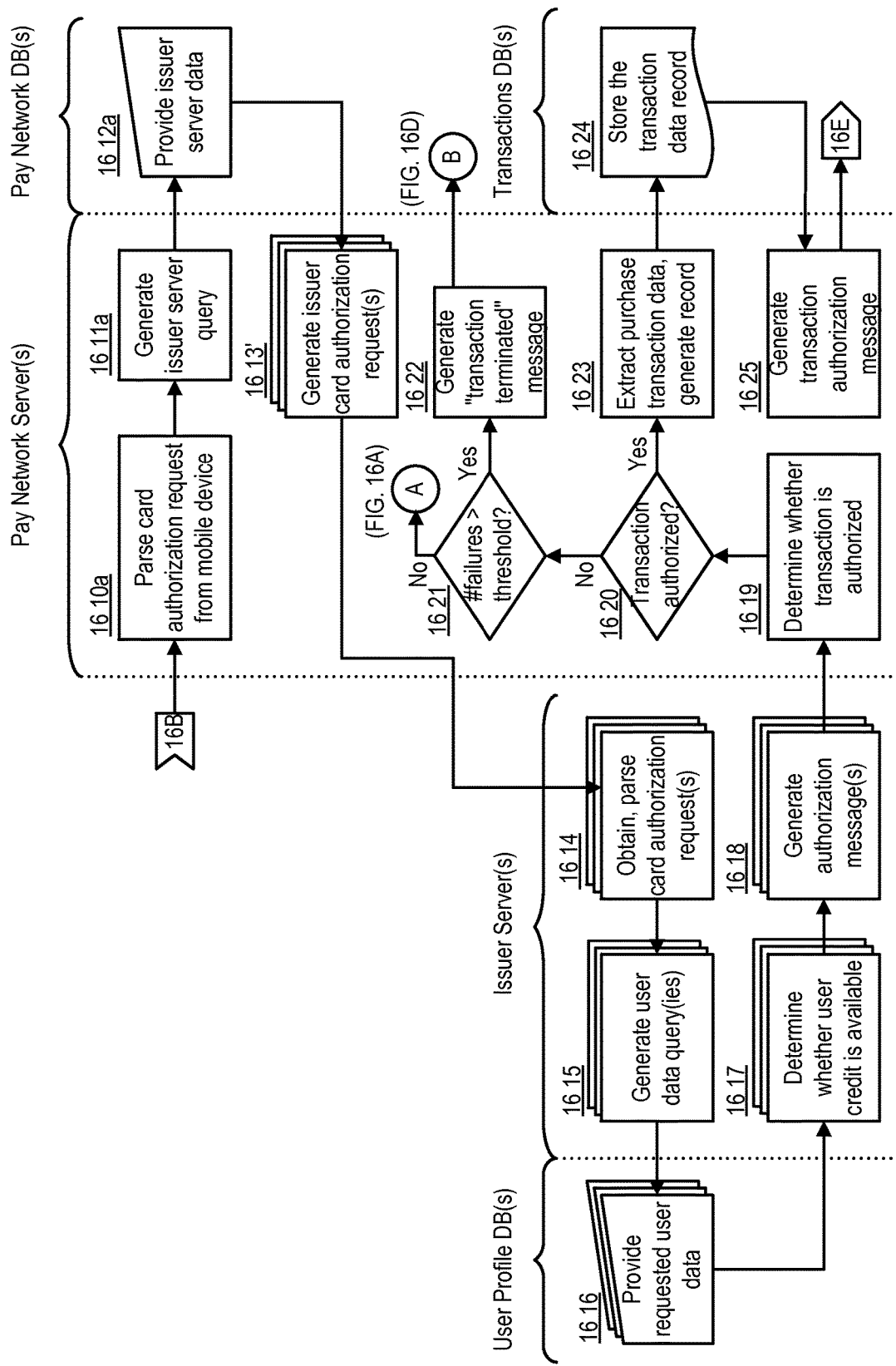

With reference to FIG. 16D, in some implementations, the user may provide payment input that causes the client (e.g., 1502) to make a card authorization request 1610 in the event the user wishes to initiate a purchase transaction by way of the DPCL user interface. The pay network server may parse the card authorization request, e.g., 1610a, and generate a query, e.g., 1611a, for issuer server(s) corresponding to the user-selected payment options. In some implementations, a pay network database may store details of the issuer server(s) associated with the issuer(s). In response to obtaining the issuer server query, the pay network database may provide, e.g., 1612a, the requested issuer server data to the pay network server. In some implementations, the pay network server may utilize the issuer server data to generate authorization request(s), for each of the issuer server(s), and provide the card authorization request(s) to the issuer server(s).

In some implementations, an issuer server may parse the authorization request(s), and based on the request details may query a user profile database for data associated with an account linked to the user. In some implementations, on obtaining the user data, the issuer server may determine whether the user can pay for the transaction using funds available in the account, e.g., 1617. For example, the issuer server may determine whether the user has a sufficient balance remaining in the account, sufficient credit associated with the account, and/or the like. Based on the determination, the issuer server(s) may provide an authorization response, e.g., 1618, to the pay network server. In some implementations, if at least one issuer server determines, e.g., 1619, that the user cannot pay for the transaction using the funds available in the account, see e.g., 1620, option "No," the pay network server may request payment options again from the user (see e.g., 1621, option "No," by providing an authorization fail message to the user device and requesting the user device to provide new payment options), and re-attempt authorization for the purchase transaction. In some implementations, if the number of failed authorization attempts exceeds a threshold, see, e.g., 1621, option "Yes," the pay network server may abort the authorization process, and provide an "authorization fail" message to the merchant server, user device and/or client, e.g., 1622.

In some implementations, the pay network server may obtain the authorization message including a notification of successful authorization, see e.g., 1620, option "Yes,", and parse the message to extract authorization details. Upon determining that the user possesses sufficient funds for the transaction, the pay network server may generate a transaction data record, e.g., 1623, from the authorization request and/or authorization response, and store, e.g., 1624, the details of the transaction and authorization relating to the transaction in a transactions database.

Figure 16E:
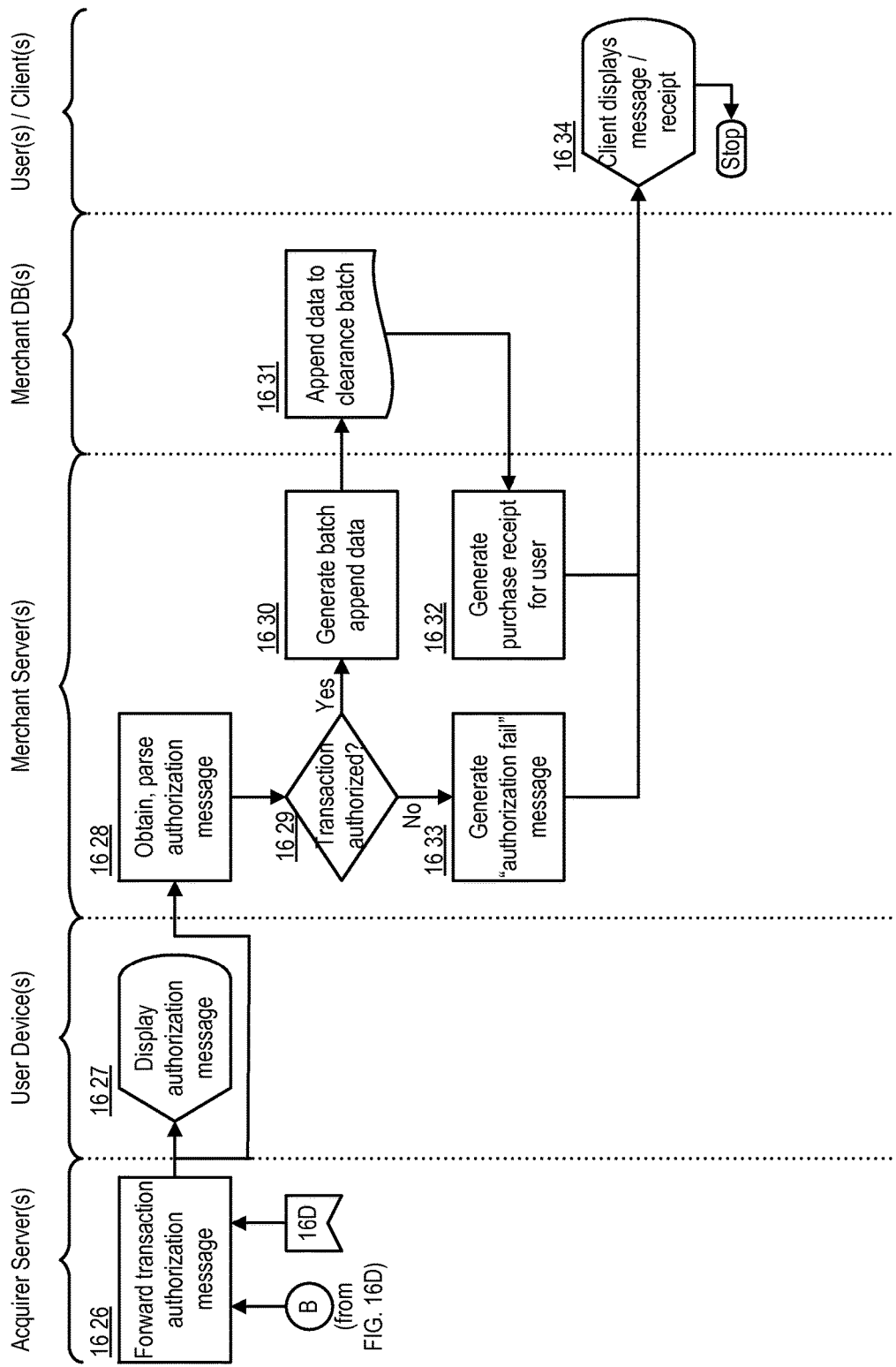

With reference to FIG. 16E, in some implementations, the pay network server may forward an authorization success message, e.g., 1625, to the user device and/or merchant server, sometimes via the acquirer server, e.g. 1626. The merchant may parse the authorization message, e.g., 1628, and determine from it that the user possesses sufficient funds in the card account to conduct the transaction, see, e.g., 1629. The merchant server may add a record of the transaction for the user to a batch of transaction data relating to authorized transactions, see, e.g., 1630-1631. In some implementations, the merchant server may also generate a purchase receipt, e.g., 1632, and provide the purchase receipt to the client. The client may render and display, e.g., 1634, the purchase receipt for the user. In some implementations, the user device 405 may also provide a notification of successful authorization to the user.

Figure 16F:
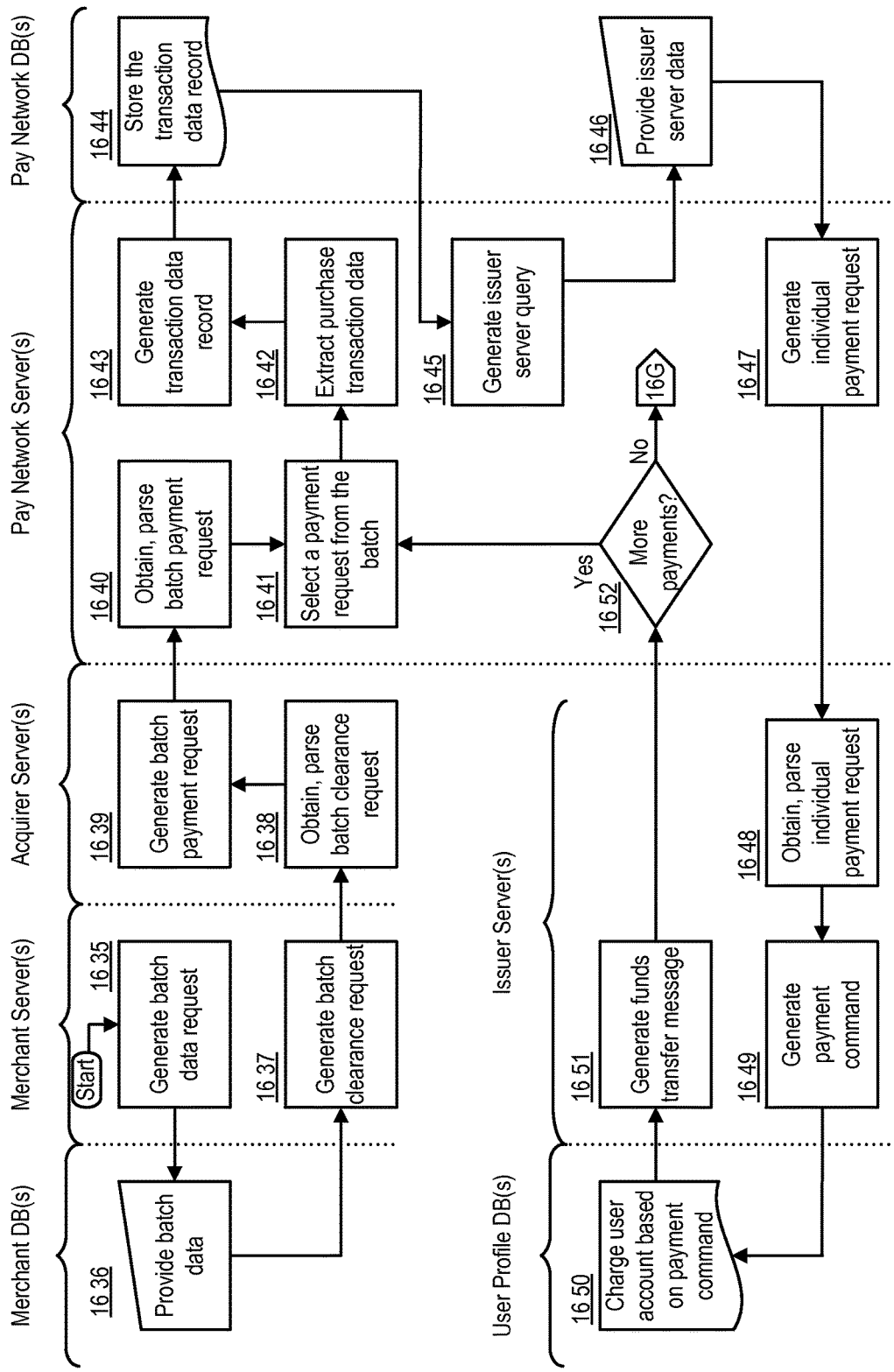
Figure 16G:
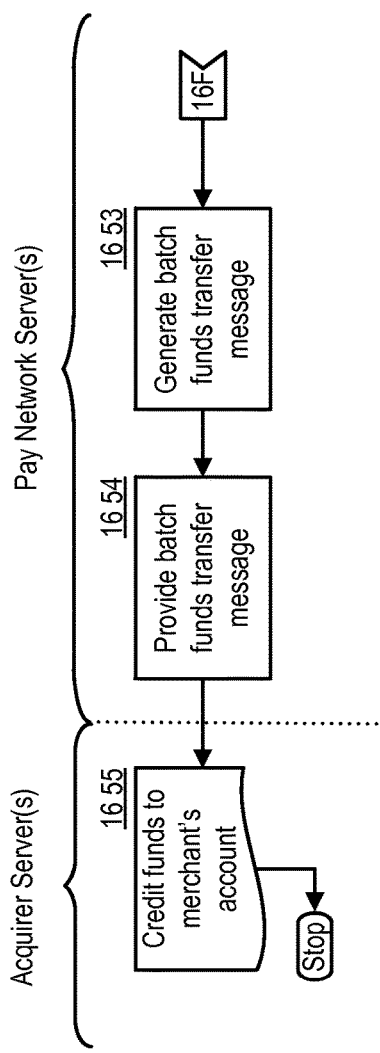

With reference to FIGS. 16F-G, in some implementations, the merchant server may initiate clearance of a batch of authorized transactions. For example, the merchant server may generate a batch data request, e.g., 1635, and provide the request, e.g., 1636, to a database, e.g., merchant database. In response to the batch data request, the database may provide the requested batch data, e.g., 1636. The server may generate a batch clearance request, e.g., 1637, using the batch data obtained from the database, and provide the batch clearance request to an acquirer server. The acquirer server may generate, e.g., 1639, a batch payment request using the obtained batch clearance request, and provide the batch payment request to the pay network server. The pay network server may parse the batch payment request, and extract the transaction data for each transaction stored in the batch payment request, e.g., 1640-1642. The pay network server may store the transaction data, e.g., 1643-1644, for each transaction in a database, e.g., pay network database. For each extracted transaction, the pay network server may query, e.g., 1645-1646, a database, e.g., pay network database, for an address of an issuer server. The pay network server may generate an individual payment request, e.g., 1647, for each transaction for which it has extracted transaction data, and provide the individual payment request to the associated issuer server.

In some implementations, the issuer server may generate a payment command, e.g., 1648-1649. For example, the issuer server may issue a command to deduct funds from the user's account (or add a charge to the user's credit card account). The issuer server may issue a payment command, e.g., 1649, to a database storing the user's account information, e.g., user profile database. The issuer server may provide a funds transfer message, e.g., 1651, to the pay network server, which may forward the funds transfer message to the acquirer server. In some implementations, the acquirer server may parse the funds transfer message, and correlate the transaction (e.g., using the request_ID field in the example above) to the merchant. The acquirer server may then transfer the funds specified in the funds transfer message to an account of the merchant, e.g., 1653-1655.

FIG. 17 shows a data flow diagram illustrating aspects of determining device security assessment values, e.g., an example DSA Component 1700 in one implementation of the DPCL operation. In one embodiment, a user device 1701 may generate a package containing security assessment values. Security assessment values may be parameters of the device, information about the surroundings of the device, applications running on the device, web pages displayed on the device, the current layout, and/or the like. In one embodiment, the operating system may be queried for installed applications on the user device (e.g., a list of applications, application parameters, and/or the like), e.g., 1702. The device may be running some applications or processes currently, e.g., 1703. For each application that is running (or, in another embodiment, each application on the user device), the z-index of all of the application view layers may be determined, e.g., 1704. The z-index of an application view layer is the relation in the third-dimension of a 3-dimensional plane in which the application view occupies. In other words, the z-index defines which view layers are on top of other or obscuring other view layers. In one embodiment, a transparency value for each view layer may also be determined, for use in detecting applications that may be partially hiding their interfaces. In one embodiment, the user device may determine which web pages the device is displaying or has loaded, e.g., 1705, as well as the z-index of the web pages and the elements that make up the web page(s), e.g., 1706. In one embodiment, if WiFi data is available (such as when the user device has a WiFi capable antenna), e.g., 1707, WiFi networks near the device may be detected, e.g., 1708, as well as if the device is connected to a WiFi network (or networks), e.g., 1709. In one embodiment, if GPS data is available, e.g., 1710, such as be the device having a built in GPS receiver, GPS receiver, access to GPS data via cellular or other connection and/or the like, the current location of the device may be determined, e.g., 1711. In one embodiment, if cellular tower data is available (such as, for example, in a device configured with a cellular capable antenna), e.g., 1712, the nearby cellular towers may be determined, e.g., 1713. In one embodiment, a device registry or function may be queried to determine characteristics of the operating system, patches installed on the device, device capabilities, and/or the like, e.g., 1714.

DPCL Controller

Figure 18:
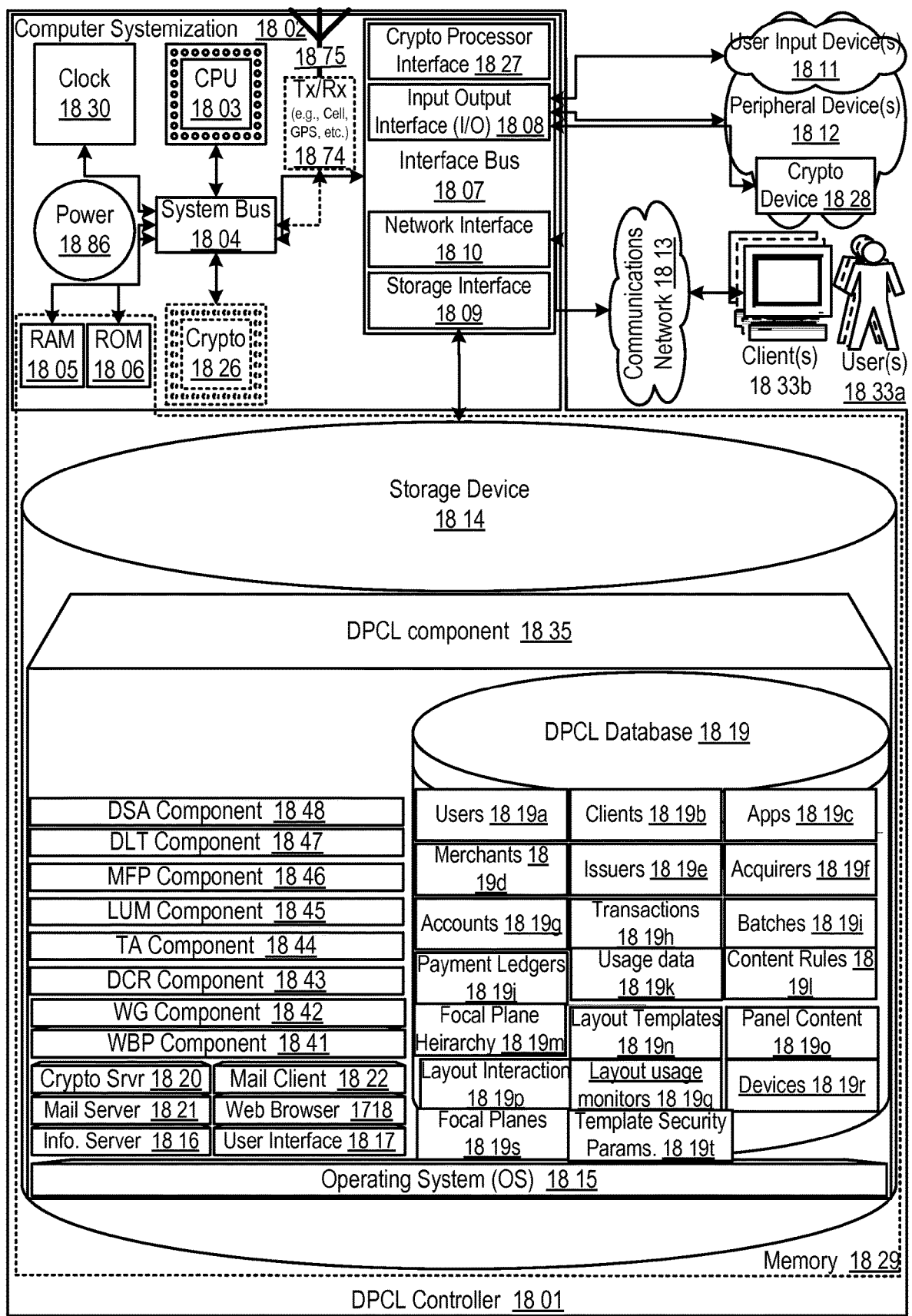
FIG. 18 shows a block diagram illustrating aspects of an exemplary embodiment of a DPCL user interface controller, in one implementation of the DPCL operation.

FIG. 18 shows a block diagram illustrating embodiments of a DPCL controller. In this embodiment, the DPCL controller 1801 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 1803 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DPCL controller 1801 may be connected to and/or communicate with entities such as, but not limited to: one or more users from user input devices 1811; peripheral devices 1812; an optional cryptographic processor device 1828; and/or a communications network 1813.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DPCL controller 1801 may be based on computer systems that may comprise, but are not limited to, components such as: a computer systemization 1802 connected to memory 1829.

Computer Systemization

A computer systemization 1802 may comprise a clock 1830, central processing unit ("CPU(s)" and/or "processor(s)" (these terms are used interchangeable throughout the disclosure unless noted to the contrary)) 1803, a memory 1829 (e.g., a read only memory (ROM) 1806, a random access memory (RAM) 1805, etc.), and/or an interface bus 1807, and most frequently, although not necessarily, are all interconnected and/or communicating through a system bus 1804 on one or more (mother)board(s) 1802 having conductive and/or otherwise transportive circuit pathways through which instructions (e.g., binary encoded signals) may travel to effectuate communications, operations, storage, etc. The computer systemization may be connected to a power source 1886; e.g., optionally the power source may be internal. Optionally, a cryptographic processor 1826 and/or transceivers (e.g., ICs) 1874 may be connected to the system bus. In another embodiment, the cryptographic processor and/or transceivers may be connected as either internal and/or external peripheral devices 1812 via the interface bus I/O. In turn, the transceivers may be connected to antenna(s) 1875, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing DPCL controller to determine its location)); Broadcom BCM4329FKUBG transceiver chip (e.g., providing 802.11n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1829 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DPCL controller and beyond through various interfaces.

Should processing requirements dictate a greater amount speed and/or capacity, distributed processors (e.g., Distributed DPCL), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the DPCL may be achieved by implementing a microcontroller such as CAST's R8051XC2 microcontroller; Intel's MCS 51 (i.e., 8051 microcontroller); and/or the like. Also, to implement certain features of the DPCL, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DPCL component collection (distributed or otherwise) and/or features may be implemented via the microprocessor and/or via embedded components; e.g., via ASIC, coprocessor, DSP, FPGA, and/or the like. Alternately, some implementations of the DPCL may be implemented with embedded components that are configured and used to achieve a variety of features or signal processing.

Depending on the particular implementation, the embedded components may include software solutions, hardware solutions, and/or some combination of both hardware/software solutions. For example, DPCL features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DPCL features. A hierarchy of programmable interconnects allow logic blocks to be interconnected as needed by the DPCL system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DPCL may be developed on regular FPGAs and then migrated into a fixed version that more resembles ASIC implementations. Alternate or coordinating implementations may migrate DPCL controller features to a final ASIC instead of or in addition to FPGAs. Depending on the implementation all of the aforementioned embedded components and microprocessors may be considered the "CPU" and/or "processor" for the DPCL.

Power Source

The power source 1886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1886 is connected to at least one of the interconnected subsequent components of the DPCL thereby providing an electric current to all subsequent components. In one example, the power source 1886 is connected to the system bus component 1804. In an alternative embodiment, an outside power source 1886 is provided through a connection across the I/O 1808 interface. For example, a USB and/or IEEE 1394 connection carries both data and power across the connection and is therefore a suitable source of power.

Interface Adapters

Interface bus(ses) 1807 may accept, connect, and/or communicate to a number of interface adapters, conventionally although not necessarily in the form of adapter cards, such as but not limited to: input output interfaces (I/O) 1808, storage interfaces 1809, network interfaces 1810, and/or the like. Optionally, cryptographic processor interfaces 1827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1809 may accept, communicate, and/or connect to a number of storage devices such as, but not limited to: storage devices 1814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1810 may accept, communicate, and/or connect to a communications network 1813. Through a communications network 1813, the DPCL controller is accessible through remote clients 1833b (e.g., computers with web browsers) by users 1833a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DPCL), architectures may similarly be employed to pool, load balance, and/or otherwise increase the communicative bandwidth required by the DPCL controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1810 may be used to engage with various communications network types 1813. For example, multiple network interfaces may be employed to allow for the communication over broadcast, multicast, and/or unicast networks.

Input Output interfaces (I/O) 1808 may accept, communicate, and/or connect to user input devices 1811, peripheral devices 1812, cryptographic processor devices 1828, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1811 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1812 may be connected and/or communicate to I/O and/or other facilities of the like such as network interfaces, storage interfaces, directly to the interface bus, system bus, the CPU, and/or the like. Peripheral devices may be external, internal and/or part of the DPCL controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DPCL controller may be embodied as an embedded, dedicated, and/or monitor-less (i.e., headless) device, wherein access would be provided over a network interface connection.

Cryptographic units such as, but not limited to, microcontrollers, processors 1826, interfaces 1827, and/or devices 1828 may be attached, and/or communicate with the DPCL controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1829. However, memory is a fungible technology and resource, thus, any number of memory embodiments may be employed in lieu of or in concert with one another. It is to be understood that the DPCL controller and/or a computer systemization may employ various forms of memory 1829. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1829 will include ROM 1806, RAM 1805, and a storage device 1814. A storage device 1814 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1829 may contain a collection of program and/or database components and/or data such as, but not limited to: operating system component(s) 1815 (operating system); information server component(s) 1816 (information server); user interface component(s) 1817 (user interface); Web browser component(s) 1818 (Web browser); database(s) 1819; mail server component(s) 1821; mail client component(s) 1822; cryptographic server component(s) 1820 (cryptographic server); the DPCL component(s) 1835; WBP Component 1841, WG Component 1842, DCR Component 1843, TA Component 1844, LUM Component 1845, MFP Component 1846, DLT Component 1847, DSA Component 1848 and/or the like (i.e., collectively a component collection). These components may be stored and accessed from the storage devices and/or from storage devices accessible through an interface bus. Although non-conventional program components such as those in the component collection, typically, are stored in a local storage device 1814, they may also be loaded and/or stored in memory such as: peripheral devices, RAM, remote storage facilities through a communications network, ROM, various forms of memory, and/or the like.

Operating System

The operating system component 1815 is an executable program component facilitating the operation of the DPCL controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NTNista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DPCL controller to communicate with other entities through a communications network 1813. Various communication protocols may be used by the DPCL controller as a subcarrier transport mechanism for interaction, such as, but not limited to: multicast, TCP/IP, UDP, unicast, and/or the like.

Information Server

An information server component 1816 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DPCL controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DPCL database 1819, operating systems, other program components, user interfaces, Web browsers, and/or the like.

Access to the DPCL database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DPCL. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DPCL as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, strollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1817 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1818 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DPCL enabled nodes. The combined application may be nugatory on systems employing standard Web browsers.

Mail Server

A mail server component 1821 is a stored program component that is executed by a CPU 1803. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DPCL.

Access to the DPCL mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1822 is a stored program component that is executed by a CPU 1803. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1820 is a stored program component that is executed by a CPU 1803, cryptographic processor 1826, cryptographic processor interface 1827, cryptographic processor device 1828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DPCL may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the DPCL component to engage in secure transactions if so desired. The cryptographic component facilitates the secure accessing of resources on the DPCL and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DPCL Database

The DPCL database component 1819 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DPCL database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DPCL database is implemented as a data-structure, the use of the DPCL database 1819 may be integrated into another component such as the DPCL component 1835. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1819 includes several tables 1819*a*-*t*. A Users table 1819*a* may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a DPCL. A Clients table 1819*b* may include fields such as, but not limited to: user_id, client_id, client_ip, client_type, client_model, operating_system, os_version, app_installed_flag, and/or the like. An Apps table 1819*c* may include fields such as, but not limited to: app_ID, app_name, app_type, OS_compatibilities_list, version, timestamp, developer_ID, and/or the like. A Merchants table 1819*d* may include fields such as, but not limited to: merchant_id, merchant_name, provi merchant_address, ip_address, mac_address, auth_key, port_num, security_settings_list, and/or the like. An Issuers table 1819*e* may include fields such as, but not limited to: issuer_id, issuer_name, issuer_address, ip_address, mac_address, auth_key, port_num, security_settings_list, and/or the like. An Acquirers table 1819*f* may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. An Accounts table 1819*g* may include fields such as, but not limited to: user_id, account_num, account_name, issuer_aquirer_flag, institution_name, and/or the like. A Transactions table 1819*h* may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id_, account_firstname, account_lastname, account_type, account_num, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 1819*i* may include fields such as, but not limited to: batch_id, transaction_id_list, timestamp_list, cleared_flag_list, clearance trigger settings, and/or the like. A Payment Ledgers table 1819*j* may include fields such as, but not limited to: request_id, timestamp, deposit_amount, batch_id, transaction_id, clear_flag, deposit_account, transaction_summary, payor_name, payor_account, and/or the like. A Usage Data table 1819*k* may also be provided and include fields such as, but not limited to: usage_data_id, user_id, timestamp, xy_coordinate, time_increment, focal_plane, geographic_coordinates, location, velocity, content_descriptor, orientation, focal_plane_color, focal_plane_size, custom_function_definition, local_atmospheric_temperature, local_atmospheric_relative_humidity, local_weather, perceived_pupil_vector_xy, and/or the like. A Content Rule table 1819*l* may also be provided and include fields such as, but not limited to: content_rule_id, content_id, content_value, timestamp, priority_level, focal_plane and/or the like. A Focal Plane Hierarchy table 1819*m* may also be provided and include fields such as, but not limited to: focal_plane_hierarchy_id, focal_plane_id, xy_coordinates, time_interaction and/or the like. A layout templates table 1819*n* may also be provided and include fields such as, but not limited to: layout_templates_id, focal_plane_id, layout_version, user_id, previous_iterations_count, template_type, template_name, layout_nodes, default_height, default_width, default_resolution, device_type_target, device_model_target, device_os_target, device_requirements, required_monitors, optional_monitors, available_monitors and/or the like. A panel content table 18190 may also be provided and include fields such as, but not limited to: panel_content_id, panel_type, default_content_renderer, secondary_content_renderer, custom_content_renderer, content, content_html, content_binary, content_flash, content_stream_location and/or the like. A layout interaction table 1819*p* may also be provided and include fields such as, but not limited to: layout_interaction_id, interaction_type, interaction_value, user_device_mac_address, interaction_x_coord, interaction_y_coord, interaction_pressure, interaction_temperature, user_id and/or the like. A layout usage monitors table 1819*q* may also be provided and include fields such as, but not limited to: layout_usage_monitor_id, device_id, monitor_type, monitor_baseline_value, monitor_high_value, monitor_low_value, monitor_alert and/or the like. A devices table 1819*r* may also be provided and include fields such as, but not limited to: device_id, device_model, device_name, user_id, layout_usage_monitor_id, layout_interaction_id, panel_content_id, layout_template_id and/or the like. A focal planes table 1819*s* may also be provided and include fields such as, but not limited to: focal_plane_id, device_id, orientation, x_size, y_size, z_index, x_position, y_position and/or the like. A Template Security Parameters table 1819*t* may also be provided and include fields such as, but not limited to: template_security_parameter_id, template_id, applies_to_focal_plane_ids, threshold_invocation_level, must_invoke_level, security_rules and/or the like.

In one embodiment, the DPCL database may interact with other database systems. For example, employing a distributed database system, queries and data access by search DPCL component may treat the combination of the DPCL database, an integrated data security layer database as a single database entity.

In one embodiment, user programs may contain various user interface primitives, which may serve to update the DPCL. Also, various accounts may require custom database tables depending upon the environments and the types of clients the DPCL may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1819*a-t*. The DPCL may be configured to keep track of various settings, inputs, and parameters via database controllers.

The DPCL database may communicate to and/or with other components in a component collection, including itself, and/or facilities of the like. Most frequently, the DPCL database communicates with the DPCL component, other program components, and/or the like. The database may contain, retain, and provide information regarding other nodes and data.

The DPCLs

The DPCL component 1835 is a stored program component that is executed by a CPU. In one embodiment, the DPCL component incorporates any and/or all combinations of the aspects of the DPCL that was discussed in the previous figures. As such, the DPCL affects accessing, obtaining and the provision of information, services, transactions, and/or the like across various communications networks. The features and embodiments of the DPCL discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DPCL's features and facilities, and in many cases reduce the costs, energy consumption/requirements, and extend the life of DPCL's underlying infrastructure; this has the added benefit of making the DPCL more reliable. Similarly, many of the features and mechanisms are designed to be easier for users to use and access, thereby broadening the audience that may enjoy/employ and exploit the feature sets of the DPCL; such ease of use also helps to increase the reliability of the DPCL. In addition, the feature sets include heightened security as noted via the Cryptographic components 1820, 1826, 1828 and throughout, making access to the features and data more reliable and secure.

The DPCL component may transform the content of a user facing user interface over time based upon usage behavior of a user, security profiles of the user, user device, user surroundings and/or the like and use of the DPCL. In one embodiment, the DPCL component 1835 takes inputs (e.g., application view launch input 202, base layout template request 203, layout usage monitor package 210, dynamic layout template request 213, dynamic layout template customization request 215 tracking of cursor and/or eye movement usage input 1514 of a user, page request input of a user 1511, 1512, 1515, merchant offer detail input 1516*e*, content rule input and/or the like) etc., and transforms the inputs via various components (e.g., WBP Component 1841, WG Component 1842, DCR Component 1843, TA Component 1844, LUM Component 1845, MFP Component 1846, DLT Component 1847, DSA Component 1848 and/or the like), into outputs (e.g., base template layout response 206, layout usage monitor response 212, dynamic layout template customization response 217, dynamic layout template response 219, requested page response 1513, updated page response 1517, card authorization request 1521, authorization fail message 1531, authorization response 1529*a-n*, transaction data 1532, authorization success message 1533*a-b*, batch append data 1535, purchase receipt 1536, funds transfer message 1553¬454, and/or the like).

The DPCL component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools, Prototype; script.aculo.us, Simple Object Access Protocol (SOAP); SWFObject; Yahoo! User Interface; and/or the like), WebObjects, and/or the like. In one embodiment, the DPCL server employs a cryptographic server to encrypt and decrypt communications. The DPCL component may communicate to and/or with other components in a component collection, including itself, and/or facilities of the like. Most frequently, the DPCL component communicates with the DPCL database, operating systems, other program components, and/or the like. The DPCL may contain, communicate, generate, obtain, and/or provide program component, system, user, and/or data communications, requests, and/or responses.

Distributed DPCLs

The structure and/or operation of any of the DPCL node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DPCL controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like, Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DPCL controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
Header ('Content-Type: text/plain');
// set ip address and port to listen to for incoming data
$address = '192.168.0.100';
$port = 255;
// create a server-side SSL socket, listen for/accept incoming
communication
$sock = socket_create (AF_INET, SOCK_STREAM, 0);
socket_bind ($sock, $address, $port) or die ('Could not bind to address');
socket_listen ($sock);
```

-continued

```
$client = socket_accept ($sock);
// read input data from client device in 1024 byte blocks until end of
message
do {
    $input = "";
    $input = socket_read ($client, 1024);
    $data .= $input;
} while ($input != "");
// parse data to extract variables
$obj = json_decode ($data, true);
// store input data in a database
mysql_connect ("201.408.185.132", $DBserver, $password); // access
database server
mysql_select ("CLIENT_DB.SQL"); // select database to append
mysql_query ("INSERT INTO UserTable (transmission)
VALUES ($data)"); // add data to UserTable table in a CLIENT database
mysql_close ("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/
index.jsp?topic=/com.ibm.IBMDI.doc/
referenceguide295.htm
and other parser implementations:
http://publib.boulder.ibm.com/infocenter/tivihelp/v2r1/
index.jsp?topic=/com.ibm.IBMDI.doc/
referenceguide259.htm
all of which are hereby expressly incorporated by reference.

In order to address various issues and advance the art, the entirety of this application for DPCL (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DPCL individual and/or enterprise user, database configuration and/or relational model, data type, data transmission and/or network framework, syntax structure, and/or the like, various embodiments of the DPCL, may be implemented that enable a great deal of flexibility and customization. For example, aspects of the DPCL may be adapted for restaurant dining, online shopping, brick-and-mortar shopping, secured information processing, and/or the like. While various embodiments and discussions of the DPCL have been directed to electronic purchase transactions, however, it is to be understood that the embodiments described herein may be readily configured and/or customized for a wide variety of other applications and/or implementations.

What is claimed is:

1. A processor-implemented method of dynamically customizing an application user interface layout to enhance security, comprising:

receiving, by a processing system, a self actuated varying secure layout template request from a user device, wherein the self actuated varying secure layout template request includes at least one security assessment value provided by the user device;

retrieving, by the processing system, a self actuated varying layout template from a layout template database, wherein the self actuated varying layout template includes a base application user interface display view layer having a plurality of panels for displaying content;

determining, by the processing system, an interface security threat factor using the at least one security assessment value, wherein the at least one security assessment value includes the number of other application interface display view layers disposed above the base application user interface display view layer;

determining, by the processing system, whether to modify at least one panel of the plurality of panels of the base application user interface display view layer by comparing the interface security threat factor to a predetermined interface security threat threshold;

modifying the at least one panel of the plurality of panels of the base application user interface display view layer based on the determination to modify, wherein modifying includes:

randomizing the location of the at least one panel of the plurality of panels of the base application user interface display view layer along an x-axis and a y-axis of the base application user interface display view layer;

marking each of the panels of the plurality of panels as secure content capable;

determining if all the panels of the plurality of panels have been marked as secure content capable;

in response to a determination that all the panels of the plurality of panels have been marked as secure content capable, marking the self actuated varying layout template as secure content capable;

setting a user interface display view parameter to indicate that no further adjustments are to be made to the plurality of panels of the base application user interface display view layer, wherein the user interface display view parameter is not displayed by the user device;

determining whether the user interface display view parameter indicates that no further adjustments are to be made to the plurality of panels; and in response to a determination that no further adjustments are to be made to the plurality of panels: providing a modified self actuated varying secure layout template to the user device.

2. The method of claim 1, wherein modifying the base application user interface display view layer includes inserting a user specified security image into one of the plurality of panels of the base application user interface display view layer.

3. The method of claim 1, wherein the at least one security assessment value is not provided by the user device.

4. The method of claim 3, wherein the at least one security assessment value is retrieved from a local security database.

5. The method of claim 1, wherein the at least one security assessment value includes information about applications that are installed on the user device.

6. The method of claim 5, wherein the information applications that are installed on the user device additionally includes an indication of which applications are currently running on the user device.

7. The method of claim 6, wherein the indication of which applications are currently running on the user device includes a user interface z-index configuration listing.

8. The method of claim 1, wherein modifying the base application user interface display view layer includes shifting the position of the base application interface display view layer so that the base application user interface display view layer is not under a non-authorized interface view overlay, wherein the non-authorized interface view overlay is one of the other application interface display view layers disposed above the base application user interface display view layer.

9. The method of claim 1, wherein the interface security threat factor is based on an overall security threat factor and a security maintenance factor for the base application user interface display view layer.

10. The method of claim 9, further comprising:
determining an application security threat factor, a user location security threat factor, a user surroundings security threat factor, and a user device profile security threat factor using the at least one security assessment value;
determining, by the processing system, a z-index security threat factor by executing a layer test to determine one or more user interface display view layers disposed above or below the base application user interface display view layer; and
calculating, by the processing system, the overall security threat factor based on the application security threat factor, the user location security threat factor, the user surroundings security threat factor, the user device profile security threat factor, and the z-index security threat factor.

11. The method of claim 9, wherein the security maintenance factor for the at least one user interface display view is based on one or more characteristics of the base application user interface display view layer that increases the ability of the base application user interface display view layer to maintain security.

12. The method of claim 1, further comprising:
recalculating the interface security threat factor; and
comparing the recalculated interface security threat factor to the predetermined interface security threat threshold,
if the recalculated interface security threat factor is less than the predetermined interface security threat threshold,
setting a user interface display view parameter to indicate that the base application user interface display view layer as capable of holding secure content.

13. A processor-implemented system of dynamically customizing an application user interface layout to enhance security, comprising:
a processor; and
a memory disposed in communication with the processor and storing processor-issuable instructions to:
receive a self actuated varying secure layout template request from a user device, wherein the self actuated varying secure layout template request includes at least one security assessment value;
retrieve a self actuated varying layout template from a layout template database wherein the self actuated varying layout template includes a base application user interface display view layer having a plurality of panels for displaying content;
determine an interface security threat factor using the at least one security assessment value, wherein the at least one security assessment value includes the number of other application user interface display view layers above the base application user interface display view layer;
determine whether to modify at least one panel of the plurality of panels of the base application user interface display view layer by comparing the interface security threat factor to a predetermined interface security threat threshold;
modify the at least one panel of the plurality of panels of the base application user interface display view layer based on the determination to modify, wherein modify includes:
randomize the location of the at least one panel of the plurality of panels of the base application user interface display view layer along an x-axis and a y-axis of the base application user interface display view layer;
mark each of the panels of the plurality of panels as secure content capable;
determine if all the panels of the plurality of panels have been marked as secure content capable;
in response to a determination that all the panels of the plurality of panels have been marked as secure content capable, mark the self actuated varying layout template as secure content capable;
set a user interface display view parameter to indicate that no further adjustments are to be made to the plurality of panels of the base application user interface display view layer, wherein the user interface display view parameter is not displayed by the user device;

determine whether the user interface display view parameter indicates that no further adjustments are to be made to the plurality of panels; and in response to a determination that no further adjustments are to be made to the plurality of panels:

provide a modified self actuated varying secure layout template to the user device.

14. The system of claim 13, wherein means to modify the base application user interface display view layer includes means to resize the user interface display view.

15. The system of claim 13, wherein means to modify the base application user interface display view layer includes means to insert a user specified security image into one of the plurality of panels of the base application user interface display view layer.

16. The system of claim 13, wherein the at least one security assessment value is not provided by the user device.

17. The system of claim 16, wherein at least one security assessment value is retrieved from a local security database.

18. A non-transitory medium storing security enhancing dynamically customizing application user interface layout instructions to:

receive a self actuated varying secure layout template request from a user device, wherein the self actuated varying secure layout template request includes at least one security assessment value;

retrieve a self actuated varying layout template from a layout template database, wherein the self actuated varying layout template includes a base application user interface display view layer having plurality of panels for displaying content;

determine an interface security threat factor using the at least one security assessment value, wherein the at least one security assessment value includes the number of application user interface display view layers above the base application interface display view layer;

determine whether to modify at least one panel of the plurality of panels of the base application user interface display view layer by comparing the interface security threat factor to a predetermined interface security threat threshold;

modify the at least one panel of the plurality of panels of the base application user interface display view layer based on the determination to modify, wherein modify includes:

randomize the location of the at least one panel of the plurality of panels of the base application user interface display view layer along an x-axis and y-axis of the base application user interface display view layer;

mark each of the panels of the plurality of panels as secure content capable;

determine if all the panels of the plurality of panels have been marked as secure content capable;

in response to a determination that all the panels in the plurality of panels have been marked as secure content capable, mark the self actuated varying layout template as secure content capable;

set a user interface display view parameter to indicate that no further adjustments are to be made to the plurality of panels of the base application user interface display view layer, wherein the user interface display view parameter is not displayed by the user device;

determine whether the user interface display view parameter indicates that no further adjustments are to be made to the plurality of panels; and in response to a determination that no further adjustments are to be made to the plurality of panels:

provide a modified self actuated varying secure layout template to the user device.

\* \* \* \* \*